(12) United States Patent
Shimamoto et al.

(10) Patent No.: US 10,688,758 B2
(45) Date of Patent: *Jun. 23, 2020

(54) LAMINATED GLASS INTERMEDIATE FILM AND LAMINATED GLASS

(71) Applicant: SEKISUI CHEMICAL CO., LTD., Osaka, Osaka (JP)

(72) Inventors: Michio Shimamoto, Osaka (JP); Shota Matsuda, Osaka (JP); Sinyul Yang, Osaka (JP); Kohei Kani, Kouka (JP); Tatsuya Iwamoto, Kouka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 498 days.

This patent is subject to a terminal disclaimer.

(21) Appl. No.: 14/211,336

(22) Filed: Mar. 14, 2014

(65) Prior Publication Data

US 2014/0199534 A1   Jul. 17, 2014

Related U.S. Application Data

(63) Continuation of application No. 13/984,807, filed as application No. PCT/JP2012/053172 on Feb. 10, 2012, now Pat. No. 8,715,815.

(30) Foreign Application Priority Data

Feb. 10, 2011 (JP) .................... 2011-027523
Jun. 23, 2011 (JP) .................... 2011-139850

(51) Int. Cl.
*B32B 17/10* (2006.01)
*B32B 27/30* (2006.01)
(Continued)

(52) U.S. Cl.
CPC ........ *B32B 17/10761* (2013.01); *B32B 27/08* (2013.01); *B32B 27/22* (2013.01);
(Continued)

(58) Field of Classification Search
None
See application file for complete search history.

(56) References Cited

U.S. PATENT DOCUMENTS 5,340,654 A    8/1994 Ueda et al.
8,628,856 B2 * 1/2014 Iwamoto .......... B32B 17/10036
                                                  428/436
(Continued)

FOREIGN PATENT DOCUMENTS

CN   101400515 A   4/2009
CN   101410333 A   4/2009
(Continued)

OTHER PUBLICATIONS

International Search Report for Application No. PCT/JP2012/053172 dated Apr. 17, 2012.
(Continued)

*Primary Examiner* — Ling Siu Choi
*Assistant Examiner* — David L Miller
(74) *Attorney, Agent, or Firm* — Cheng Law Group, PLLC

(57) ABSTRACT

The present invention provides an intermediate film for laminated glass which can improve sound insulation. The intermediate film has a layered structure including at least two layers, comprising: a first layer containing a polyvinyl acetal resin and a plasticizer; and a second layer positioned on a first surface of the first layer. In a phase diagram of three values including a degree of acetalization, a degree of acetylation, and a hydroxyl group content of the polyvinyl acetal resin contained in the first layer, the values of the
(Continued)

degree of acetalization, the degree of acetylation, and the hydroxyl group content each fall within a region surrounded by a line including four straight lines connecting first, second, third, and fourth coordinates, which respectively have a degree of acetalization:degree of acetylation:hydroxyl group content of 70 mol %:30 mol %:0 mol %, 34 mol %:30 mol %:36 mol %, 94 mol %:0 mol %:6 mol %, and 100 mol %:0 mol %:0 mol %.

20 Claims, 8 Drawing Sheets

(51) Int. Cl.
    *C08F 16/38*     (2006.01)
    *B32B 27/08*     (2006.01)
    *B32B 27/22*     (2006.01)
    *C08F 216/38*     (2006.01)
    *C08L 29/14*     (2006.01)

(52) U.S. Cl.
    CPC ............ *B32B 27/30* (2013.01); *B32B 27/306* (2013.01); *C08F 16/38* (2013.01); *C08F 216/38* (2013.01); *B32B 2250/03* (2013.01); *C08L 29/14* (2013.01); *Y10T 428/2495* (2015.01); *Y10T 428/24967* (2015.01); *Y10T 428/3163* (2015.04); *Y10T 428/31627* (2015.04); *Y10T 428/31855* (2015.04); *Y10T 428/31859* (2015.04); *Y10T 428/31942* (2015.04); *Y10T 428/31946* (2015.04)

(56) References Cited

U.S. PATENT DOCUMENTS

| | | | | |
|---|---|---|---|---|
| 8,632,887 | B2* | 1/2014 | Iwamoto | B32B 17/10761 428/436 |
| 8,715,815 | B2* | 5/2014 | Shimamoto | B32B 27/30 428/213 |
| 8,734,937 | B2* | 5/2014 | Iwamoto | B32B 17/10761 428/213 |
| 8,753,747 | B2* | 6/2014 | Iwamoto | B32B 17/10605 428/436 |
| 8,883,317 | B2* | 11/2014 | Matsuda | B32B 17/10036 428/436 |
| 2006/0210782 | A1* | 9/2006 | Lu | B32B 17/10036 428/212 |
| 2009/0000335 | A1 | 1/2009 | Urata et al. | |
| 2009/0098354 | A1 | 4/2009 | Torr | |
| 2010/0279150 | A1 | 11/2010 | Hatta et al. | |
| 2011/0151269 | A1 | 6/2011 | Hatta et al. | |
| 2011/0192678 | A1* | 8/2011 | Matsuda | B32B 17/10761 181/286 |
| 2012/0021231 | A1 | 1/2012 | Hirota et al. | |
| 2012/0244329 | A1 | 9/2012 | Iwamoto et al. | |
| 2012/0244364 | A1* | 9/2012 | Iwamoto | B32B 17/10761 428/437 |
| 2012/0263958 | A1* | 10/2012 | Iwamoto | B32B 17/10761 428/441 |
| 2012/0288722 | A1 | 11/2012 | Iwamoto et al. | |
| 2014/0000977 | A1 | 1/2014 | Matsuda et al. | |
| 2014/0093739 | A1 | 4/2014 | Iwamoto et al. | |
| 2014/0227536 | A1 | 8/2014 | Iwamoto et al. | |
| 2014/0349123 | A1 | 11/2014 | Matsuda et al. | |

FOREIGN PATENT DOCUMENTS

| | | | | |
|---|---|---|---|---|
| JP | 6-926 | A | 1/1994 | |
| JP | 7-97240 | A | 4/1995 | |
| JP | 9-40444 | A | 2/1997 | |
| JP | 10-36146 | A | 2/1998 | |
| JP | 2007-70200 | A | 3/2007 | |
| JP | WO 2010038801 | A1* | 4/2010 | ....... B32B 17/10761 |
| JP | 2010-235432 | A | 10/2010 | |
| JP | WO 2011078313 | A1* | 6/2011 | ....... B32B 17/10761 |
| JP | 2012-508839 | A | 4/2012 | |
| JP | WO-2010/095749 | A1 | 4/2012 | |
| WO | WO-2010/038801 | A1 | 4/2010 | |
| WO | WO-2010/056251 | A1 | 5/2010 | |
| WO | WO-2010/008053 | A1 | 8/2010 | |
| WO | WO-2011/078313 | A1 | 6/2011 | |
| WO | WO-2011/081191 | A1 | 7/2011 | |
| WO | WO-2011081191 | A1* | 7/2011 | ....... B32B 17/10761 |
| WO | WO-2011/078314 | A1 | 8/2011 | |

OTHER PUBLICATIONS

Written Opinion of the international Searching Authority (PCT/ISA/237) for Application No. PCT/JP2012/053172 dated Apr. 17, 2012 and English translation thereof dated Sep. 19, 2013.

Supplementary European Search Report the Application No. EP 12 74 5025 dated Feb. 2, 2017.

* cited by examiner

[FIG. 1]
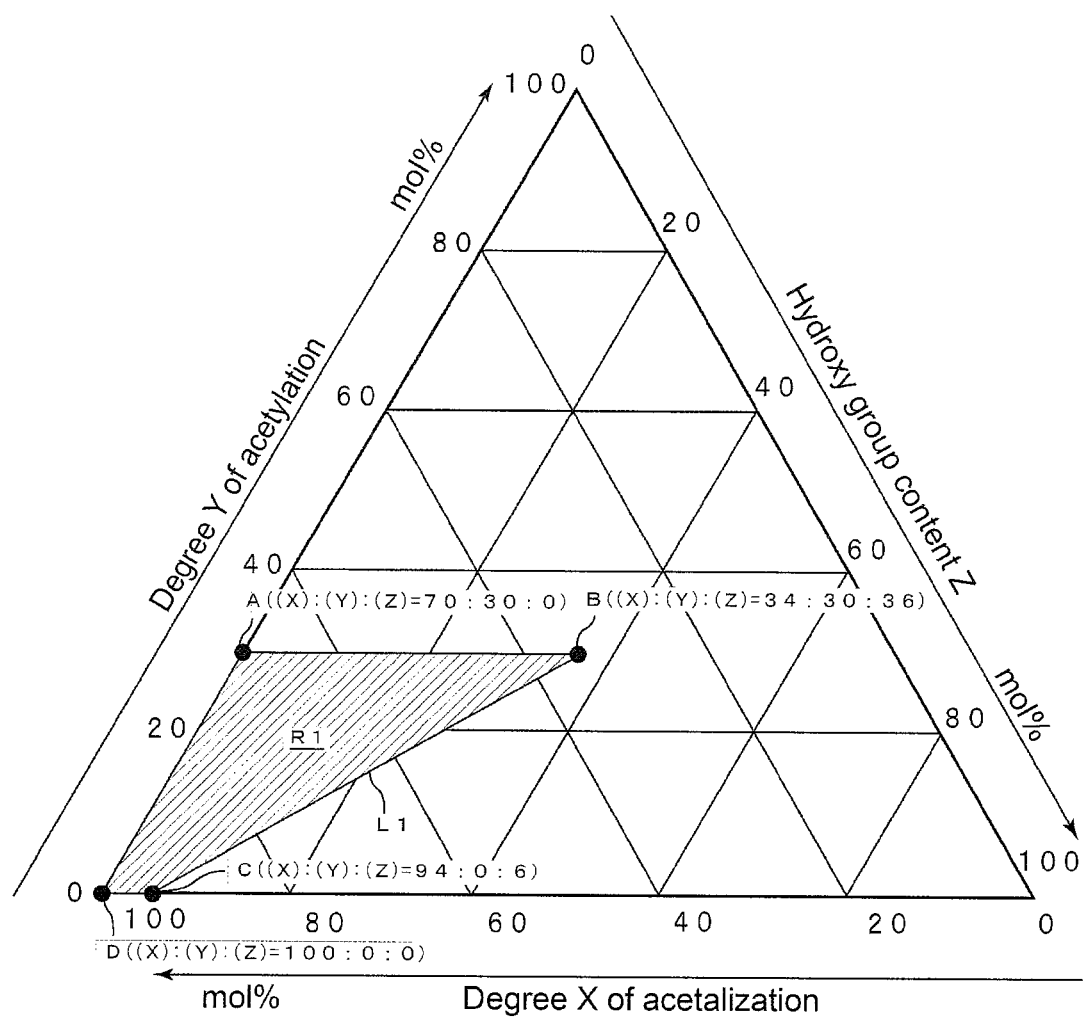

[FIG. 2]
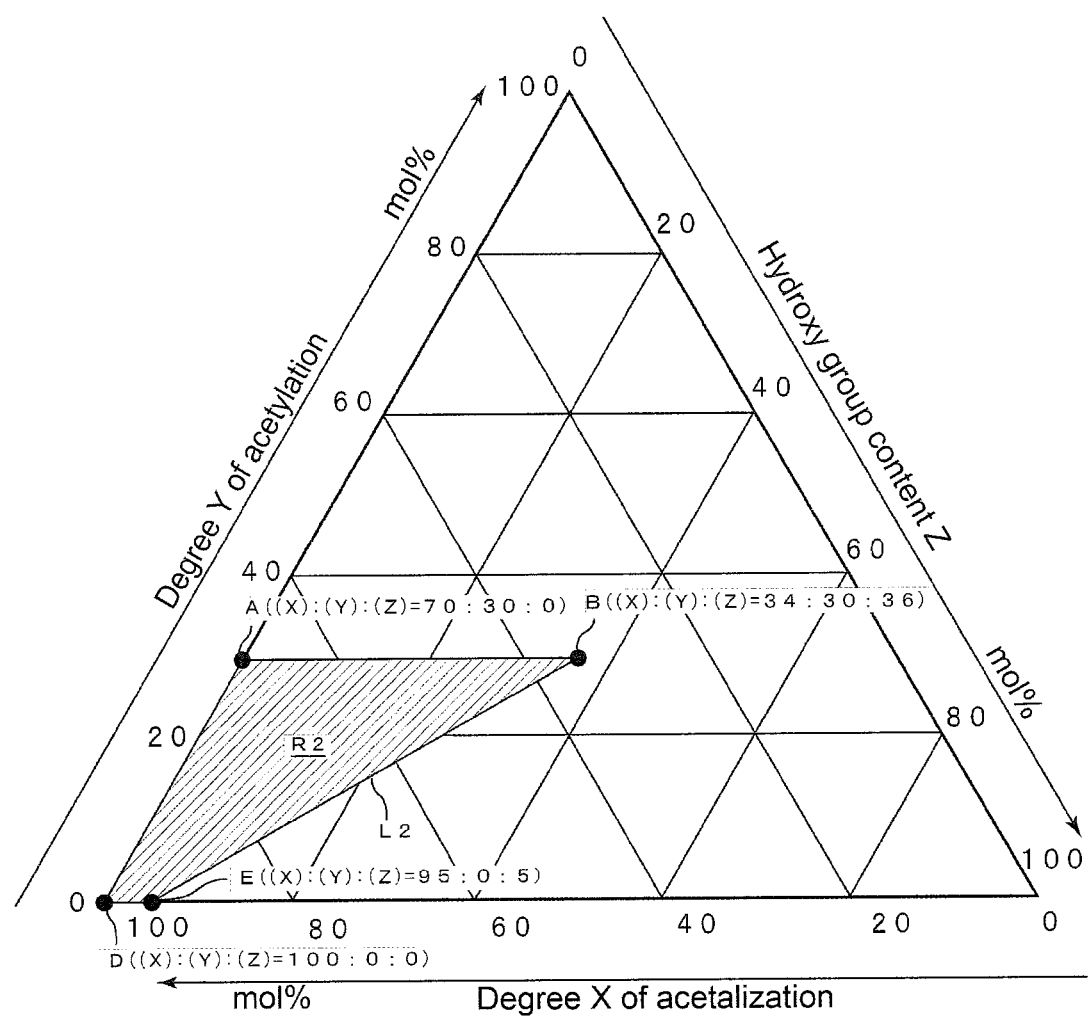

[FIG. 3]
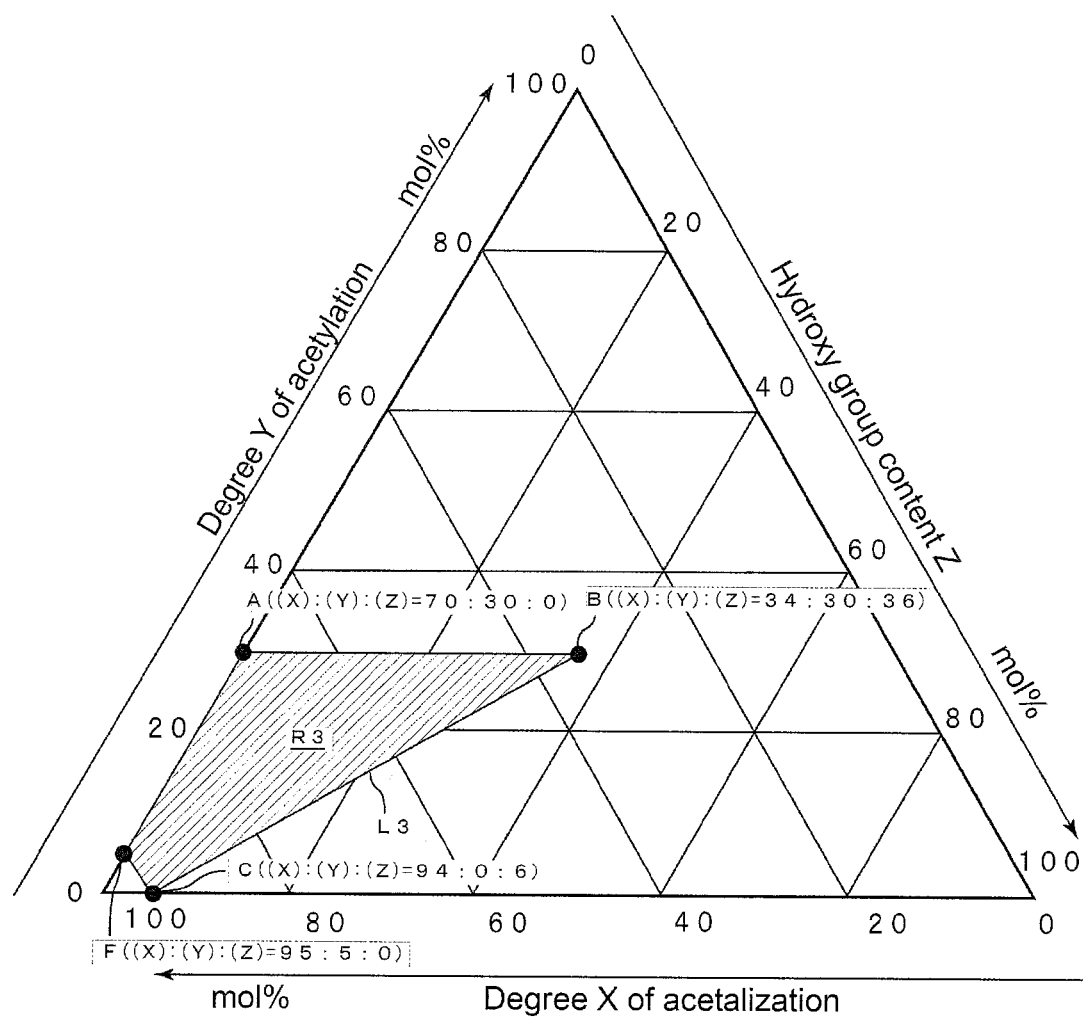

[FIG. 4]
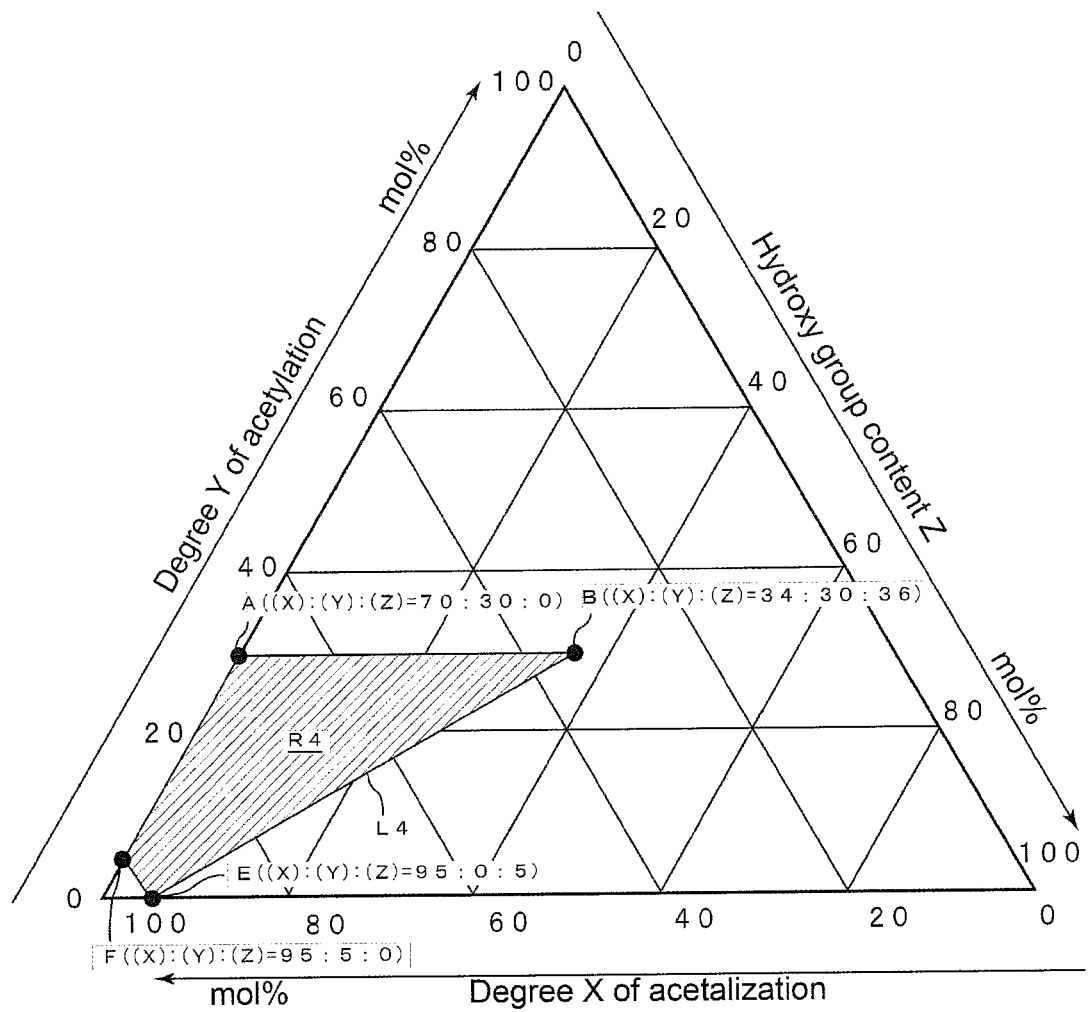
[FIG. 5]
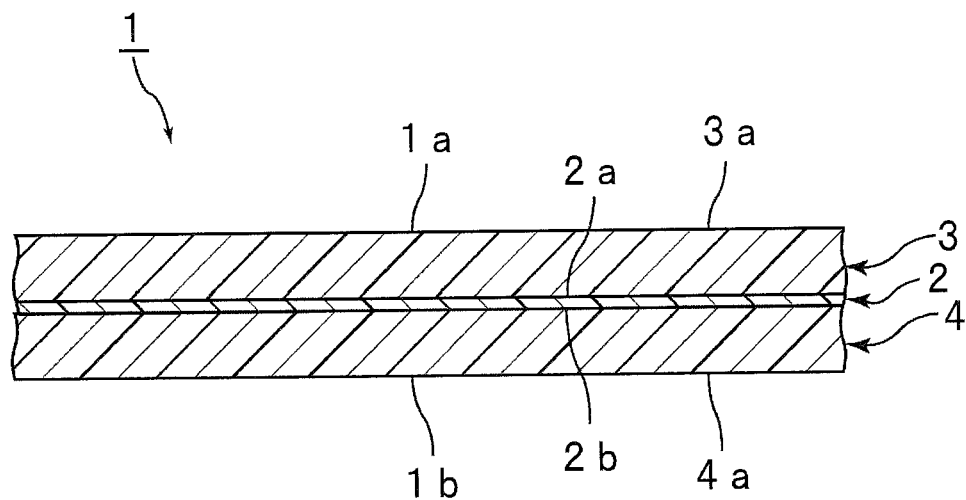

[FIG. 6]
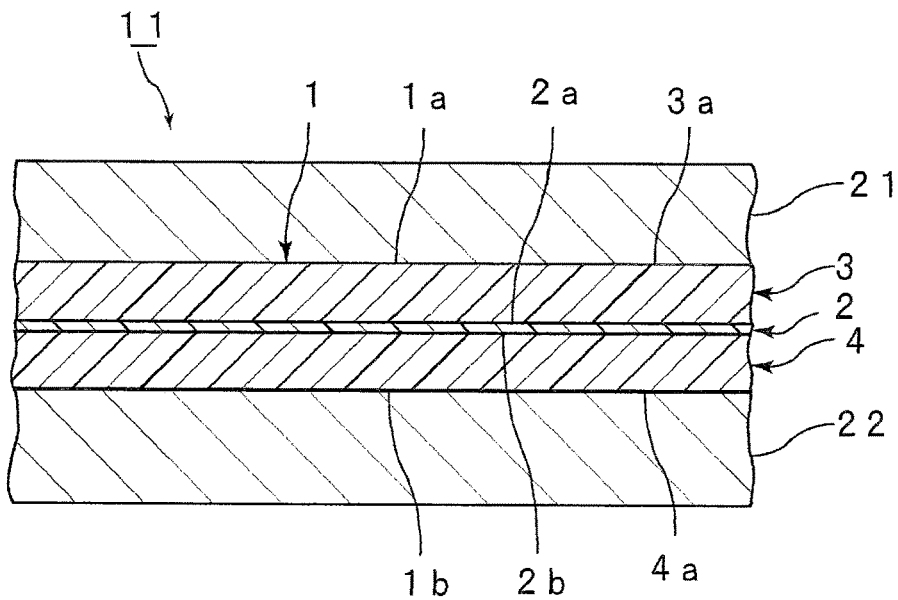
[FIG. 7]
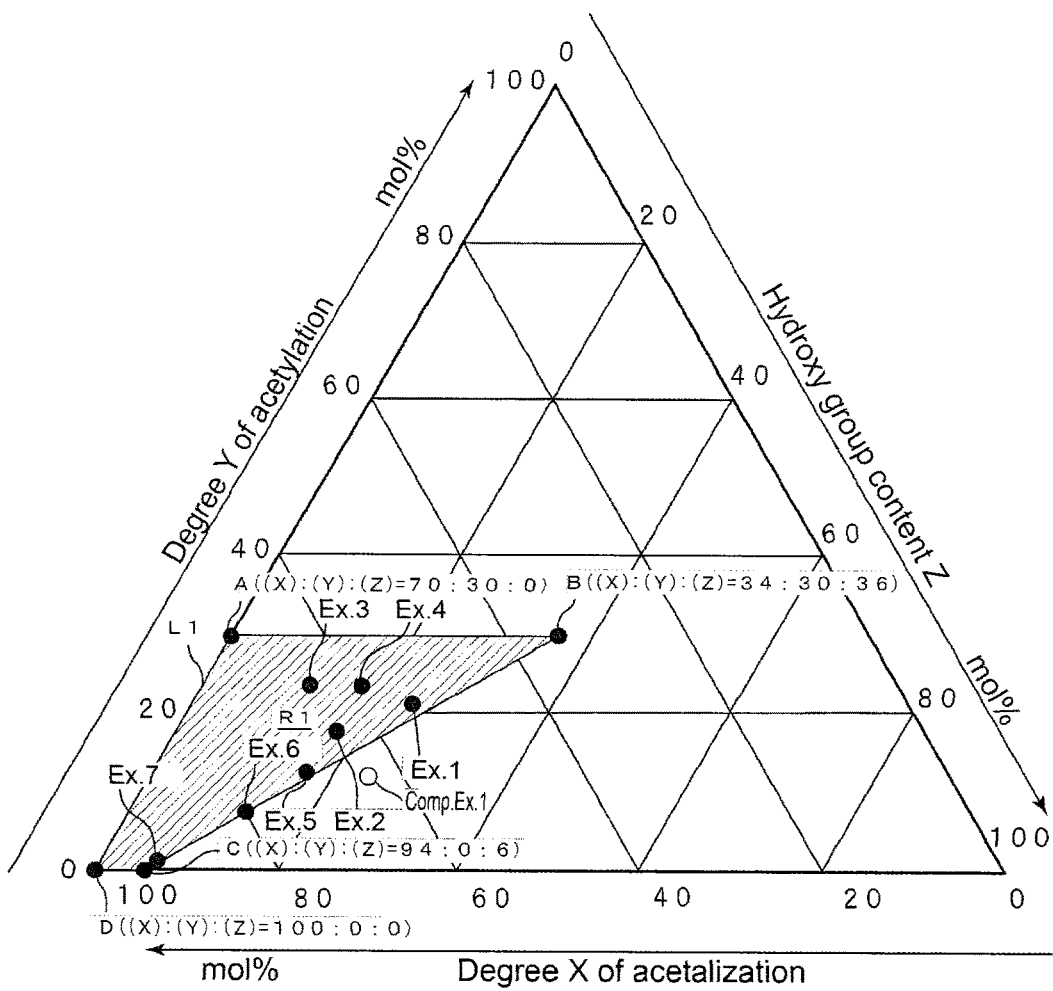

[FIG. 8]
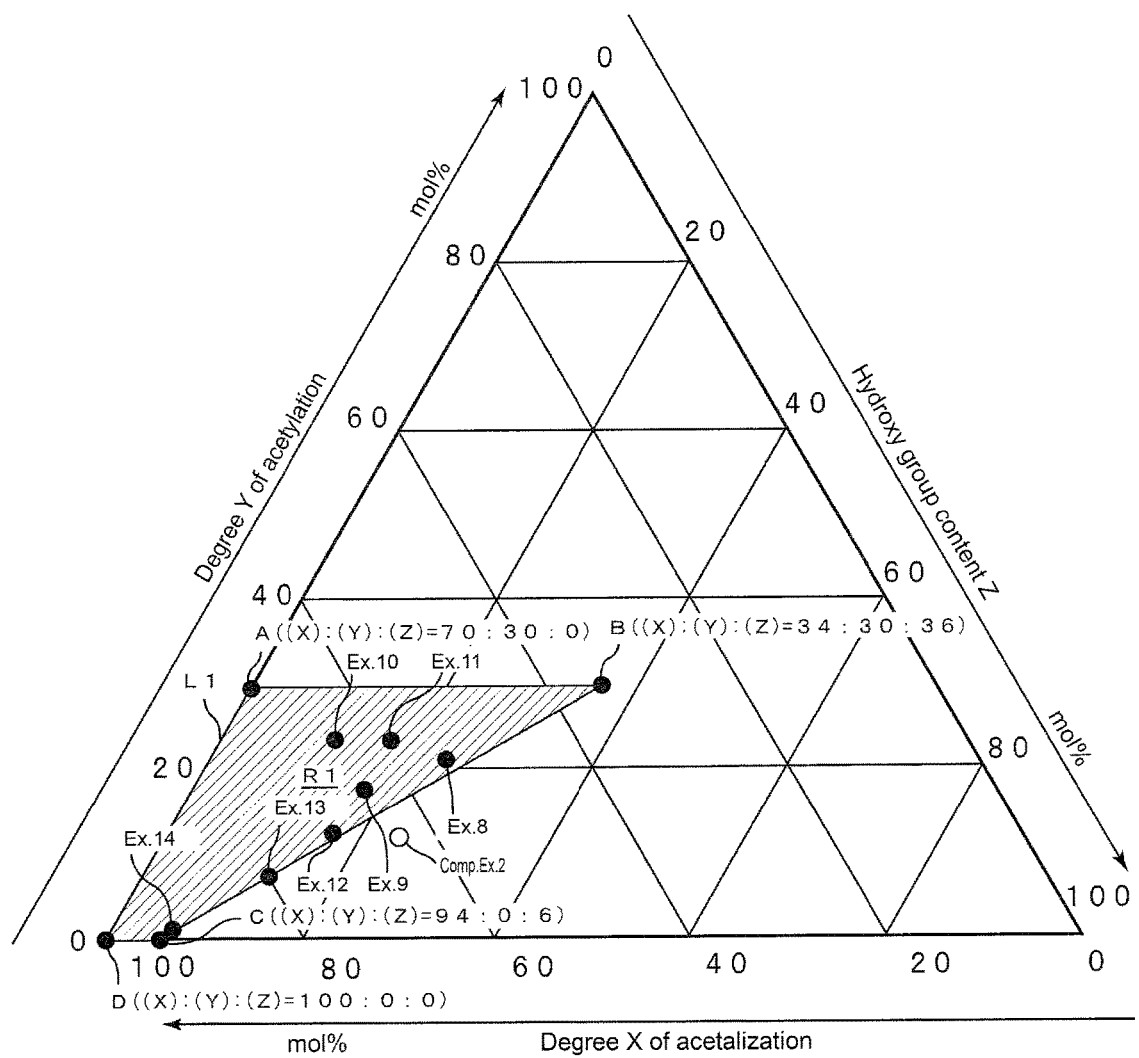

[FIG. 9]
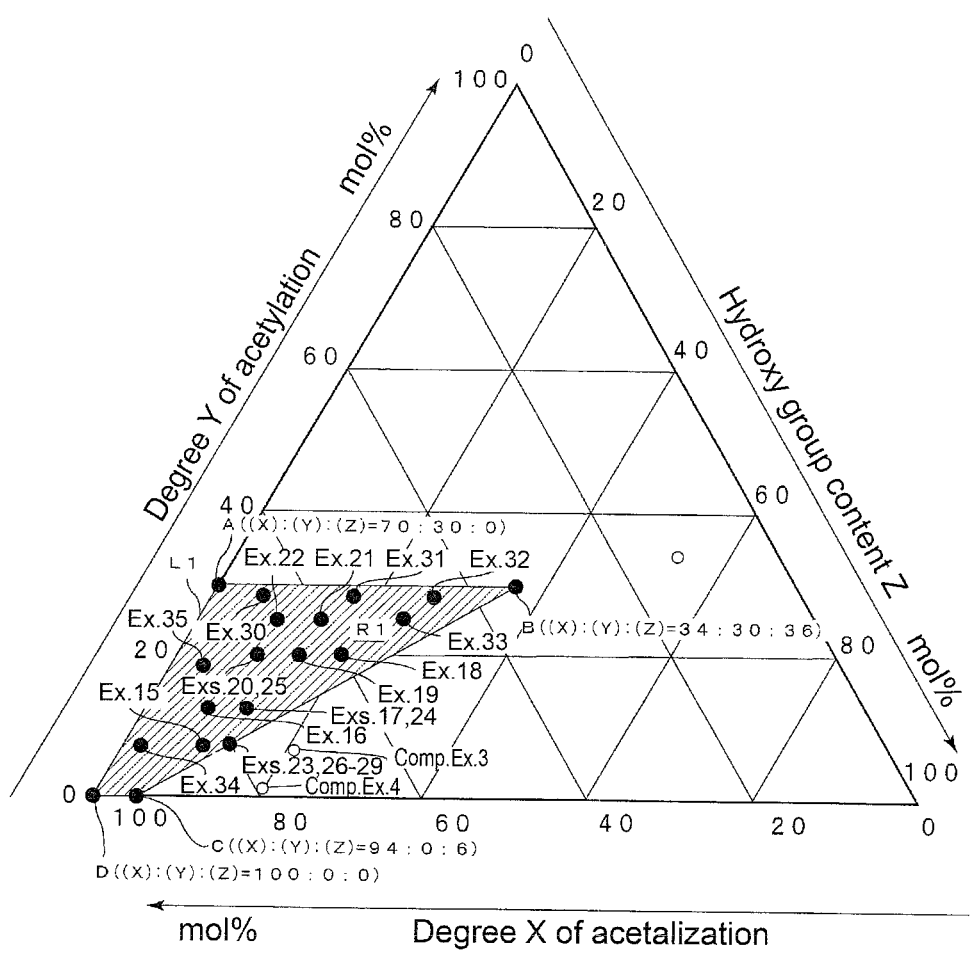

[FIG. 10]
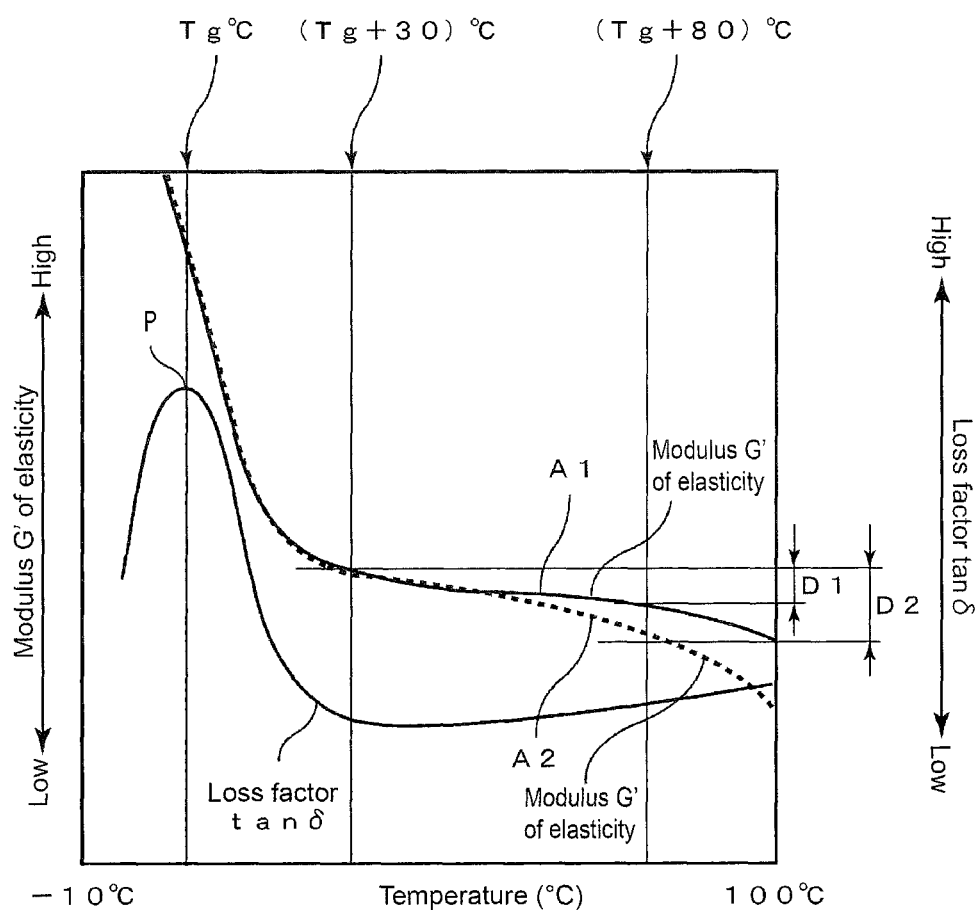

LAMINATED GLASS INTERMEDIATE FILM AND LAMINATED GLASS

CROSS-REFERENCE TO RELATED APPLICATIONS

This application is a Continuation application of patent application Ser. No. 13/984,807, filed on Aug. 9, 2013, which is a 371 application of Application No. PCT/JP2012/053172, filed on Feb. 10, 2012, which is based on Japanese Application Nos. 2011-027523 and 2011-139850, filed on Feb. 10, 2011 and Jun. 23, 2011, respectively, the entire contents of which are hereby incorporated by reference.

TECHNICAL FIELD

The present invention relates to an intermediate film for laminated glass used in laminated glass for automobiles, buildings and the like. More specifically, the present invention relates to an intermediate film for laminated glass which contains a polyvinyl acetal resin and a plasticizer, and a laminated glass using the intermediate film for laminated glass.

BACKGROUND ART

Laminated glasses scatter fewer pieces of broken glass when they are damaged by external impact, and thus are excellently safe. Therefore, such laminated glasses are widely used in automobiles, railway carriages, aircrafts, ships, buildings, and the like. The laminated glass is produced by interposing an intermediate film between a pair of glass plates.

In order to reduce the weight of a laminated glass, studies have recently been performed for making a laminated glass thin. A thinner laminated glass, however, has a reduced sound-insulating property. If a laminated glass with a reduced sound-insulating property is used for the windshield of an automobile, its sound-insulating property is disadvantageously insufficient against sounds at a register of about 5,000 Hz, such as wind noise and driving sound of wipers.

Then, additional studies have been performed for increasing the sound-insulating property of a laminated glass by changing materials of an intermediate film.

Patent Document 1 discloses, as one example of an intermediate film for laminated glass, a sound-insulating layer including 100 parts by weight of a polyvinyl acetal resin with a degree of acetalization of 60 to 85 mol %, 0.001 to 1.0 parts by weight of at least one metal salt selected from alkali metal salts and alkaline earth metal salts, and 30 parts by weight or more of a plasticizer. This sound-insulating layer can be used alone as an intermediate film, or can be laminated with another layer and used as a multilayer intermediate film.

RELATED ART DOCUMENT

Patent Document

Patent Document 1: JP 2007-070200 A

SUMMARY OF THE INVENTION

Problems to be Solved by the Invention

In the case of a laminated glass including the intermediate film disclosed in Patent Document 1, the sound-insulating property is increased to some extent. However, the sound-insulating property is still needed to be increased.

In the case of forming a laminated glass using the intermediate film disclosed in Patent Document 1, the sound-insulating property of the laminated glass in a relatively high frequency range is insufficient, and thus reduction in the sound-insulating property due to the coincidence effect cannot be avoided in some cases. In particular, the sound-insulating property of the laminated glass at around 20° C. may be insufficient.

Here, the coincidence effect is a phenomenon that, when sound waves strike a glass plate, the transverse wave is propagated on the glass surface due to the rigidity and inertia of the glass plate, and then the transverse wave resonates with the incident sound, so that the sound is transmitted.

Further, in the case of forming a laminated glass using a multilayer intermediate film disclosed in Patent Document 1 in which the sound-insulating layer and other layers are laminated, the sound-insulating property of the laminated glass at around 20° C. can be improved to some extent. In this case, however, the multilayer intermediate film has the sound-insulating layer, and thus bubble formation may occur in the laminated glass including the multilayer intermediate film.

Furthermore, recently, it has been studied to increase the amount of a plasticizer contained in an intermediate film in order to improve the sound-insulating property of a laminated glass. As the amount of a plasticizer in an intermediate film increases, the sound-insulating property of the laminated glass can be improved. If the amount of a plasticizer increases, however, bubble formation may occur in the laminated glass.

An object of the present invention is to provide an intermediate film for laminated glass which can improve the sound-insulating property when used in a laminated glass, and a laminated glass comprising the intermediate film for laminated glass.

A limitative object of the present invention is to provide an intermediate film for laminated glass which can provide a laminated glass that not only has a high sound-insulating property but also suppresses bubble formation and bubble growth, and a laminated glass comprising the intermediate film for laminated glass.

Means for Solving the Problems

According to a broad aspect of the present invention, provided is an intermediate film for laminated glass having a layered structure including at least two layers, including: a first layer containing a polyvinyl acetal resin and a plasticizer; and a second layer positioned on a first surface of the first layer, wherein, in a phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting a first coordinate (degree of acetalization:degree of acetylation:hydroxy group content=70 mol %:30 mol %:0 mol %), a second coordinate (degree of acetalization:degree of acetylation:hydroxy group content=34 mol %:30 mol %:36 mol %), a third coordinate (degree of acetalization:degree of acetylation:hydroxy group content=94 mol %:0 mol %:6 mol %), and a fourth coordinate (degree of acetalization:degree of acetylation:hydroxy group content=100 mol %:0 mol %:0 mol %) in the stated order.

According to a specific aspect of the intermediate film for laminated glass of the present invention, in the phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting the first coordinate (degree of acetalization:degree of acetylation:hydroxy group content=70 mol %:30 mol %:0 mol %), the second coordinate (degree of acetalization:degree of acetylation:hydroxy group content=34 mol %:30 mol %:36 mol %), a fifth coordinate (degree of acetalization:degree of acetylation:hydroxy group content=95 mol %:0 mol %:5 mol %), and the fourth coordinate (degree of acetalization: degree of acetylation:hydroxy group content=100 mol %:0 mol %:0 mol %) in the stated order.

According to a specific aspect of the intermediate film for laminated glass of the present invention, in the phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting the first coordinate (degree of acetalization:degree of acetylation:hydroxy group content=70 mol %:30 mol %:0 mol %), the second coordinate (degree of acetalization:degree of acetylation:hydroxy group content=34 mol %:30 mol %:36 mol %), the third coordinate (degree of acetalization:degree of acetylation:hydroxy group content=94 mol %:0 mol %:6 mol %), and a sixth coordinate (degree of acetalization: degree of acetylation:hydroxy group content=95 mol %:5 mol %:0 mol %) in the stated order.

According to a specific aspect of the intermediate film for laminated glass of the present invention, in the phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting the first coordinate (degree of acetalization:degree of acetylation:hydroxy group content=70 mol %:30 mol %:0 mol %), the second coordinate (degree of acetalization:degree of acetylation:hydroxy group content=34 mol %:30 mol %:36 mol %), a fifth coordinate (degree of acetalization:degree of acetylation:hydroxy group content=95 mol %:0 mol %:5 mol %), and a sixth coordinate (degree of acetalization: degree of acetylation:hydroxy group content=95 mol %:5 mol %:0 mol %) in the stated order.

According to a specific aspect of the intermediate film for laminated glass of the present invention, a peak temperature of tan δ which appears at the lowest temperature measured at a frequency of 1 Hz is 0° C. or lower.

According to a specific aspect of the intermediate film for laminated glass of the present invention, a maximum value of tan δ at a peak temperature of tan δ measured at a frequency of 1 Hz which appears at the lowest temperature is 1.15 or more.

According to a specific aspect of the intermediate film for laminated glass of the present invention, the second layer contains a polyvinyl acetal resin, and a carbon number of the acetal group of the polyvinyl acetal resin contained in the second layer is 3 or 4, a degree of acetalization thereof is not less than 60 mol % but not more than 75 mol %, and a degree of acetylation thereof is 10 mol % or less.

According to a specific aspect of the intermediate film for laminated glass of the present invention, the second layer contains a polyvinyl acetal resin and a plasticizer, and the amount of the plasticizer for 100 parts by weight of the polyvinyl acetal resin in the second layer is smaller than the amount of the plasticizer for 100 parts by weight of the polyvinyl acetal resin in the first layer.

According to a specific aspect of the intermediate film for laminated glass of the present invention, the second layer contains a polyvinyl acetal resin and a plasticizer, and the amount of the plasticizer for 100 parts by weight of the polyvinyl acetal resin in the second layer is not less than 10 parts but not more than 45 parts by weight.

According to a specific aspect of the intermediate film for laminated glass of the present invention, a ratio of the thickness of the first layer to the thickness of the second layer is not less than 0.2 but not more than 1.

According to a specific aspect of the intermediate film for laminated glass of the present invention, the second layer is laminated on the first surface of the first layer.

According to a specific aspect of the intermediate film for laminated glass of the present invention, the second layer contains a polyvinyl acetal resin, the amount of the plasticizer for 100 parts by weight of the polyvinyl acetal resin in the first layer is 50 parts by weight or more, a hydroxy group content of the polyvinyl acetal resin in the first layer is smaller than a hydroxy group content of the polyvinyl acetal resin in the second layer, a difference between the hydroxy group content of the polyvinyl acetal resin in the first layer and the hydroxy group content of the polyvinyl acetal resin in the second layer is 9.2 mol % or less, and a degree of acetylation of the polyvinyl acetal resin in the first layer is 8 mol % or less if a difference between the hydroxy group content of the polyvinyl acetal resin in the first layer and the hydroxy group content of the polyvinyl acetal resin in the second layer is larger than 8.5 mol % but not larger than 9.2 mol %.

According to a specific aspect of the intermediate film for laminated glass of the present invention, the polyvinyl acetal resin in the first layer contains a high molecular weight component having an absolute molecular weight of one million or more, and a proportion of the high molecular weight component in the polyvinyl acetal resin in the first layer is 7.4% or more; or the polyvinyl acetal resin in the first layer contains a high molecular weight component having a molecular weight in terms of polystyrene of one million or more, and a proportion of the high molecular weight component in the polyvinyl acetal resin in the first layer is 9% or more.

According to a specific aspect of the intermediate film for laminated glass of the present invention, in the case that the first layer is used as a resin film and a viscoelasticity of the resin film is measured, a ratio (G' (Tg+80)/G' (Tg+30)) of an elastic modulus G' (Tg+80) at (Tg+80)° C. to an elastic modulus G' (Tg+30) at (Tg+30)° C. is 0.65 or more, provided that Tg (° C.) represents a glass transition temperature of the resin film.

According to a specific aspect of the intermediate film for laminated glass of the present invention, in the case that a resin film contains 100 parts by weight of the polyvinyl acetal resin contained in the first layer and 60 parts by weight of triethylene glycol di-2-ethylhexanoate as a plasticizer and a viscoelasticity of the resin film is measured, a ratio (G' (Tg+80)/G' (Tg+30)) of an elastic modulus G' (Tg+80) at (Tg+80)° C. to an elastic modulus G' (Tg+30) at (Tg+30)° C. is 0.65 or more, provided that Tg (° C.) represents a glass transition temperature of the resin film.

According to a specific aspect of the intermediate film for laminated glass of the present invention, the polyvinyl acetal resin in the first layer is obtained by acetalizing a polyvinyl alcohol resin having an average degree of polymerization of more than 3000.

According to a specific aspect of the intermediate film for laminated glass of the present invention, the intermediate film further includes a third layer positioned on a second surface that is an opposite side of the first surface of the first layer.

According to a specific aspect of the intermediate film for laminated glass of the present invention, the third layer contains a polyvinyl acetal resin, and a carbon number of the acetal group of the polyvinyl acetal resin contained in the third layer is 3 or 4, a degree of acetalization thereof is not less than 60 mol % but not more than 75 mol %, and a degree of acetylation thereof is 10 mol % or less.

According to a specific aspect of the intermediate film for laminated glass of the present invention, the third layer contains a polyvinyl acetal resin and a plasticizer, and the amount of the plasticizer for 100 parts by weight of the polyvinyl acetal resin in the third layer is smaller than the amount of the plasticizer for 100 parts by weight of the polyvinyl acetal resin in the first layer.

According to a specific aspect of the intermediate film for laminated glass of the present invention, the third layer contains a polyvinyl acetal resin and a plasticizer, and the amount of the plasticizer for 100 parts by weight of the polyvinyl acetal resin in the third layer is not less than 10 parts but not more than 45 parts by weight.

According to a specific aspect of the intermediate film for laminated glass of the present invention, a ratio of the thickness of the first layer to the total thickness of the second layer and the third layer is not less than 0.1 but not more than 0.5.

According to a specific aspect of the intermediate film for laminated glass of the present invention, the third layer is laminated on the second surface of the first layer.

A laminated glass according to the present invention includes: a first component for laminated glass; a second component for laminated glass; and an intermediate film interposed between the first component for laminated glass and the second component for laminated glass, wherein the intermediate film is the intermediate film for laminated glass formed in accordance with the present invention.

Effect of the Invention

The intermediate film for laminated glass according to the present invention includes: a first layer containing a polyvinyl acetal resin and a plasticizer; and a second layer positioned on a first surface of the first layer. In a phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting a first coordinate (degree of acetalization:degree of acetylation:hydroxy group content=70 mol %:30 mol %:0 mol %), a second coordinate (degree of acetalization:degree of acetylation:hydroxy group content=34 mol %:30 mol %:36 mol %), a third coordinate (degree of acetalization:degree of acetylation:hydroxy group content=94 mol %:0 mol %:6 mol %), and a fourth coordinate (degree of acetalization: degree of acetylation:hydroxy group content=100 mol %:0 mol %:0 mol %) in the stated order. Accordingly, in a laminated glass including the intermediate film for laminated glass of the present invention, a sound-insulating property in a high frequency range can be enhanced.

BRIEF DESCRIPTION OF DRAWINGS

FIG. 1 is a phase diagram of three values including a degree of acetalization, a degree of acetylation, and a hydroxy group content of a polyvinyl acetal resin contained in a first layer of an intermediate film for laminated glass according to the present invention, and shows a region indicated by the values of the degree of acetalization, the degree of acetylation, and the hydroxy group content.

FIG. 2 is a phase diagram of three values including a degree of acetalization, a degree of acetylation, and a hydroxy group content of the polyvinyl acetal resin contained in the first layer of the intermediate film for laminated glass according to the present invention, and shows a preferable region indicated by the values of the degree of acetalization, the degree of acetylation, and the hydroxy group content.

FIG. 3 is a phase diagram of three values including a degree of acetalization, a degree of acetylation, and a hydroxy group content of the polyvinyl acetal resin contained in the first layer of the intermediate film for laminated glass according to the present invention, and shows a preferable region indicated by the values of the degree of acetalization, the degree of acetylation, and the hydroxy group content.

FIG. 4 is a phase diagram of three values including a degree of acetalization, a degree of acetylation, and a hydroxy group content of the polyvinyl acetal resin contained in the first layer of the intermediate film for laminated glass according to the present invention, and shows a preferable region indicated by the values of the degree of acetalization, the degree of acetylation, and the hydroxy group content.

FIG. 5 is a partially cutaway cross-sectional view schematically illustrating an intermediate film for laminated glass according to one embodiment of the present invention.

FIG. 6 is a partially cutaway cross-sectional view schematically illustrating one example of a laminated glass including the intermediate film for laminated glass illustrated in FIG. 5.

FIG. 7 is a phase diagram of three values including a degree of acetalization, a degree of acetylation, and a hydroxy group content of a polyvinyl acetal resin contained in a first layer of each of intermediate films for laminated glass of Examples 1 to 7 and Comparative Example 1, and indicates values of the degree of acetalization, the degree of acetylation, and the hydroxy group content.

FIG. 8 is a phase diagram of three values including a degree of acetalization, a degree of acetylation, and a hydroxy group content of a polyvinyl acetal resin contained in a first layer of each of intermediate films for laminated glass of Examples 8 to 14 and Comparative Example 2, and indicates values of the degree of acetalization, the degree of acetylation, and the hydroxy group content.

FIG. 9 is a phase diagram of three values including a degree of acetalization, a degree of acetylation, and a hydroxy group content of a polyvinyl acetal resin contained in a first layer of each of intermediate films for laminated glass of Examples 15 to 35 and Comparative Examples 3 and 4, and indicates values of the degree of acetalization, the degree of acetylation, and the hydroxy group content.

FIG. 10 is a view for explaining a relation between the loss factor tan δ and the temperature and a relation between the elastic modulus G' and the temperature in the case that a resin film contains the polyvinyl acetal resin contained in the first layer and triethylene glycol di-2-ethylhexanoate and a viscoelasticity of the resin film is measured.

MODE(S) FOR CARRYING OUT THE INVENTION

The following will specifically discuss the present invention.

An intermediate film for laminated glass according to the present invention has a layered structure including at least two layers. The intermediate film for laminated glass according to the present invention includes a first layer containing a polyvinyl acetal resin (hereinafter, also referred to as a polyvinyl acetal resin (1)) and a plasticizer (hereinafter, also referred to as a plasticizer (1)), and a second layer positioned on a first surface side of the first layer. The intermediate film for laminated glass according to the present invention may be an intermediate film for laminated glass having a layered structure of two layers including only the first layer and the second layer, or may be an intermediate film for laminated glass having a layered structure of three or more layers including the first layer, the second layer, and other layer(s).

In the case of the intermediate film for laminated glass according to the present invention, in a phase diagram of three values including a degree X of acetalization, a degree Y of acetylation, and a hydroxy group content Z of the polyvinyl acetal resin (1) in the first layer (the phase diagram of three values in FIG. 1), the values of the degree X of acetalization, the degree Y of acetylation, and the hydroxy group content Z are each fall within a region R1 surrounded by a line L1 including four straight lines connecting a first coordinate A, a second coordinate B, a third coordinate C, and a fourth coordinate D (described later) in the stated order.

The first coordinate A (degree X of acetalization:degree Y of acetylation:hydroxy group content Z=70 mol %:30 mol %:0 mol %)

The second coordinate B (degree X of acetalization: degree Y of acetylation:hydroxy group content Z=34 mol %:30 mol %:36 mol %)

The third coordinate C (degree X of acetalization:degree Y of acetylation:hydroxy group content Z=94 mol %:0 mol %:6 mol %)

The fourth coordinate D (degree X of acetalization:degree Y of acetylation:hydroxy group content Z=100 mol %:0 mol %:0 mol %)

The line L1 includes four straight lines of a straight line connecting the first coordinate A and the second coordinate B, a straight line connecting the second coordinate B and the third coordinate C, a straight line connecting the third coordinate C and the fourth coordinate D, and a straight line connecting the fourth coordinate D and the first coordinate A.

In the case of the intermediate film for laminated glass according to the present invention, in the phase diagram of three values illustrated in FIG. 1, the values of the degree X of acetalization, the degree Y of acetylation, and the hydroxy group content Z of the polyvinyl acetal resin (1) each fall within the region R1 surrounded by the line L1 illustrated in FIG. 1. The degree X of acetalization, the degree Y of acetylation, and the hydroxy group content Z of the polyvinyl acetal resin (1) each may be a value on the line L1 illustrated in FIG. 1.

According to the main feature of the present invention, a first layer containing a polyvinyl acetal resin (1) and a plasticizer (1), and a second layer positioned on a first surface side of the first layer are provided, and in the phase diagram of three values illustrated in FIG. 1, the values of the degree X of acetalization, the degree Y of acetylation, and the hydroxy group content Z of the polyvinyl acetal resin (1) contained in the first layer each fall within the region R1 surrounded by the line L1 illustrated in FIG. 1.

In recent years, fuel automobiles using internal-combustion engines are being switched over to electric vehicles using electric motors, hybrid electric vehicles using internal-combustion engines and electric motors, and the like. Laminated glasses used for fuel automobiles using internal-combustion engines are particularly required to have a sound-insulating property against sounds in a relatively low frequency range. Of course, it is preferable that laminated glasses used for fuel automobiles using internal-combustion engines also have a high sound-insulating property against sounds in a high frequency range. In contrast, laminated glasses used for electric vehicles and hybrid electric vehicles utilizing electric motors are particularly required to have a high sound-insulating property against sounds in a high frequency range in order to effectively insulate driving sounds of their electric motors.

The present inventors found that the sound-insulating property of a laminated glass in a high frequency range is effectively and sufficiently increased when the values of the degree X of acetalization, the degree Y of acetylation, and the hydroxy group content Z of the polyvinyl acetal resin (1) contained in the first layer each fall within the region R1.

Especially, a first layer containing the polyvinyl acetal resin (1) that has values of the degree X of acetalization, the degree Y of acetylation, and the hydroxy group content Z within the region R1 enhances the sound-insulating property in a temperature range of 20 to 30° C.

In the region R1, the degree Y of acetylation of the polyvinyl acetal resin (1) is 30 mol % or less. When the degree Y of acetylation is 30 mol % or less, productivity of the polyvinyl acetal resin (1) is improved.

From the standpoint of further enhancing the sound-insulating property of an intermediate film and a laminated glass, in a phase diagram of three values including the degree X of acetalization, the degree Y of acetylation, and the hydroxy group content Z of the polyvinyl acetal resin (1) (phase diagram of three values illustrated in FIG. 2), the values of the degree X of acetalization, the values of the degree Y of acetylation, and the hydroxy group content Z each preferably fall within a region R2 surrounded by a line L2 including four straight lines connecting the first coordinate A, the second coordinate B, a fifth coordinate E (described later), and the fourth coordinate D in the stated order.

The fifth coordinate E (degree of acetalization:degree of acetylation:hydroxy group content=95 mol %:0 mol %:5 mol %)

The line L2 includes four straight lines of a straight line connecting the first coordinate A and the second coordinate B, a straight line connecting the second coordinate B and the fifth coordinate E, a straight line connecting the fifth coordinate E and the fourth coordinate D, and a straight line connecting the fourth coordinate D and the first coordinate A.

In the case of the intermediate film for laminated glass according to the present invention, in the phase diagram of three values illustrated in FIG. 2, values of the degree X of acetalization, the degree Y of acetylation, and the hydroxy group content Z of the polyvinyl acetal resin (1) each preferably fall within the region R2 surrounded by the line L2 illustrated in FIG. 2. The degree X of acetalization, the degree Y of acetylation, and the hydroxy group content Z of the polyvinyl acetal resin (1) each may be a value on the line L2.

From the standpoint of further enhancing the sound-insulating property of an intermediate film and a laminated glass, in the phase diagram of three values including the degree X of acetalization, the degree Y of acetylation, and the hydroxy group content Z of the polyvinyl acetal resin (1) (phase diagram of three values illustrated in FIG. 3), the values of the degree X of acetalization, the degree Y of acetylation, and the hydroxy group content Z each preferably fall within a region R3 surrounded by a line L3 including four straight lines connecting the first coordinate A, the second coordinate B, the third coordinate C, and a sixth coordinate F (described later) in the stated order.

The sixth coordinate F (degree of acetalization:degree of acetylation:hydroxy group content=95 mol %:5 mol %:0 mol %)

The line L3 includes four straight lines of a straight line connecting the first coordinate A and the second coordinate B, a straight line connecting the second coordinate B and the third coordinate C, a straight line connecting the third coordinate C and the sixth coordinate F, and a straight line connecting the sixth coordinate F and the first coordinate A.

In the case of the intermediate film for laminated glass according to the present invention, in the phase diagram of three values illustrated in FIG. 3, the values of the degree X of acetalization, the degree Y of acetylation, and the hydroxy group content Z of the polyvinyl acetal resin (1) each preferably fall within the region R3 surrounded by the line L3 illustrated in FIG. 3. The degree X of acetalization, the degree Y of acetylation, and the hydroxy group content Z of the polyvinyl acetal resin (1) each may be a value on the line L3 illustrated in FIG. 3.

In the region R3, the degree X of acetalization of the polyvinyl acetal resin (1) is 95 mol % or less, and may be 94 mol % or less. When the degree X of acetalization is 95 mol % or less, the productivity of the polyvinyl acetal resin (1) is improved.

From the standpoint of further enhancing the sound-insulating property of an intermediate film and a laminated glass, in the diagram of three values including the degree X of acetalization, the degree Y of acetylation, and the hydroxy group content Z of the polyvinyl acetal resin (1) (phase diagram of three values illustrated in FIG. 4), the values of the degree X of acetalization, the degree Y of acetylation, and the hydroxy group content Z each preferably fall within a region R4 surrounded by a line L4 including four straight lines connecting the first coordinate A, the second coordinate B, the fifth coordinate E, and the sixth coordinate F in the stated order.

The line L4 includes four straight lines of a straight line connecting the first coordinate A and the second coordinate B, a straight line connecting the second coordinate B and the fifth coordinate E, a straight line connecting the fifth coordinate E and the sixth coordinate F, and a straight line connecting the sixth coordinate F and the first coordinate A.

In the case of the intermediate film for laminated glass of the present invention, in the phase diagram of three values illustrated in FIG. 4, the values of the degree X of acetalization, the degree Y of acetylation, the hydroxy group content Z of the polyvinyl acetal resin each preferably fall within the region R4 surrounded by the line L4 illustrated in FIG. 4. The degree X of acetalization, the degree Y of acetylation, and the hydroxy group content Z of the polyvinyl acetal resin (1) each may be a value on the line L4 illustrated in FIG. 4.

In the region R4, the degree X of acetalization of the polyvinyl acetal resin (1) is 95 mol % or less. When the degree X of acetalization is 95 mol % or less, the productivity of the polyvinyl acetal resin (1) is improved.

In the following, the present invention is specifically described with reference to drawings by means of specific embodiments and examples of the present invention.

FIG. 5 illustrates a partially cutaway cross-sectional view schematically illustrating a laminated glass including an intermediate film for laminated glass according to one embodiment of the present invention.

An intermediate film 1 illustrated in FIG. 5 is a multilayer intermediate film. The intermediate film 1 is used for production of a laminated glass. The intermediate film 1 is an intermediate film for laminated glass. The intermediate film 1 includes a first layer 2, a second layer 3 positioned on the side of a first surface 2a of the first layer 2, and a third layer 4 positioned on the side of a second surface 2b of the first layer 2 which is an opposite side of the first surface 2a. The second layer 3 is laminated on the first surface 2a of the first layer 2. The third layer 4 is laminated on the second surface 2b of the first layer 2. The first layer 2 is an intermediate layer and mainly functions as a sound-insulating layer. The second layer 3 and the third layer 4 are protective layers and are surface layers in the present embodiment. The first layer 2 is positioned between the second layer 3 and the third layer 4. The first layer 2 is interposed between the second layer 3 and the third layer 4. Accordingly, the intermediate film 1 has a multilayer structure in which the second layer 3, the first layer 2, and the third layer 4 are laminated in the stated order.

It is to be noted that other layers may be laminated between the first layer 2 and the second layer 3, and between the first layer 2 and the third layer 4. Preferably, the second layer 3 is directly laminated on the first layer 2, and the first layer 2 is directly laminated on the third layer 4. Examples of other layers include a layer containing a thermoplastic resin such as polyvinyl acetal resin, and a layer containing polyethylene terephthalate and the like.

The first layer 2 contains the polyvinyl acetal resin (1) and the plasticizer (1). The second layer 3 contains preferably a thermoplastic resin, more preferably a polyvinyl acetal resin, and still more preferably a polyvinyl acetal resin and a plasticizer. The third layer 4 contains preferably a thermoplastic resin, more preferably a polyvinyl acetal resin, and still more preferably a polyvinyl acetal resin and a plasticizer. It is preferred that the composition of the first layer 2 is different from each composition of second layer 3 and the third layer 4. The compositions of the second layer 3 and the third layer 4 may be the same as or different from each other.

In the case of the intermediate film 1, the values of the degree X of acetalization, the degree Y of acetylation, and the hydroxy group content Z of the polyvinyl acetal resin (1) contained in the first layer 2 each fall within the region R1, and therefore, the sound-insulating property of a laminated glass including the intermediate film 1 in a high frequency range can be enhanced. In the case of the intermediate film 1, the values of the degree X of acetalization, the degree Y of acetylation, and the hydroxy group content Z of the polyvinyl acetal resin (1) contained in the first layer 2 each fall within the region R2, R3, or R4, and therefore, the sound-insulating property of a laminated glass including the intermediate film 1 in a high frequency range can be further enhanced and the productivity of the intermediate film 1 is improved.

In the intermediate film 1, the second layer 3 and the third layer 4 are laminated on the faces of the first layer 2. A second layer is positioned on the side of a first surface of a first layer, and the second layer is preferably laminated on the first surface of the first layer. The second layer may be positioned only on the side of the first surface of the first layer and a third layer may not be positioned on the side of a second surface of the first layer. Preferably, the second layer is positioned on the side of the first surface of the first layer and the third layer is positioned on the side of the second surface of the first layer. The third layer is preferably laminated on the second surface of the first layer. When the third layer is laminated on the second surface of the first layer, the penetration resistance of a laminated glass including the intermediate film 1 can be further enhanced.

In an intermediate film for laminated glass having a multilayer structure in which the sound-insulating property is enhanced, bubble formation may easily occur in a laminated glass. In studies for solving such a problem, the present inventors found the following. In an intermediate film for laminated glass having a multilayer structure, a plasticizer migrates among layers, leading to formation of a layer having a large plasticizer content. For example, a plasticizer may migrate from a second layer and a third layer to a first layer to increase the plasticizer content of the first layer. Moreover, if a layer having a large plasticizer content is formed, namely, the plasticizer content of the first layer increases, bubble formation is likely to occur in a laminated glass including the intermediate film for laminated glass, and bubble formation once occurs, the generated bubbles tend to serve as cores and thereby to cause bubble growth.

From the standpoint of suppressing bubble formation and bubble growth in the laminated glass, the following conditions are preferable. Namely, preferably, the amount of the plasticizer for 100 parts by weight of the polyvinyl acetal resin in the first layer 2 is 50 parts by weight or more, the hydroxy group content of the polyvinyl acetal resin in the first layer 2 is smaller than the hydroxy group content of the polyvinyl acetal resin in the second layer 3, a difference (hereinafter, also referred to as difference (1–2) in content) between the hydroxy group content of the polyvinyl acetal resin in the first layer 2 and the hydroxy group content of the polyvinyl acetal resin in the second layer 3 is 9.2 mol % or less, and the degree of acetylation of the polyvinyl acetal resin in the first layer 2 is 8 mol % or less if a difference (difference (1–2) in content) between the hydroxy group content of the polyvinyl acetal resin in the first layer 2 and the hydroxy group content of the polyvinyl acetal resin in the second layer 3 is not less than 8.5 mol % but not more than 9.2 mol %. The difference (1–2) in content may be more than 8.5 mol % but not more than 9.2 mol %, and further may be 8.5 mol % or less.

Also preferably, the hydroxy group content of the polyvinyl acetal resin in the first layer 2 is smaller than the hydroxy group content of the polyvinyl acetal resin in the third layer 4, a difference (hereinafter, also referred to as difference (1–3) in content) between the hydroxy group content of the polyvinyl acetal resin in the first layer 2 and the hydroxy group content of the polyvinyl acetal resin in the third layer 4 is 9.2 mol % or less, and the degree of acetylation of the polyvinyl acetal resin in the first layer 2 is 8 mol % or less if the difference (difference (1–3) in content) between the hydroxy group content of the polyvinyl acetal resin in the first layer 2 and the hydroxy group content of the polyvinyl acetal resin in the third layer 4 is more than 8.5 mol % but not more than 9.2 mol %. Even though the difference (1–3) in content is 8.5 mol % or less, when the difference (1–2) in content is more than 8.5 mol % but not more than 9.2 mol %, the degree of acetylation of the polyvinyl acetal resin in the first layer 2 is preferably 8 mol % or less. The difference (1–3) in content may be more than 8.5 mol % but not more than 9.2 mol %, and further may be 8.5 mol % or less.

As a result of the intensive studies for suppressing bubble formation and bubble growth, the present inventors found that controlling the hydroxy group content of the polyvinyl acetal resin in each of the first layer, the second layer and the third layer as mentioned above sufficiently suppresses bubble formation and bubble growth in a laminated glass. Since migration of a plasticizer is suppressed and bubble formation and bubble growth are sufficiently suppressed in a laminated glass, the plasticizer content of each layer, especially the plasticizer content of the first layer 2, can be increased. Accordingly, the sound-insulating property of a laminated glass is further enhanced.

If the amount of the plasticizer for 100 parts by weight of the polyvinyl acetal resin in the first layer 2 is larger than the amount of the plasticizer for 100 parts by weight of the polyvinyl acetal resin in each of the second layer 3 and the third layer 4, bubble formation is more likely to occur. Further, bubble formation once occurs, the generated bubbles tend to serve as cores and thereby to cause bubble growth. In contrast, controlling the hydroxy group content of the polyvinyl acetal resin in each of the first layer, the second layer and the third layer as mentioned above sufficiently suppresses bubble formation and bubble growth in a laminated glass.

From the standpoint of further suppressing bubble formation and bubble growth in a laminated glass, the lower limit of each of the differences (difference (1–2) in content and difference (1–3) in content) between the hydroxy group content of the polyvinyl acetal resin in the first layer 2 and each of the hydroxy group contents of the polyvinyl acetal resin in the second layer 3 and the third layer 4 is preferably 0.1 mol %, more preferably 1 mol %, and still more preferably 2 mol %, whereas the upper limit thereof is preferably 8.5 mol %, more preferably 7.8 mol %, still more preferably 7 mol %, and particularly preferably 5.6 mol %. Since bubble formation and bubble growth in a laminated glass are further suppressed, the lower limit of each of the differences (difference (1–2) in content and difference (1–3) in content) between the hydroxy group content of the polyvinyl acetal resin in the first layer 2 and each of the hydroxy group contents of the polyvinyl acetal resin in the second layer 3 and the third layer 4 is preferably 5 mol % or less, more preferably 4.5 mol % or less, still more preferably 4 mol % or less, and particularly preferably 3.5 mol % or less.

Preferably, the polyvinyl acetal resin in the first layer 2 contains a high molecular weight component (hereinafter, also referred to as a high molecular weight component X) having an absolute molecular weight of one million or more, or the polyvinyl acetal resin in the first layer 2 contains a high molecular weight component (hereinafter, also referred to as a high molecular weight component Y) having a molecular weight in terms of polystyrene (hereinafter, also referred to as a molecular weight y) of one million or more. The high molecular weight component X and the high molecular weight component Y are polyvinyl acetal resins. Preferably, the proportion of the high molecular weight component X in the polyvinyl acetal resin in the first layer 2 is 7.4% or more, or the proportion of the high molecular weight component Y in the polyvinyl acetal resin in the first layer 2 is 9% or more.

When the high molecular weight component X having an absolute molecular weight of one million or more in the polyvinyl acetal resin in the first layer 2 is the specific proportion, bubble formation in a laminated glass is suppressed. Also, when the high molecular weight component Y having a molecular weight y of one million or more in the polyvinyl acetal resin in the first layer 2 is the specific proportion, bubble formation in a laminated glass is suppressed.

The proportion of the high molecular weight component X in the polyvinyl acetal resin in the first layer 2 is defined by a value in a percentage (%) indicating a proportion of the area of a region corresponding to the high molecular weight component X in the peak area of the polyvinyl acetal resin element which is obtained in measurement of the absolute molecular weight. The proportion of the high molecular weight component Y in the polyvinyl acetal resin in the first layer 2 is defined by a value in percentage (%) indicating an area of a region corresponding to the high molecular weight component Y in the peak area of the polyvinyl acetal resin element which is obtained in measurement of the molecular weight in terms of polystyrene.

Compositions of the second layer 3 and the third layer 4 each are preferably different from the composition of the first layer 2. The polyvinyl acetal resin in each of the second layer 3 and the third layer 4 may contain a high molecular weight component X having an absolute molecular weight of one million or more, and the proportion of the high molecular weight component X in the polyvinyl acetal resin in each of the second layer 3 and the third layer 4 may be 7.4% or more. Alternatively, the polyvinyl acetal resin in each of the second layer 3 and the third layer 4 may contain a high molecular weight component Y having a molecular weight y of one million or more, and the proportion of the high molecular weight component Y in the polyvinyl acetal resin in each of the second layer 3 and the third layer 4 may be 9% or more.

From the standpoint of further enhancing the sound-insulating property of the laminated glass and further suppressing bubble formation and bubble growth, the lower limit of the proportion of the high molecular weight component X having an absolute molecular weight of one million or more in the polyvinyl acetal resin in the first layer 2 is preferably 8%, more preferably 8.5%, still more preferably 9%, particularly preferably 9.5%, and most preferably 10%. Since the sound-insulating property of the laminated glass can be further enhanced and bubble formation and bubble growth are further suppressed, the proportion of the high molecular weight component X is preferably 11% or more, more preferably 12% or more, still more preferably 14% or more, and particularly preferably 16% or more. The upper limit of the proportion of the high molecular weight component X is, though not particularly limited, preferably 40%, more preferably 30%, and still more preferably 25%.

In the case where the polyvinyl acetal resin in the first layer 2 contains the high molecular weight component Y having a molecular weight y of one million or more, the lower limit of the proportion of high molecular weight component Y having a molecular weight y of one million or more in the polyvinyl acetal resin in the first layer 2 that contains the high molecular weight component Y is preferably 10%, more preferably 11%, still more preferably 11.5%, and particularly preferably 12%. Since the sound-insulating property of a laminated glass is further enhanced and bubble formation and bubble growth are further suppressed, the proportion of the high molecular weight component Y is preferably 12.5% or more, more preferably 13.5% or more, still more preferably 14% or more, particularly preferably 15% or more, and most preferably 18% or more. The upper limit of the proportion of the high molecular weight component Y is, though not particularly limited, preferably 40%, more preferably 30%, and still more preferably 25%. When the proportion of the high molecular weight component Y satisfies the above lower limit, the sound-insulating property of the laminated glass is further enhanced, and bubble formation and bubble growth are further suppressed.

In the case that a resin film A contains 100 parts by weight of the polyvinyl acetal resin contained in the first layer 2 and 60 parts by weight of triethylene glycol di-2-ethylhexanoate (3GO) as a plasticizer and a viscoelasticity of the resin film A is measured (test method A), a ratio (G' (Tg+80)/G' (Tg+30)) of an elastic modulus G' (Tg+80) at (Tg+80)° C. to an elastic modulus G' (Tg+30) at (Tg+30)° C. is preferably 0.65 or more, provided that Tg (° C.) represents a glass transition temperature of the resin film A.

In the case that the first layer is used as a resin film and a viscoelasticity of the resin film B is measured (test method B), a ratio (G' (Tg+80)/G' (Tg+30)) of an elastic modulus G' (Tg+80) at (Tg+80)° C. to an elastic modulus G' (Tg+30) at (Tg+30)° C. is preferably 0.65 or more, provided that Tg (° C.) represents a glass transition temperature of the resin film B.

In the test method B, the first layer 2 is used as the resin film B, and the first layer 2 itself is the resin film B.

The resin film B is the first layer 2 and contains the polyvinyl acetal resin and the plasticizer at a weight ratio as that in the first layer 2. In the test method B, the elastic modulus G' (Tg+80) and the elastic modulus G' (Tg+30) are measured preferably after migration of the plasticizer in the intermediate film 1 for laminated glass. In the test method B, the elastic modulus G' (Tg+80) and the elastic modulus G' (Tg+30) are measured preferably after storage of the intermediate film 1 for laminated glass at a humidity of 30% (±3%) and at a temperature of 23° C. for a month so that the plasticizer is migrated in the intermediate film 1 for laminated glass.

As a result of intensive studies for suppressing bubble formation and bubble growth, the present inventors found that when the ratio (G' (Tg+80)/G' (Tg+30)) in the test method A or the test method B is 0.65 or more, bubble formation and bubble growth in a laminated glass are sufficiently suppressed. Since bubble formation and bubble growth in a laminated glass are sufficiently suppressed even when the plasticizer content of the first layer 2 is large, the sound-insulating property of the laminated glass is enhanced. Especially, when the intermediate film 1 for laminated glass include the second layer 3 and the third layer 4 laminated on the faces of the first layer and the ratio (G' (Tg+80)/G' (Tg+30)) is controlled to 0.65 or more, bubble formation and bubble growth in a laminated glass using intermediate film 1 is further suppressed.

The ratio (G' (Tg+80)/G' (Tg+30)) is 0.65 or more but preferably 1.0 or less. when a ratio (G' (Tg+80)/G' (Tg+30)) is 0.65 or more, even when a laminated glass is stored under significantly severe conditions for a long time, bubble formation and bubble growth in the laminated glass are sufficiently suppressed. When a ratio (G' (Tg+80)/G' (Tg+30)) satisfies the lower limit and the upper limit, even when a laminated glass is stored under significantly severe conditions for a long time, bubble formation and bubble growth in the laminated glass are further effectively suppressed.

From the standpoint of further enhancing the sound-insulating property of a laminated glass, the amount of the plasticizer for 100 parts by weight of the polyvinyl acetal resin in the first layer 2 is preferably 40 parts by weight or more. Even when the plasticizer content in the first layer is large, bubble formation and bubble growth in the laminated glass are suppressed by forming the first layer to have a ratio (G' (Tg+80)/G' (Tg+30)) of 0.65 or more.

The glass transition temperature Tg (° C.) indicates a peak temperature of loss factor tan δ obtained from the measurement of the viscoelasticity. From the standpoint of further suppressing bubble formation and bubble growth in a laminated glass, the ratio (G' (Tg+80)/G' (Tg+30)) is more preferably not less than 0.7 but not more than 0.95, and still more preferably not less than 0.75 but not more than 0.9. Especially, in the case where the ratio (G' (Tg+80)/G' (Tg+30)) is controlled by the average degree of polymerization of the polyvinyl alcohol resin, the ratio (G' (Tg+80)/G' (Tg+30)) is preferably 0.65 or more, more preferably 0.66 or more, still more preferably 0.67 or more, and particularly preferably 0.7 or more, but is preferably 0.82 or less and more preferably 0.8 or less. In such a case, bubble formation and bubble growth in a laminated glass are sufficiently suppressed and the sound-insulating property of a laminated glass is further enhanced. Moreover, when the ratio (G' (Tg+80)/G' (Tg+30)) is 0.82 or less or 0.8 or less, an intermediate film is easily formed.

Examples of a method for controlling the ratio (G' (Tg+80)/G' (Tg+30)) to 0.65 or more in the test method A or the test method B include a method of using a polyvinyl alcohol resin with a relatively high average degree of polymerization in synthesis of a polyvinyl acetal resin in the first layer 2, and a method of enhancing the mutual influence between molecules of the polyvinyl acetal resin in the first layer 2. Examples of the method of enhancing the mutual influence between molecules of the polyvinyl acetal resin in the first layer 2 include a method of physically or chemically cross-linking molecules of the polyvinyl acetal resin. In particular, since the intermediate film 1 can be easily formed using an extruder, preferred are a method of using a polyvinyl alcohol resin with a relatively high average degree of polymerization in synthesis of a polyvinyl acetal resin in the first layer 2, and a method of physically crosslinking molecules of the polyvinyl acetal resin.

A description is given on an example of a relation between the loss factor tan δ obtained by measurement of the viscoelasticity and temperature and a relation between an elastic modulus G' and temperature, with reference to FIG. 10.

The loss factor tan δ and temperature have a relation as shown in FIG. 10. The temperature of the loss factor tan δ at a peak P is the glass transition temperature Tg.

In FIG. 10, the glass transition temperature Tg in the case of the elastic modulus G' indicated by a dashed line A2 and the glass transition temperature Tg in the case of the elastic modulus G' indicated by a solid line A1 are the same temperature. On the basis of the elastic modulus G' (Tg+30), for example, as a change D in the elastic modulus G' (Tg+80) is smaller, bubble formation and bubble growth in a laminated glass are more effectively suppressed. A change D1 in the elastic modulus G' indicated by the solid line A1 is smaller than a change D2 in the elastic modulus G' indicated by the dashed line A2. Accordingly, in FIG. 10, bubble formation and bubble growth in a laminated glass are effectively suppressed in the case of the elastic modulus G' indicated by the solid line A1 with a relatively small change D1, than in the case of the elastic modulus G' indicated by the dashed line A2 with a relatively large change D2.

The G' (Tg+30) is preferably 200,000 Pa or more. The G' (Tg+30) is more preferably 220,000 Pa or more, still more preferably 230,000 Pa or more, and particularly preferably 240,000 Pa or more, but is preferably 10,000,000 Pa or less, more preferably 5,000,000 Pa or less, sill more preferably 1,000,000 Pa or less, particularly preferably 500,000 Pa or less, and most preferably 300,000 Pa or less. When a G' (Tg+30) is equal to or higher than the above lower limit, bubble formation and bubble growth in a laminated glass are more effectively suppressed.

The relation between the elastic modulus G' and temperature is greatly influenced by the kind of the polyvinyl acetal resin, especially influenced by the average degree of polymerization of the polyvinyl alcohol resin used for obtaining the polyvinyl acetal resin, not so much influenced by the kind of the plasticizer, and not so much influenced by the amount of the plasticizer if it is within a reasonable amount as a plasticizer. In the case where a plasticizer is changed from 3GO to a plasticizer such as monobasic organic acid esters other than 3GO, especially in the case where triethylene glycol di-2-ethyl butyrate (3GH) and triethylene glycol di-n-heptanoate (3G7) are used as plasticizers, the ratio (G' (Tg+80)/G' (Tg+30)) is not so different from the ratio (G' (Tg+80)/G' (Tg+30)) in the case of using 3GO. Also, in the case where the amount of the plasticizer for 100 parts by weight of the polyvinyl acetal resin is 50 to 80 parts by weight, the ratio (G' (Tg+80)/G' (Tg+30)) is not so different. The ratio (G' (Tg+80)/G' (Tg+30)) of a resin film containing 100 parts by weight of a polyvinyl acetal resin and 60 parts by weight of triethylene glycol di-2-ethylhexanoate (3GO) as a plasticizer is not so much different from the ratio (G' (Tg+80)/G' (Tg+30)) of the first layer 2. Although the both ratios (G' (Tg+80)/G' (Tg+30)) obtained in the test method A and the test method B are preferably 0.65 or more, the ratio (G' (Tg+80)/G' (Tg+30)) obtained in the test method B is more preferably 0.65 or more.

Also, for suppressing bubble formation in an intermediate film for laminated glass, the polyvinyl acetal resin in the first layer 2 is preferably obtained by acetalization of a polyvinyl alcohol resin having an average degree of polymerization of more than 3000. In such a case, the ratio (G' (Tg+80)/G' (Tg+30)) may not be 0.65 or more, but is preferably 0.65 or more. From the standpoint of further suppressing bubble formation and bubble growth in a laminated glass, the amount of the plasticizer in the first layer 2 is preferably 40 parts by weight or more for 100 parts by weight of the polyvinyl acetal resin in the first layer 2 which is obtained by acetalization of a polyvinyl alcohol resin having an average degree of polymerization of more than 3000. Moreover, from the standpoint of further suppressing bubble formation and bubble growth in a laminated glass, the hydroxy group content of polyvinyl acetal resin in the first layer 2 which is obtained by aceralization of a polyvinyl alcohol resin having an average degree of polymerization of more than 3000 is preferably 30 mol % or less.

From the standpoint of further enhancing the sound-insulating property of a laminated glass, the amount of the plasticizer for 100 parts by weight of the polyvinyl acetal resin in the first layer 2 is preferably 40 parts by weight or more, more preferably 50 parts by weight or more, still more preferably 55 parts by weight or more, and particularly preferably 60 parts by weight or more. Even when the amount of the plasticizer in the first layer 2 is large as above, bubble formation and bubble growth in a laminated glass are more effectively suppressed by controlling the hydroxy group content of each of the polyvinyl acetal resins in the first layer, the second layer and the third layer as mentioned above, by controlling the proportion of the high molecular weight component X having an absolute molecular weight of one million or more or the proportion of the high molecular weight component Y having a molecular weight y of one million or more, or by controlling the ratio (G' (Tg+80)/G' (Tg+30)).

In the following, specific descriptions are given on the first layer, the second layer and the third layer included in the intermediate film for laminated glass according to the present invention, and on the polyvinyl acetal resins and plasticizers contained in the first layer, the second layer and the third layer.

(Thermoplastic Resin)

The first layer contains a polyvinyl acetal resin (1). The second layer preferably contains a thermoplastic resin and more preferably contains a polyvinyl acetal resin (hereinafter, also referred to as polyvinyl acetal resin (2)). The third layer preferably contains a thermoplastic resin and more preferably contains a polyvinyl acetal resin (hereinafter, also referred to as a polyvinyl acetal resin (3)). When the thermoplastic resins contained in the second layer and the third layer are the polyvinyl acetal resin (2) and the polyvinyl acetal resin (3), adhesiveness between the second layer or the third layer and components for laminated glass is sufficiently high.

Examples of the thermoplastic resins include polyvinyl acetal resin, ethylene-vinyl acetate copolymer resin, ethylene-acrylic copolymer resin, polyurethane resin, and polyvinyl alcohol resin. Thermoplastic resins other than these may be used.

The polyvinyl acetal resin (1), the polyvinyl acetal resin (2) and the polyvinyl acetal resin (3) are obtained, for example, by acetalization of polyvinyl alcohol resins with aldehydes. The polyvinyl alcohol resins are obtained, for example, by saponification of polyvinyl acetate. A degree of saponification of the polyvinyl alcohol resin is commonly within a range of 70 to 99.9 mol %, preferably within a range of 75 to 99.8 mol %, and more preferably within a range of 80 to 99.8 mol %.

An average degree of polymerization of the polyvinyl alcohol resin for obtaining each of the polyvinyl acetal resin (1), the polyvinyl acetal resin (2) and the polyvinyl acetal resin (3) is preferably 200 or more, more preferably 500 or more, still more preferably 1600 or more, particularly preferably 2600 or more, and most preferably 2700 or more, but is preferably 5000 or less, more preferably 4000 or less, and still more preferably 3500 or less. When the average degree of polymerization is equal to or higher than the lower limit, the penetration resistance of a laminated glass is further enhanced. When the average degree of polymerization is equal to or lower than the upper limit, an intermediate film is easily formed.

From the standpoint of further enhancing the penetration resistance of a laminated glass, the average degree of polymerization of the polyvinyl alcohol resin is especially preferably 2700 or more but not more than 5000.

From the standpoint of further suppressing bubble formation and bubble growth in a laminated glass, the lower limit of the average degree of polymerization of the polyvinyl alcohol resin used for obtaining the polyvinyl acetal resin (1) in the first layer is preferably 3010 or more, preferably 3050, preferably 3500, preferably 3600, preferably 4000, preferably 4050, whereas the upper limit thereof is preferably 7000, preferably 6000, preferably 5000, preferably 4900, and preferably 4500. Especially, for the purpose of further suppressing bubble formation and bubble growth in a laminated glass, sufficiently enhancing the sound-insulating property of the laminated glass, and easily forming an intermediate film, the average degree of polymerization of the polyvinyl alcohol resin used for obtaining the polyvinyl acetal resin (1) in the first layer is preferably 3010 or more and more preferably 3020 or more, but preferably 4000 or less, more preferably less than 4000, still more preferably 3800 or less, particularly preferably 3600 or less, and most preferably 3500 or less.

The polyvinyl acetal resin (2) in the second layer and the polyvinyl acetal resin (3) in the third layer are obtained by acetalization of polyvinyl alcohol resin. The lower limit of the average degree of polymerization of the polyvinyl alcohol resin for obtaining each of the polyvinyl acetal resin (2) in the second layer and the polyvinyl acetal resin (3) in the third layer is preferably 200, more preferably 500, still more preferably 1000, and particularly preferably 1500, whereas the upper limit is preferably 4000, more preferably 3500, still more preferably 3000, and particularly preferably 2500. When the average degree of polymerization is equal to or higher than the preferably lower limit, the penetration resistance of a laminated glass is further enhanced. When the average degree of polymerization is equal to or lower than the preferable upper limit, an intermediate film is easily formed.

The average degree of polymerization of the polyvinyl alcohol resin used for obtaining the polyvinyl acetal resin (1) in the first layer is preferably higher, preferably higher by 500 or more, preferably higher by 800 or more, more preferably higher by 1000 or more, still more preferably higher by 1300 or more, and particularly preferably higher by 1800 or more than that of the polyvinyl alcohol resin used for obtaining each of the polyvinyl acetal resin (2) in the second layer and the polyvinyl acetal resin (3) in the third layer.

The average degree of polymerization of the polyvinyl alcohol resin is determined by a method in conformity with JIS K6726 "Testing methods for polyvinyl alcohol".

The carbon number of an acetal group in the polyvinyl acetal resin is not particularly limited. The aldehyde used in production of the polyvinyl acetal resin is not particularly limited. The carbon number of an acetal group in the polyvinyl acetal resin is preferably 3 to 5, and more preferably 3 or 4. When the carbon number of an acetal group in the polyvinyl acetal resin is 3 or more, the glass transition temperature of an intermediate film is sufficiently low and the sound-insulating property against solid sounds at low temperatures are further enhanced.

The aldehyde is not particularly limited. Commonly, a C1 to C10 aldehyde is suitably used. Examples of the C1-10 aldehydes include propionaldehyde, n-butyl aldehyde, isobutyl aldehyde, n-valeraldehyde, 2-ethyl butyl aldehyde, n-hexylaldehyde, n-octylaldehyde, n-nonyl aldehyde, n-decyl aldehyde, formaldehyde, acetaldehyde, and benzaldehyde. Preferred among these are propionaldehyde, n-butyl aldehyde, isobutyl aldehyde, n-hexylaldehyde, and n-valeraldehyde. More preferred are propionaldehyde, n-butyl aldehyde, and isobutyl aldehyde. Still more preferred is n-butyl aldehyde. Each of these aldehydes may be used alone, or two or more of these may be used in combination.

The polyvinyl acetal resin is preferably polyvinyl butyral resin. The intermediate film for laminated glass according to the present invention preferably contains polyvinyl butyral resin as each of the polyvinyl acetal resins contained in the first layer, the second layer and the third layer. The polyvinyl butyral resin is easily synthesized. Use of the polyvinyl butyral resin allows exertion of adhesiveness of the intermediate film to components for laminated glass more appropriately. In addition, light resistance and weather resistance are further enhanced.

A hydroxy group content (amount of hydroxy groups) of the polyvinyl acetal resin (1) is 0 mol % or more but not more than 36 mol %. When the hydroxy group content is equal to or lower than the upper limit, the sound-insulating property of a laminated glass in a high frequency range is enhanced, and the flexibility of an intermediate film may increase, and thus the intermediate film can be easily handled. From the standpoint of further enhancing the sound-insulating property of a laminated glass in a high frequency range, the hydroxy group content (amount of hydroxy groups) of the polyvinyl acetal resin (1) is more preferably 35 mol % or less, still more preferably 30 mol % or less, particularly preferably 25 mol % or less, particularly preferably 20 mol % or less, particularly preferably 15 mol % or less, and particularly preferably 10 mol % or less. From the standpoint of enhancing the sound-insulating property of a laminated glass in a high frequency range, the hydroxy group content of the polyvinyl acetal resin (1) is preferably lower. The hydroxy group content of the polyvinyl acetal resin (1) may be 0 mol %.

A hydroxy group content (amount of hydroxy groups) of each of the polyvinyl acetal resin (2) and the polyvinyl acetal resin (3) is preferably not less than 20 mol % but not more than 50 mol %. When the hydroxy group content is equal to or higher than the lower limit, the penetration resistance of a laminated glass is further enhanced. When the hydroxy group content is equal to or lower than the upper limit, the plasticizer hardly bleeds out. In addition, the flexibility of an intermediate film may increase, and thus the intermediate film can be easily handled. From the standpoint of further enhancing the sound-insulating property of a laminated glass, a hydroxy group content (amount of hydroxy groups) of each of the polyvinyl acetal resin (2) and the polyvinyl acetal resin (3) is preferably 25 mol % or more, more preferably 28 mol % or more, and particularly preferably 30 mol % or more, but more preferably 45 mol % or less, more preferably 40 mol % or less, and particularly preferably 35 mol % or less.

From the standpoint of further enhancing the sound-insulating property of a laminated glass, the hydroxy group content of the polyvinyl acetal resin (1) in the first layer is lower than the hydroxy group content of each of the polyvinyl acetal resin (2) in the second layer and the polyvinyl acetal resin (3) in the third layer. From the standpoint of further enhancing the sound-insulating property of a laminated glass, the hydroxy group content of the polyvinyl acetal resin (1) in the first layer is lower than the hydroxy group content of each of the polyvinyl acetal resin (2) in the second layer and the polyvinyl acetal resin (3) in the third layer preferably by 1 mol % or more, more preferably by 3 mol % or more, still more preferably by 5 mol % or more, particularly preferably by 7 mol % or more, particularly preferably by 10 mol % or more, particularly preferably by 15 mol % or more, and particularly preferably by 20 mol % or more.

Each of the hydroxy group contents of the polyvinyl acetal resin (1), the polyvinyl acetal resin (2) and the polyvinyl acetal resin (3) is a value of a mol fraction in percentage (mol %) which is obtained by division of the amount of ethylene groups bonded with hydroxy groups by the total amount of ethylene groups of the main chain. The amount of ethylene groups bonded with hydroxy groups, for example, is determined by measurement in conformity with JIS K6726 "Testing methods for polyvinyl alcohol".

The degree of acetylation (amount of acetyl groups) of the polyvinyl acetal resin (1) is 0 mol % or more but not more than 30 mol %. From the standpoint of further enhancing the sound-insulating property of a laminated glass in a high frequency range, the degree of acetylation (amount of acetyl groups) of the polyvinyl acetal resin (1) is preferably 10 mol % or more, more preferably 15 mol % or more, and particularly preferably 20 mol % or more, but more preferably 28 mol % or less and still more preferably 25 mol % or less.

A degree of acetylation of each of the polyvinyl acetal resin (2) and the polyvinyl acetal resin (3) is 0 mol % or more but not more than 10 mol %. When the degree of acetylation is equal to or lower than the upper limit, the sound-insulating property of a laminated glass in a high frequency range is further enhanced, and the intermediate film has better strength and better mechanical properties. From the standpoint of further enhancing the sound-insulating property of a laminated glass in a high frequency range, the degree of acetylation of each of the polyvinyl acetal resin (2) and the polyvinyl acetal resin (3) is preferably 8 mol % or less and more preferably less than 3 mol %. The degree of acetylation of each of the polyvinyl acetal resin (2) and the polyvinyl acetal resin (3) is preferably 0.1 mol % or more and particularly preferably 2 mol % or less. When the degree of acetylation of each of the polyvinyl acetal resin (2) and the polyvinyl acetal resin (3) is less than 3 mol %, the mechanical properties of the intermediate film are further improved. As a result, the penetration resistance of the laminated glass is further enhanced.

The degree of acetylation is obtained below. The amount of ethylene groups bonded with the acetal group and the amount of the ethylene groups bonded with the hydroxyl group are subtracted from the total amount of ethylene groups in the main chain. The obtained value is divided by the total amount of ethylene groups in the main chain. The obtained mole fraction expressed as percentage is the degree of acetylation. The amount of the ethylene groups bonded with acetal groups is determined by measurement in conformity with JIS K6728 "Testing methods for polyvinyl butyral".

The degree of acetalization (degree of butyralization in the case of a polyvinyl butyral resin) of the polyvinyl acetal resin (1) is preferably 34 mol % or more, preferably 40 mol % or more, and more preferably 45 mol % or more, but is 100 mol % or less, preferably 95 mol % or less, more preferably 80 mol % or less, still more preferably 75 mol % or less, and particularly preferably 65 mol % or less. When the degree of acetalization is equal to or higher than the lower limit, the compatibility between the polyvinyl acetal resin (1) and the plasticizer is enhanced, so that the bleed out of the plasticizer is suppressed. When the degree of acetalization is equal to or lower than the upper limit, the reaction time needed for production of the polyvinyl acetal resin (1) is shortened.

A degree of acetalization (degree of butyralization in the case of a polyvinyl butyral resin) of each of the polyvinyl acetal resin (2) and the polyvinyl acetal resin (3) is preferably 55 mol % or more, more preferably 60 mol % or more, and still more preferably 63 mol % or more, but of preferably 85 mol % or less, more preferably 75 mol % or less, and still more preferably 70 mol % or less. When the degree of acetalization is equal to or higher than the lower limit, the compatibility between the polyvinyl acetal resin (2) or the polyvinyl acetal resin (3) and the plasticizer is enhanced.

When the degree of acetalization is equal to or lower than the upper limit, the reaction time required for production of each of the polyvinyl acetal resin (2) and the polyvinyl acetal resin (3) is shortened.

The degree of acetalization is a value of the mol fraction in percentage (mol %) which is obtained by division of the amount of ethylene groups bonded with acetal groups by the total amount of ethylene groups of the main chain.

The degree of acetalization is determined as follows. The degree of acetylation (amount of acetyl groups) and the hydroxy group content (amount of vinyl alcohol) are measured by a method in conformity with JIS K6728 "Testing methods for polyvinyl butyral". The measured values are converted to mol fractions. The obtained degree of acetylation and the hydroxy group content are subtracted from 100 mol %.

In the case of a polyvinyl acetal resin and the case where a polyvinyl acetal resin is a polyvinyl butyral resin, the degree of acetalization (degree of butyralization) and the degree of acetylation are obtainable from the measurement results by a method in conformity with JIS K6728 "Testing methods for polyvinyl butyral" or ASTM D1396-92. The measurement in conformity with ASTM D1396-92 is preferable.

Since migration of the plasticizer is easily controlled and the sound-insulating property of a laminated glass is further enhanced, when the difference (1–2) in content is 8.5 mol % or less, the degree of acetylation of the polyvinyl acetal resin (1) in the first layer is preferably more than 8 mol %. Since migration of the plasticizer is easily controlled and the sound-insulating property of a laminated glass is further enhanced, when the difference (1–3) in content is 8.5 mol % or less, the degree of acetylation of the polyvinyl acetal resin (1) in the first layer is preferably more than 8 mol %.

Since migration of the plasticizer is easily controlled and the sound-insulating property of a laminated glass is further enhanced, when the difference (1–2) in content is more than 8.5 mol % but not more than 9.2 mol % or when the difference (1–2) in content is not more than 9.2 mol %, preferably, the degree of acetalization of the polyvinyl acetal resin (1) in the first layer is 68 mol % or more or the hydroxy group content thereof is less than 31.5 mol %. Since migration of the plasticizer is easily controlled and the sound-insulating property of a laminated glass is further enhanced, when the difference (1–3) in content is more than 8.5 mol % but not more than 9.2 mol % or when the difference (1–3) in content is not more than 9.2 mol %, preferably, the degree of acetalization of the polyvinyl acetal resin (1) in the first layer is 68 mol % or more or the hydroxy group content thereof is less than 31.5 mol %.

Moreover, since bubble formation and bubble growth in a laminated glass are further suppressed and the sound-insulating property of a laminated glass is further enhanced, the polyvinyl acetal resin (1) in the first layer is preferably a polyvinyl acetal resin having a degree of acetylation of less than 8 mol % (hereinafter, also referred to as "polyvinyl acetal resin A") or a polyvinyl acetal resin having a degree of acetylation of 8 mol % or more (hereinafter, also referred to as "polyvinyl acetal resin B").

The degree of acetylation a of the polyvinyl acetal resin A is less than 8 mol %, preferably 7.5 mol % or less, preferably 7 mol % or less, preferably 6 mol % or less, preferably 5 mol % or less, but of preferably 0.1 mol % or more, preferably 0.5 mol % or more, preferably 0.8 mol % or more, preferably 1 mol % or more, preferably 2 mol % or more, preferably 3 mol % or more, and preferably 4 mol % or more. When the degree of acetylation a satisfies the upper limit and the lower limit, the compatibility between the polyvinyl acetal resin and the plasticizer is further enhanced and the sound-insulating property of a laminated glass is further enhanced.

The lower limit of the degree of acetalization a of the polyvinyl acetal resin A is preferably 68 mol %, more preferably 70 mol %, still more preferably 71 mol %, and particularly preferably 72 mol %, and has an upper limit of preferably 85 mol %, more preferably 83 mol %, still more preferably 81 mol %, and particularly preferably 79 mol %. When the degree of acetalization a is equal to or higher than the lower limit, the sound-insulating property of a laminated glass is further enhanced. When the degree of acetalization a is equal to or lower than the upper limit, the reaction time required for production of the polyvinyl acetal resin A is shortened.

A hydroxy group content a of the polyvinyl acetal resin A is preferably 30 mol % or less, preferably 27.5 mol % or less, preferably 27 mol % or less, preferably 26 mol % or less, preferably 25 mol % or less, preferably 24 mol % or less, and preferably 23 mol % or less, but of preferably 16 mol % or more, preferably 18 mol % or more, preferably 19 mol % or more, and preferably 20 mol % or more. When the hydroxy group content a is equal to or lower than the upper limit, the sound-insulating property of a laminated glass is further enhanced. When the hydroxy group content a is equal to or higher than the lower limit, the adhesiveness of an intermediate film is further enhanced.

The polyvinyl acetal resin A is preferably a polyvinyl butyral resin.

A degree of acetylation b of the polyvinyl acetal resin B is preferably 8 mol % or more, preferably 9 mol % or more, preferably 10 mol % or more, preferably 11 mol % or more, and preferably 12 mol % or more, but of preferably 30 mol % or less, preferably 28 mol % or less, preferably 26 mol % or less, preferably 24 mol % or less, preferably 20 mol % or less, and preferably 19.5 mol % or less. When the degree of acetylation b is equal to or higher than the lower limit, the sound-insulating property of a laminated glass is further enhanced. When the degree of acetylation b is equal to or lower than the upper limit, the reaction time required for production of the polyvinyl acetal resin B is shortened. Especially, since the reaction time required for production of the polyvinyl acetal resin B is further shortened, a degree of acetylation b of the polyvinyl acetal resin B is preferably less than 20 mol %.

The lower limit of the degree of acetalization b of the polyvinyl acetal resin B is preferably 50 mol %, more preferably 52.5 mol %, still more preferably 54 mol %, and particularly preferably 60 mol %, whereas the upper limit thereof is preferably 80 mol %, more preferably 77 mol %, still more preferably 74 mol %, and particularly preferably 71 mol %. When the degree of acetalization b is equal to or higher than the lower limit, the sound-insulating property of a laminated glass is further enhanced. When the degree of acetalization b is equal to or lower than the upper limit, the reaction time required for production of the polyvinyl acetal resin B is shortened.

A hydroxy group content b of the polyvinyl acetal resin B is preferably 30 mol % or less, preferably 27.5 mol % or less, preferably 27 mol % or less, preferably 26 mol % or less, and preferably 25 mol % or less, but of preferably 18 mol % or more, preferably 20 mol % or more, preferably 22 mol % or more, and preferably 23 mol % or more. When the hydroxy group content b is equal to or lower than the upper limit, the sound-insulating property of a laminated glass is further enhanced. When the hydroxy group content b is equal to or higher than the lower limit, the adhesiveness of an intermediate film is further enhanced.

The polyvinyl acetal resin B is preferably a polyvinyl butyral resin.

The polyvinyl acetal resin A and the polyvinyl acetal resin B each are preferably obtained by acetalization of a polyvinyl alcohol resin having an average degree of polymerization of more than 3000 with an aldehyde. The aldehyde is preferably a C1-10 aldehyde and is more preferably C4-5 aldehyde. The lower limit of the average degree of polymerization of the polyvinyl alcohol resin is preferably 3010, preferably 3050, preferably 3500, preferably 3600, preferably 4000, preferably 4050, whereas the upper limit thereof is preferably 7000, preferably 6000, preferably 5000, preferably 4900, and preferably 4500. The polyvinyl acetal resin A and the polyvinyl acetal resin B in the first layer each are particularly preferably obtained by acetalization of a polyvinyl alcohol resin having an average degree of polymerization of more than 3000 but less than 4000. Especially, since bubble formation and bubble growth in a laminated glass are further suppressed, the sound-insulating property of a laminated glass is sufficiently enhanced, and an intermediate film is easily formed, an average degree of polymerization of the polyvinyl alcohol resin used for production of each of the polyvinyl acetal resin A and the polyvinyl acetal resin B in the first layer is preferably 3010 or more and more preferably 3020 or more, but of preferably 4000 or less, more preferably less than 4000, still more preferably 3800 or less, particularly preferably 3600 or less, and most preferably 3500 or less.

The lower limit of the weight average molecular weight of each of the polyvinyl acetal resin (1), the polyvinyl acetal resin (2) and the polyvinyl acetal resin (3) is preferably 100,000, and more preferably 300,000, whereas the upper limit thereof is preferably 10,000,000 and more preferably 5,000,000. When the weight average molecular weight of the polyvinyl acetal resin is equal to or lower than the preferable lower limit, the strength of the intermediate film may be lowered. When the weight average molecular weight of the polyvinyl acetal resin is higher than the preferable upper limit, the strength of the resulting intermediate film may be too much. The weight average molecular weight refers to a weight average molecular weight in terms of polystyrene based on the measurement by gel permeation chromatography (GPC).

The weight average molecular weight and the number average molecular weight respectively refer to the weight average molecular weight and the number average molecular weight in terms of polystyrene determined by gel permeation chromatography (GPC). For measurement of the weight average molecular weight and the number average molecular weight in terms of polystyrene, for example, GPC measurement of a polystyrene standard sample having a known molecular weight is carried out. The polystyrene standard samples used ("Shodex Standard SM-105", "Shodex Standard SH-75" from Showadenkosha. co., ltd.) are 14 pieces of samples having weight average molecular weights of 580, 1,260, 2,960, 5,000, 10,100, 21,000, 28,500, 76,600, 196,000, 630,000, 1,130,000, 2,190,000, 3,150,000, and 3,900,000. The molecular weights relative to the elution times indicated by the peak tops of the standard sample peaks are plotted so that an approximate straight line is drawn. The approximate straight line is used as a calibration curve. A multilayer intermediate film left in a constant temperature and humidity room (humidity of 30% (±3%), temperature of 23° C.) is divided into surface layers (the second layer and the third layer) and an intermediate layer (the first layer). The peeled first layer (intermediate layer) is dissolved in tetrahydrofuran (THF) to give a 0.1% by weight solution. The solution was analyzed using a GPC device for measurement of the weight average molecular weight and the number average molecular weight. An exemplary GPC device is a GPC device (Hitachi High-Technologies Corp. "RI: L2490, auto sampler: L-2200, pump: L-2130, column oven: L-2350, column: GL-A120-S and GL-A100MX-S in series") connected with a light scattering detector for GPC (VISCOTEK, "Model 270 (RALS+VISCO)").

(Production Method of a Polyvinyl Acetal Resin Containing a High Molecular Weight Component X Having an Absolute Molecular Weight of One Million or More or a High Molecular Weight Component Y Having a Molecular Weight y of One Million or More)

The following will discuss a specific production method of a polyvinyl acetal resin containing a high molecular weight component X having an absolute molecular weight of one million or more or a high molecular weight component Y having a molecular weight y of one million or more which is one example of the polyvinyl acetal resin containing a high molecular weight component X having an absolute molecular weight of one million or more or a high molecular weight component Y having a molecular weight y of one million or more at a proportion satisfying the above lower limit.

A polyvinyl alcohol resin is first prepared. The polyvinyl alcohol resin is obtained by, for example, saponifying polyvinyl acetate. The degree of saponification of the polyvinyl alcohol resin is commonly in a range of 70 to 99.9 mol %, preferably in a range of 75 to 99.8 mol %, and more preferably in a range of 80 to 99.8 mol %.

The lower limit of the average degree of polymerization of the polyvinyl alcohol resin is preferably 200, more preferably 500, still more preferably 1,000, and particularly preferably 1,500, whereas the upper limit thereof is preferably 3,000, more preferably 2,900, still more preferably 2,800, and particularly preferably 2,700. If the average degree of polymerization is too low, the penetration resistance of a laminated glass tends to be lowered. If the average degree of polymerization is too high, an intermediate film may be hardly formed.

The polyvinyl alcohol resin is reacted with an aldehyde using a catalyst for acetalization thereof. In this operation, a solution containing the polyvinyl alcohol resin may be used. Exemplary solvents used for the solution containing the polyvinyl alcohol resin include water.

The production method of the polyvinyl acetal resin contained in the first layer is preferably a method in which a polyvinyl alcohol resin is reacted with an aldehyde using a catalyst for acetalization thereof, thereby giving a polyvinyl acetal resin.

The production method of the first layer preferably includes the steps of: reacting a polyvinyl alcohol resin with an aldehyde using a catalyst for acetalization of the polyvinyl alcohol resin, thereby producing a polyvinyl acetal resin; and preparing the first layer using a mixture containing the resulting polyvinyl acetal resin and a plasticizer. In the step of preparing a first layer or after preparation of the first layer, a second layer is laminated on the first layer, and a third layer is further laminated, if necessary, thereby preparing a multilayer intermediate film. Alternatively, a first layer and a second layer may be co-extruded to produce a multilayer intermediate film. Also, a first layer, a second layer, and a third layer may be co-extruded to produce a multilayer intermediate film.

The aldehyde is not particularly limited. Commonly, a C1-10 aldehyde is suitably used. Examples of the C1-10 aldehyde include propionaldehyde, n-butyl aldehyde, isobutyl aldehyde, n-valeraldehyde, 2-ethyl butyl aldehyde, n-hexylaldehyde, n-octylaldehyde, n-nonyl aldehyde, n-decyl aldehyde, formaldehyde, acetaldehyde, and benzaldehyde. Particularly, n-butyl aldehyde, n-hexylaldehyde, and n-valeraldehyde are preferred, and n-butyl aldehyde is more preferred. Each of the aldehydes may be used alone, or two or more of them may be used in combination.

From the standpoint of easily obtaining a polyvinyl acetal resin containing a high molecular weight component X having an absolute molecular weight of one million or more or a high molecular weight component Y having a molecular weight y of one million or more, exemplified are a method in which, for example, before or during an acetalization reaction using an aldehyde, a crosslinking agent such as dialdehyde is added for crosslinking main chains of adjacent polyvinyl alcohol resins, a method in which an excessive amount of an aldehyde is added to promote acetalization among molecules, and a method in which a polyvinyl alcohol resin having a high degree of polymerization is added. Each of these methods may be used alone, or two or more of them may be used in combination.

The catalyst is preferably an acid catalyst. Examples thereof include nitric acid, hydrochloric acid, sulfuric acid, phosphoric acid, and paratoluene sulfonic acid.

The molecular weight in terms of polystyrene refers to the molecular weight in terms of polystyrene determined by gel permeation chromatography (GPC). The proportion (%) of the high molecular weight component Y having a molecular weight y of one million or more in the polyvinyl acetal resin is calculated based on the proportion of the area corresponding to the region where the molecular weight y is one million or more in the peak area detected by an RI detector in measurement of the molecular weight in terms of polystyrene of the polyvinyl acetal resin by GPC. The peak area refers to an area between the peak and the base line of an element to be measured.

The molecular weight in terms of polystyrene is determined as follows, for example.

For measurement of the molecular weight in terms of polystyrene, GPC measurement of a polystyrene standard sample having a known molecular weight is carried out. The polystyrene standard samples used ("Shodex Standard SM-105", "Shodex Standard SH-75" from Showadenkosha. co., ltd.) are 14 pieces of samples having weight average molecular weights of 580, 1,260, 2,960, 5,000, 10,100, 21,000, 28,500, 76,600, 196,000, 630,000, 1,130,000, 2,190,000, 3,150,000, and 3,900,000. The weight average molecular weight relative to the elution times indicated by the peak tops of the standard sample peaks are plotted so that an approximation straight line is drawn. The approximation straight line is used as a calibration curve. For example, in the case of measuring a proportion (%) of the high molecular weight component Y having a molecular weight y of one million or more in the polyvinyl acetal resin in an intermediate layer of a multilayer intermediate film that includes a second layer (surface layer), a first layer (intermediate layer), and a third layer (surface layer) laminated in the stated order, a multilayer intermediate film left in a constant temperature and humidity room (humidity of 30%(±3%), temperature of 23° C.) is divided into surface layers and an intermediate layer. The peeled intermediate layer is dissolved in tetrahydrofuran (THF) to give a 0.1% by weight solution. The solution was analyzed using a GPC device for measurement of the peak area of the polyvinyl acetal resin in the intermediate layer. Based on the elution time of the polyvinyl acetal resin in the intermediate layer and the calibration curve, an area corresponding to a region where the molecular weight in terms of polystyrene of the polyvinyl acetal resin in the intermediate layer is one million or more is calculated. The area corresponding to a region where the molecular weight in terms of polystyrene of the polyvinyl acetal resin in the intermediate layer is one million or more is divided by the peak area of the polyvinyl acetal resin in the intermediate layer, and the obtained value is expressed in a percentage (%). In this manner, the proportion of the high molecular weight component Y having a molecular weight y of one million or more in the polyvinyl acetal resin is calculated. The molecular weight in terms of polystyrene is measured, for example, using a Gel Permeation Chromatography (GPC) device (Hitachi High-Technologies Corp. "RI: L2490, auto sampler: L-2200, pump: L-2130, column oven: L-2350, column: GL-A120-S and GL-A100MX-S in series").

(Plasticizer)

The first layer contains a plasticizer (1). The second layer preferably contains a plasticizer (hereinafter, also referred to as a plasticizer (2)). The third layer preferably contains a plasticizer (hereinafter, also referred to as a plasticizer (3)). The plasticizer (1), plasticizer (2) and plasticizer (3) usable in the first layer, the second layer and the third layer are not particularly limited. Conventionally known plasticizers may be used as the plasticizer (1), plasticizer (2) and plasticizer (3). One plasticizer may be used or two or more plasticizers may be used in combination for the plasticizer (1), plasticizer (2) and plasticizer (3).

Examples of the plasticizer (1), plasticizer (2) and plasticizer (3) include organic ester plasticizers such as monobasic organic acid esters and polybasic organic acid esters, and phosphoric acid plasticizers such as organophosphate plasticizers and organophosphite plasticizers. In particular, organic ester plasticizers are preferable. The plasticizers are preferably liquid plasticizers.

The monobasic organic acid esters are not particularly limited, and examples thereof include glycol esters obtained by a reaction between glycols and monobasic organic acids, and esters of triethylene glycol or tripropylene glycol and monobasic organic acids. Examples of the glycols include triethylene glycol, tetraethylene glycol, and tripropylene glycol. Examples of the monobasic organic acids include butyric acid, isobutyric acid, caproic acid, 2-ethylbutyric acid, heptylic acid, n-octylic acid, 2-ethylhexanoic acid, n-nonylic acid, and decylic acid.

The polybasic organic acid esters are not particularly limited, and examples thereof include ester compounds of polybasic organic acids with linear or branched C4-8 alcohols. Examples of the polybasic organic acids include adipic acid, sebacic acid, and azelaic acid.

The organic ester plasticizers are not particularly limited, and examples thereof include triethylene glycol di-2-ethyl butyrate, triethylene glycol di-2-ethylhexanoate, triethylene glycol dicaprylate, triethylene glycol di-n-octanoate, triethylene glycol di-n-heptanoate, tetraethylene glycol di-n-heptanoate, dibutyl sebacate, dioctylazelate, dibutyl carbitol adipate, ethylene glycol di-2-ethyl butyrate, 1,3-propylene glycol di-2-ethyl butyrate, 1,4-butylene glycol di-2-ethyl butyrate, diethylene glycol di-2-ethyl butyrate, diethylene glycol di-2-ethyl hexanoate, dipropylene glycol di-2-ethyl butyrate, triethylene glycol di-2-ethylpentanoate, tetraethylene glycoldi-2-ethyl butyrate, diethylene glycol dicaprylate, dihexyl adipate, dioctyl adipate, hexylcyclohexyl adipate, mixture of heptyl adipate and nonyl adipate, diisononyl adipate, diisodecyl adipate, heptylnonyl adipate, dibutyl sebacate, oil-modified alkyd sebacate, and mixture of phosphate ester and adipic acid ester. Organic ester plasticizers other than these may be used.

The organophosphate plasticizers are not particularly limited, and examples thereof include tributoxyethyl phosphate, isodecylphenyl phosphate, and triisopropyl phosphate.

The plasticizer (1), plasticizer (2) and plasticizer (3) are preferably diester plasticizers represented by the formula (1).

[Chem. 1]

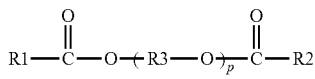

Formula (1)

R1 and R2 in the formula (1) each represent a C5-10 organic group, R3 represents an ethylene group, isopropylene group or n-propylene group, and p represents an integer of 3 to 10.

The plasticizer preferably contains at least one of triethylene glycol di-2-ethylhexanoate (3GO) and triethylene glycol di-2-ethylbutyrate (3GH), and more preferably contains triethylene glycol di-2-ethylhexanoate.

The plasticizer (1), plasticizer (2) and plasticizer (3) are preferably plasticizers having a SP value of 13.5 to 14.5. Use of a plasticizer having a SP value of 13.5 to 14.5 effectively enhances the sound-insulating property of a laminated glass in a high frequency range. More preferably, a SP value of the plasticizer (1) is 13.5 to 14.5.

The "SP value" is calculated by the Fedors method (R. F. Fedors, Polym. Eng. Sci., 14, 147 (1974)). When the SP value is within the above range, the compatibility between the plasticizer and the polyvinyl acetal resin is fine.

From the standpoint of further enhancing the sound-insulating property of an intermediate film and a laminated glass, the plasticizer (1), plasticizer (2) and plasticizer (3) are also preferably diester plasticizers represented by the formula (2). Accordingly, the plasticizer is preferably a diester plasticizer represented by the formula (1) or a diester plasticizer represented by the formula (2).

[Chem. 2]

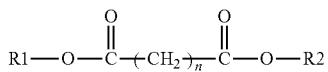

Formula (2)

R1 and R2 in the formula (2) each represent an organic group having at least one ether bond, and n represents an integer of 2 to 8.

From the standpoint of further enhancing the sound-insulating property of an intermediate film and a laminated glass, R1 and R2 in the formula (2) each preferably have at least one ether bond structural unit represented by the formula (11) or the formula (12).

[Chem. 3]

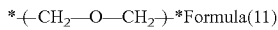Formula(11)

[Chem. 4]

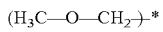
Formula (12)

From the standpoint of further enhancing the sound-insulating property of an intermediate film and a laminated glass, the plasticizer (1), plasticizer (2) and plasticizer (3) are preferably diester plasticizers represented by the formula (2A).

[Chem. 5]

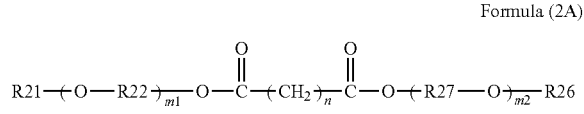

Formula (2A)

R21 and R26 in the formula (2A) each represent a C1-10 alkyl group, R22 and R27 each represent a C1-10 alkylene group, m1 and m2 each represent an integer of 1 to 5, and n represents an integer of 2 to 8.

Specific examples of the R1 and R2 in the case where they each are an organic group having at least one ether bond include 2-butoxyethyl, 2-(2-butoxyethoxy)ethyl, 2-[2-(2-butoxyethoxy)ethoxy]ethyl group. The R1 and R2 each may be a group other than these.

The amount of the plasticizer (1) for 100 parts by weight of the polyvinyl acetal resin (1) in the first layer is preferably 25 parts by weight or more, more preferably 30 parts by weight or more, and still more preferably 45 parts by weight or more, but is preferably 75 parts by weight or less, more preferably 70 parts by weight or less, still more preferably 60 parts by weight or less, particularly preferably 55 parts by weight or less, and most preferably 50 parts by weight or less. When the amount of the plasticizer (1) is equal to or higher than the lower limit, the flexibility of an intermediate film may increase, and thus the intermediate film can be easily handled. When the amount of the plasticizer (1) is equal to or lower than the upper limit, the transparency of an intermediate film is further enhanced.

The amount of the plasticizer (2) for 100 parts by weight of the polyvinyl acetal resin (2) in the second layer (2) is preferably 10 parts by weight or more, more preferably 15 parts by weight or more, still more preferably 20 parts by weight or more, particularly preferably 25 parts by weight or more, and most preferably 30 parts by weight or more, but is preferably 45 parts by weight or less, and more preferably 40 parts by weight or less. The amount of the plasticizer (3) for 100 parts by weight of the polyvinyl acetal resin (3) in the third layer (3) is preferably 10 parts by weight or more, more preferably 15 parts by weight or more, still more preferably 20 parts by weight or more, particularly preferably 25 parts by weight or more, and most preferably 30 parts by weight or more, but is preferably 45 parts by weight or less and more preferably 40 parts by weight or less. When the amounts of the plasticizer (2) and the plasticizer (3) each is equal to or higher than the lower limit, the flexibility of an intermediate film may increase, and thus the intermediate film can be easily handled. When the amounts of the plasticizer (2) and the plasticizer (3) each are equal to or lower than the upper limit, the penetration resistance of an intermediate film is further enhanced.

The amount of the plasticizer (2) (hereinafter, also referred to as the amount (2)) for 100 parts by weight of the polyvinyl acetal resin (2) in the second layer is preferably smaller than the amount of the plasticizer (1) (hereinafter, also referred to as the amount (1)) for 100 parts by weight of the polyvinyl acetal resin (1) in the first layer. The amount of the plasticizer (3) (hereinafter, also referred to as the amount (3)) for 100 parts by weight of the polyvinyl acetal resin (3) in the third layer is preferably smaller than the amount of the plasticizer (1) (hereinafter, also referred to as the amount (1)) for 100 parts by weight of the polyvinyl acetal resin (1) in the first layer. When the amount (2) and the amount (3) are smaller than the amount (1), the penetration resistance of a laminated glass is further enhanced.

The difference between the amount (1) and the amount (2) or the amount (3) is preferably 1 part by weight or more, more preferably 3 parts by weight or more, and still more preferably 5 parts by weight or more, but is preferably 30 parts by weight or less, more preferably 25 parts by weight or less, and still more preferably 20 parts by weight or less. When the difference between the amount (1) and the amount (2) or the amount (3) is equal to or higher than the lower limit, the sound-insulating property of a laminated glass is further enhanced. When the difference between the amount (1) and the amount (2) or the amount (3) is equal to or lower than the upper limit, the penetration resistance of a laminated glass is further enhanced. The difference between the amount (1) and the amount (2) or the amount (3) is a numerical value obtained by subtracting the amount (2) or the amount (3) from the amount (1).

(Other Components)

The intermediate film for laminated glass according to the present invention may optionally contain additives such as ultraviolet absorbers, antioxidants, light stabilizers, flame retardants, antistatic agents, pigments, dyes, adhesion modifiers, damp proofing agents, fluorescent brighteners, and infrared absorbers. Each of these additives may be used alone, or two or more of them may be used in combination.

(Intermediate Film for Laminated Glass)

From the standpoint of further enhancing the sound-insulating property of a laminated glass at low temperatures and in a high frequency range, in the intermediate film for laminated glass according to the present invention, a peak temperature of tan δ which appears at the lowest temperature measured at a frequency of 1 Hz is 0° C. or lower.

From the standpoint of further enhancing the sound-insulating property of a laminated glass in a high frequency range, a maximum value of tan δ at a peak temperature of tan δ which appears at the lowest temperature measured at a frequency of 1 Hz is 1.15 or more.

A thickness of the first layer is preferably 0.02 mm or more and more preferably 0.05 mm or more, but preferably 1.8 mm or less and more preferably 0.5 mm or less. With a thickness within such a preferable range, the obtained intermediate film is not too thick, and the sound-insulating property of the resulting intermediate film and the laminated glass is further enhanced.

A thickness of each the second layer and the third layer is preferably 0.1 mm or more and more preferably 0.2 mm or more, but preferably 1 mm or less and more preferably 0.5 mm or less. When the thickness of each of the second layer and the third layer satisfies the lower limit and the upper limit, the resulting intermediate film is not too thick, the sound-insulating property of the resulting intermediate film and the laminated glass is further enhanced, and the bleed out of the plasticizer is suppressed.

The ratio of a thickness T1 of the first layer to a thickness T2 of the second layer is preferably 0.15 or more and more preferably 0.2 or more, but is preferably 1 or less and more preferably 0.9 or less. Namely, in the intermediate film where the thickness (μm) of the first layer is T1 and the thickness (μm) of the second layer is T2, T1/T2 that is a ratio of the thickness of the first layer to the thickness of the second layer is preferably 0.4 to 1. In such a case, the sound-insulating property of a laminated glass including the intermediate film in a high frequency range is further enhanced. Especially, the sound-insulating property in a high frequency range exceeding 3 kHz is effectively enhanced.

From the standpoint of further enhancing the sound-insulating property of a laminated glass in a high frequency range, the ratio (T1/T2) is more preferably not less than 0.5 but not more than 0.9.

A ratio of the thickness of the first layer to the total thickness of the second layer and the third layer is preferably 0.1 to 0.5. In other words, in an intermediate film where the thickness (μm) of the first layer is T1, the thickness (μm) of the second layer is T2, the thickness (μm) of the third layer is T3, T1/(T2+T3) that is a ratio of the thickness of the first layer to the total thickness of the second layer and the third layer is preferably 0.1 to 0.5. In such a case, the sound-insulating property of a laminated glass including the intermediate film is further enhanced in a high frequency range. Especially, the sound-insulating property in a high frequency range exceeding 3 kHz is effectively enhanced.

From the standpoint of further enhancing the sound-insulating property of a laminated glass in a high frequency range, the ratio (T1/(T2+T3)) is more preferably 0.12 or more and still more preferably 0.15 or more.

The intermediate film for laminated glass according to the present invention has a thickness of preferably 0.1 mm or more and more preferably 0.25 mm or more, but of preferably 3 mm or less and more preferably 1.5 mm or less. When the thickness of the intermediate film is equal to or higher than the lower limit, the penetration resistance of an intermediate film and a laminated glass is sufficiently enhanced. When the thickness of the intermediate film is equal to or lower than the upper limit, the transparency of an intermediate film is further enhanced.

The production method of the intermediate film for laminated glass according to the present invention is not particularly limited, and a conventionally known method may be employed. For example, a polyvinyl acetal resin, a plasticizer, and other components added optionally are kneaded and formed into an intermediate film. An extrusion molding method is preferable because it is suitable for continuous production.

The kneading method is not particularly limited. Exemplary methods include a method using an extruder, plastograph, kneader, Banbury mixer, or calender roll. In particular, a method using an extruder is preferable, and a method using a twin-screw extruder is more preferable because it is suitable for continuous production. The intermediate film for laminated glass according to the present invention may be produced by separately preparing a first layer, a second layer and a third layer, and then laminating the first layer, the second layer and the third layer for production of a multi-layer intermediate film. Alternatively, the intermediate film for laminated glass according to the present invention may be produced by co-extrusion of a first layer, a second layer and a third layer for lamination thereof.

The second layer and the third layer preferably contain the same polyvinyl acetal resin because the production efficiency of the intermediate film is excellent in such a case. The second layer and the third layer more preferably contain the same polyvinyl acetal resin and the same plasticizer. The second layer and the third layer are still more preferably formed by using the same resin composition.

(Laminated Glass)

FIG. 6 illustrates one example of a laminated glass including an intermediate film for laminated glass according to one embodiment of the present invention.

A laminated glass 11 illustrated in FIG. 6 includes an intermediate film 1, a first component for laminated glass 21 and a second component for laminated glass 22. The intermediate film 1 is interposed between the first component for laminated glass 21 and the second component for laminated glass 22. The first component for laminated glass 21 is laminated on a first surface 1a of the intermediate film 1. The second component for laminated glass 22 is laminated on a second surface that is an opposite side of the first surface of the intermediate film 1. The first component for laminated glass 21 is laminated on an outer surface 3a of the second layer 3. The second component for laminated glass 22 is laminated on an outer surface 4a of the third layer 4.

Accordingly, the laminated glass according to the present invention includes a first component for laminated glass, a second component for laminated glass, and an intermediate film interposed between the first component for laminated glass and the second component for laminated glass, and the intermediate film used is the intermediate film for laminated glass according to the present invention.

Examples of the first component for laminated glass and the second component for laminated glass include glass plates and PET (polyethylene terephthalate) films. The laminated glass covers not only a laminated glass including an intermediate film interposed between two glass plates, but also a laminated glass including an intermediate film interposed between a glass plate and a PET film or the like. The laminated glass is a laminate including a glass plate, and preferably includes at least one glass plate.

Examples of the glass plate include inorganic glass and organic glass. Examples of the inorganic glass include float plate glass, heat-absorbing plate glass, heat-reflective plate glass, polished plate glass, patterned glass, wired glass, linear-wired glass and green-tinted glass. The organic glass is synthetic resin glass used instead of inorganic glass. Examples of the organic glass include polycarbonate plates and poly(meth)acrylic resin plates. Examples of the poly(meth)acrylic resin plate include polymethyl (meth)acrylate plates.

The thickness of each of the first component for laminated glass and the second component for laminated glass is not particularly limited, and it is preferably within a range of 1 to 5 mm. In the case that the component for laminated glass is a glass plate, the thickness of the glass plate is preferably within a range of 1 to 5 mm. In the case that the component for laminated glass is a PET film, the thickness of the PET film is preferably within a range of 0.03 to 0.5 mm.

The method for producing the laminated glass is not particularly limited. For example, the intermediate film is sandwiched between the first component for laminated glass and the second component for laminated glass, and then passed through a press roll or put into a rubber bag and decompression-sucked, so that the air remained between the first component for laminated glass or the second component for laminated glass and the intermediate film is removed. Thereafter, the product is pre-bonded at about 70 to 110° C. so that a laminate is provided. Next, the laminate is put into an autoclave or pressed so that the laminate is pressed at about 120 to 150° C. and a pressure of 1 to 1.5 MPa, and thereby a laminated glass is obtained.

The laminated glass can be used for automobiles, railway carriages, aircrafts, ships, buildings, and the like. The laminated glass can also be used for other applications. The laminated glass is preferably a laminated glass for buildings or vehicles, and is more preferably a laminated glass for vehicles. The laminated glass can be suitably used for electric vehicles using electric motors and hybrid electric vehicles using internal-combustion engines and electric motors. The laminated glass can be used for windshields, side glasses, rear glasses, and roof glasses of automobiles.

The following will describe the present invention in detail referring to, but not limited to, examples.

Synthesis Example 1

Synthesis of Polyvinyl Acetal Resin Used in an Intermediate Layer A of Example 1

Synthesis of Polyvinyl Butyral Resin

To pure water (2890 g), a polyvinyl alcohol resin (191 g, degree of polymerization: 2500, degree of saponification: 79 mol %) was added and heated to be dissolved. The resulting solution was adjusted to a temperature of 12° C. A 35% by weight hydrochloric acid (201 g) and n-butyl aldehyde (150 g) were added thereto for deposition of a polyvinyl butyral resin. Then, the mixture was held at a temperature of 50° C. for three hours for completion of the reaction. Unreacted n-butyl aldehyde was washed away with excessive water, and the hydrochloric acid catalyst was neutralized. The resulting product was dried after removal of salts, thereby giving a polyvinyl butyral resin. A degree of acetylation of the obtained polyvinyl butyral resin was 21 mol %, a degree of butyralization thereof was 54 mol %, and a hydroxy group content thereof was 25 mol %.

Synthesis Example 2

Synthesis of Polyvinyl Acetal Resin Used in an Intermediate Layer A of Example 2

Synthesis of Polyvinyl Butyral Resin

A polyvinyl butyral resin (average degree of polymerization of 1700) having a degree of acetylation of 0.5 mol %, a degree of butyralization of 64 mol %, and a hydroxy group content of 35.5 mol % was dissolved in pyridine. To the dissolved polyvinyl butyral resin, 17.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 1700) was obtained. A degree of acetylation of the obtained polyvinyl butyral resin was 18 mol %, a degree of butyralization thereof was 64 mol %, and a hydroxy group content thereof was 18 mol %.

Synthesis Example 3

Synthesis of Polyvinyl Acetal Resin Used in an Intermediate Layer A of Example 3

Synthesis of Polyvinyl Butyral Resin

A polyvinyl butyral resin (average degree of polymerization of 1700) having a degree of acetylation of 0.5 mol %, a degree of butyralization of 64 mol %, and a hydroxy group content of 35.5 mol % was dissolved in pyridine. To the dissolved polyvinyl butyral resin, 22.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 1700) was obtained. A degree of acetylation of the obtained polyvinyl butyral resin was 23 mol %, a degree of butyralization thereof was 64 mol %, and a hydroxy group content thereof was 13 mol %.

Synthesis Example 4

Synthesis of Polyvinyl Acetal Resin Used in an Intermediate Layer A of Example 4

Synthesis of Polyvinyl Butyral Resin

A polyvinyl butyral resin (average degree of polymerization of 2300) having a degree of acetylation of 13 mol %, a degree of butyralization of 59 mol %, and a hydroxy group content of 28 mol % was dissolved in pyridine. To the dissolved polyvinyl butyral resin, 5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 2300) was obtained. A degree of acetylation of the obtained polyvinyl butyral resin was 23 mol %, a degree of butyralization thereof was 59 mol %, and a hydroxy group content thereof was 18 mol %.

Synthesis Example 5

Synthesis of Polyvinyl Acetal Resin Used in an Intermediate Layer A of Example 5

Synthesis of Polyvinyl Butyral Resin

A polyvinyl butyral resin (average degree of polymerization of 1400) having a degree of acetylation of 6 mol %, a degree of butyralization of 70 mol %, and a hydroxy group content of 24 mol % was dissolved in pyridine. To the dissolved polyvinyl butyral resin, 6.8 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 1400) was obtained. A degree of acetylation of the obtained polyvinyl butyral resin was 12.8 mol %, a degree of butyralization thereof was 70 mol %, and a hydroxy group content thereof was 17.2 mol %.

Synthesis Example 6

Synthesis of Polyvinyl Acetal Resin Used in an Intermediate Layer A of Example 6

Synthesis of Polyvinyl Butyral Resin

A polyvinyl butyral resin (average degree of polymerization of 1700) having a degree of acetylation of 0.5 mol %, a degree of butyralization of 80 mol %, and a hydroxy group content of 19.5 mol % was dissolved in pyridine. To the dissolved polyvinyl butyral resin, 6.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 1700) was obtained. A degree of acetylation of the obtained polyvinyl butyral resin was 7 mol %, a degree of butyralization thereof was 80 mol %, and a hydroxy group content thereof was 13 mol %.

Synthesis Example 7

Synthesis of Polyvinyl Acetal Resin Used in an Intermediate Layer A of Example 7

Synthesis of Polyvinyl Butyral Resin

A polyvinyl butyral resin (average degree of polymerization of 1700) having a degree of acetylation of 1 mol %, a degree of butyralization of 64 mol %, and a hydroxy group content of 35 mol % was dissolved in toluene. To 100 parts by weight of the polyvinyl butyral resin solution (toluene:polyvinyl butyral resin=95 parts by weight:5 parts by weight), 6 parts by weight of trifluoroacetic acid was added, and the mixture was stirred for 300 minutes at a temperature of 80° C. After removal of toluene, the polyvinyl butyral resin was washed with water and dried, so that a polyvinyl butyral resin (average degree of polymerization of 1700) was obtained. A degree of acetylation of the obtained polyvinyl butyral resin was 1 mol %, a degree of butyralization thereof was 93 mol %, and a hydroxy group content thereof was 6 mol %.

Synthesis Example 8

Synthesis of Polyvinyl Acetal Resin Used in Intermediate Layers A of Comparative Examples 1 and 2

Synthesis of Polyvinyl Butyral Resin

To pure water (2890 g), a polyvinyl alcohol resin (191 g, degree of polymerization: 3000, degree of saponification: 87.2 mol %) was added and heated to be dissolved. The resulting solution was adjusted to a temperature of 12° C. A 35% by weight hydrochloric acid (201 g) and n-butyl aldehyde (150 g) were added thereto for deposition of a polyvinyl butyral resin. Then, the mixture was held at a temperature of 50° C. for five hours for completion of the reaction. Unreacted n-butyl aldehyde was washed away with excessive water, and the hydrochloric acid catalyst was neutralized. The resulting product was dried after removal of salts, thereby giving a polyvinyl butyral resin. A degree of acetylation of the obtained polyvinyl butyral resin was 12.8 mol %, a degree of butyralization thereof was 63.5 mol %, and a hydroxy group content thereof was 23.7 mol %.

Synthesis Example 9

Synthesis of Polyvinyl Acetal Resin Used in an Intermediate Layer A of Example 8

Synthesis of Polyvinyl Butyral Resin

To pure water (2890 g), a polyvinyl alcohol resin (80 g, degree of polymerization: 2500, degree of saponification: 79 mol %) and a polyvinyl alcohol resin (111 g, degree of polymerization: 4000, degree of saponification: 79 mol %) were added and heated to be dissolved. The resulting solution was adjusted to a temperature of 12° C. A 35% by weight hydrochloric acid (201 g) and n-butyl aldehyde (150 g) were added thereto for deposition of a polyvinyl butyral resin. Then, the mixture was held at a temperature of 50° C.

for three hours for completion of the reaction. Unreacted n-butyl aldehyde was washed away with excessive water, and the hydrochloric acid catalyst was neutralized. The resulting product was dried after removal of salts, thereby giving a polyvinyl butyral resin. A degree of acetylation of the obtained polyvinyl butyral resin was 21 mol %, a degree of butyralization thereof was 54 mol %, and a hydroxy group content thereof was 25 mol %.

The proportion of a high molecular weight component X (polyvinyl butyral resin) having an absolute molecular weight of one million or more in the resulting polyvinyl butyral resin was 16.8%. The proportion of the high molecular weight component Y (polyvinyl butyral resin) having a molecular weight y of one million or more in an obtained polyvinyl butyral resin Z was 19.2%.

Synthesis Example 10

Synthesis of Polyvinyl Acetal Resin Used in an Intermediate Layer A of Example 9

Synthesis of Polyvinyl Butyral Resin

A polyvinyl butyral resin (average degree of polymerization of 3200) having a degree of acetylation of 0.5 mol %, a degree of butyralization of 64 mol %, and a hydroxy group content of 35.5 mol % was dissolved in pyridine. To the dissolved polyvinyl butyral resin, 17.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3200) was obtained. A degree of acetylation of the obtained polyvinyl butyral resin was 18 mol %, a degree of butyralization thereof was 64 mol %, and a hydroxy group content thereof was 18 mol %.

Synthesis Example 11

Synthesis of Polyvinyl Acetal Resin Used in an Intermediate Layer A of Example 10

Synthesis of Polyvinyl Butyral Resin

A polyvinyl butyral resin (average degree of polymerization of 3200) having a degree of acetylation of 0.5 mol %, a degree of butyralization of 64 mol %, and a hydroxy group content of 35.5 mol % was dissolved in pyridine. To the dissolved polyvinyl butyral resin, 22.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3200) was obtained. A degree of acetylation of the obtained polyvinyl butyral resin was 23 mol %, a degree of butyralization thereof was 64 mol %, and a hydroxy group content thereof was 13 mol %.

Synthesis Example 12

Synthesis of Polyvinyl Acetal Resin Used in an Intermediate Layer A of Example 11

Synthesis of Polyvinyl Butyral Resin

A polyvinyl butyral resin (average degree of polymerization of 3500) having a degree of acetylation of 13 mol %, a degree of butyralization of 59 mol %, and a hydroxy group content of 28 mol % was dissolved in pyridine. To the dissolved polyvinyl butyral resin, 5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3500) was obtained. A degree of acetylation of the obtained polyvinyl butyral resin was 23 mol %, a degree of butyralization thereof was 59 mol %, and a hydroxy group content thereof was 18 mol %.

Synthesis Example 13

Synthesis of Polyvinyl Acetal Resin Used in an Intermediate Layer A of Example 12

Synthesis of Polyvinyl Butyral Resin

A polyvinyl butyral resin (average degree of polymerization of 3300) having a degree of acetylation of 6 mol %, a degree of butyralization of 70 mol %, and a hydroxy group content of 24 mol % was dissolved in pyridine. To the dissolved polyvinyl butyral resin, 6.8 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 12.8 mol %, a degree of butyralization thereof was 70 mol %, and a hydroxy group content thereof was 17.2 mol %.

Synthesis Example 14

Synthesis of Polyvinyl Acetal Resin Used in Intermediate Layers A of Examples 13, 23, 26 to 29

Synthesis of Polyvinyl Butyral Resin

A polyvinyl butyral resin (average degree of polymerization of 3200) having a degree of acetylation of 0.5 mol %, a degree of butyralization of 80 mol %, and a hydroxy group content of 19.5 mol % was dissolved in pyridine. To the dissolved polyvinyl butyral resin, 6.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3200) was obtained. A degree of acetylation of the obtained polyvinyl butyral resin was 7 mol %, a degree of butyralization thereof was 80 mol %, and a hydroxy group content thereof was 13 mol %.

Synthesis Example 15

Synthesis of Polyvinyl Acetal Resin Used in an Intermediate Layer A of Example 14

Synthesis of Polyvinyl Butyral Resin

A polyvinyl butyral resin (average degree of polymerization of 3200) having a degree of acetylation of 1 mol %, a degree of butyralization of 64 mol %, and a hydroxy group content of 35 mol % was dissolved in toluene. To 100 parts by weight of the polyvinyl butyral resin solution (toluene:

polyvinyl butyral resin=95 parts by weight:5 parts by weight), 6 parts by weight of trifluoroacetic acid was added, and the mixture was stirred for 300 minutes at a temperature of 80° C. After removal of toluene, the polyvinyl butyral resin was washed with water and dried, so that a polyvinyl butyral resin (average degree of polymerization of 3200) was obtained. A degree of acetylation of the obtained polyvinyl butyral resin was 1 mol %, a degree of butyralization thereof was 93 mol %, and a hydroxy group content thereof was 6 mol %.

Synthesis Example 16

Synthesis of Polyvinyl Acetal Resin Used in an Intermediate Layer A of Example 15

Synthesis of Polyvinyl Butyral Resin

A polyvinyl butyral resin (average degree of polymerization of 3300) having a degree of acetylation of 1 mol %, a degree of butyralization of 83 mol %, and a hydroxy group content of 16 mol % was dissolved in pyridine. To the dissolved polyvinyl butyral resin, 6 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 7 mol %, a degree of butyralization thereof was 83 mol %, and a hydroxy group content thereof was 10 mol %.

Synthesis Example 17

Synthesis of Polyvinyl Acetal Resin Used in an Intermediate Layer A of Example 16

Synthesis of Polyvinyl Butyral Resin

A polyvinyl butyral resin (average degree of polymerization of 3300) having a degree of acetylation of 1 mol %, a degree of butyralization of 80 mol %, and a hydroxy group content of 19 mol % was dissolved in pyridine. To the dissolved polyvinyl butyral resin, 11.8 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 12.8 mol %, a degree of butyralization thereof was 80 mol %, and a hydroxy group content thereof was 7.2 mol %.

Synthesis Example 18

Synthesis of Polyvinyl Acetal Resin Used in Intermediate Layers A of Examples 17 and 24

Synthesis of Polyvinyl Butyral Resin

A polyvinyl butyral resin (average degree of polymerization of 3300) having a degree of acetylation of 1 mol %, a degree of butyralization of 75 mol %, and a hydroxy group content of 24 mol % was dissolved in pyridine. To the dissolved polyvinyl butyral resin, 11.8 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 12.8 mol %, a degree of butyralization thereof was 75 mol %, and a hydroxy group content thereof was 12.2 mol %.

Synthesis Example 19

Synthesis of Polyvinyl Acetal Resin Used in an Intermediate Layer A of Example 18

Synthesis of Polyvinyl Butyral Resin

A polyvinyl butyral resin (average degree of polymerization of 3300) having a degree of acetylation of 1 mol %, a degree of butyralization of 60 mol %, and a hydroxy group content of 39 mol % was dissolved in pyridine. To the dissolved polyvinyl butyral resin, 19.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 20.5 mol %, a degree of butyralization thereof was 60 mol %, and a hydroxy group content thereof was 19.5 mol %.

Synthesis Example 20

Synthesis of Polyvinyl Acetal Resin Used in an Intermediate Layer A of Example 19

Synthesis of Polyvinyl Butyral Resin

A polyvinyl butyral resin (average degree of polymerization of 3300) having a degree of acetylation of 1 mol %, a degree of butyralization of 65 mol %, and a hydroxy group content of 34 mol % was dissolved in pyridine. To the dissolved polyvinyl butyral resin, 19.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 20.5 mol %, a degree of butyralization thereof was 65 mol %, and a hydroxy group content thereof was 14.5 mol %.

Synthesis Example 21

Synthesis of Polyvinyl Acetal Resin Used in Intermediate Layers A of Examples 20 and 25

Synthesis of Polyvinyl Butyral Resin

A polyvinyl butyral resin (average degree of polymerization of 3300) having a degree of acetylation of 1 mol %, a degree of butyralization of 70 mol %, and a hydroxy group content of 29 mol % was dissolved in pyridine. To the dissolved polyvinyl butyral resin, 19.5 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 20.5 mol %, a degree of butyralization thereof was 70 mol %, and a hydroxy group content thereof was 9.5 mol %.

Synthesis Example 22

Synthesis of Polyvinyl Acetal Resin Used in an Intermediate Layer A of Example 21

Synthesis of Polyvinyl Butyral Resin

A polyvinyl butyral resin (average degree of polymerization of 3300) having a degree of acetylation of 1 mol %, a degree of butyralization of 60 mol %, and a hydroxy group content of 39 mol % was dissolved in pyridine. To the dissolved polyvinyl butyral resin, 24 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 25 mol %, a degree of butyralization thereof was 60 mol %, and a hydroxy group content thereof was 15 mol %.

Synthesis Example 23

Synthesis of Polyvinyl Acetal Resin Used in an Intermediate Layer A of Example 22

Synthesis of Polyvinyl Butyral Resin

A polyvinyl butyral resin (average degree of polymerization of 3300) having a degree of acetylation of 1 mol %, a degree of butyralization of 65 mol %, and a hydroxy group content of 34 mol % was dissolved in pyridine. To the dissolved polyvinyl butyral resin, 24 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 25 mol %, a degree of butyralization thereof was 65 mol %, and a hydroxy group content thereof was 10 mol %.

Synthesis Example 24

Synthesis of Polyvinyl Acetal Resin Used in an Intermediate Layer A of Example 30

Synthesis of Polyvinyl Butyral Resin

A polyvinyl butyral resin (average degree of polymerization of 3300) having a degree of acetylation of 1 mol %, a degree of butyralization of 65 mol %, and a hydroxy group content of 34 mol % was dissolved in pyridine. To the dissolved polyvinyl butyral resin, 27 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 28 mol %, a degree of butyralization thereof was 65 mol %, and a hydroxy group content thereof was 7 mol %.

Synthesis Example 25

Synthesis of Polyvinyl Acetal Resin Used in an Intermediate Layer A of Example 31

Synthesis of Polyvinyl Butyral Resin

A polyvinyl butyral resin (average degree of polymerization of 3300) having a degree of acetylation of 1 mol %, a degree of butyralization of 55 mol %, and a hydroxy group content of 44 mol % was dissolved in pyridine. To the dissolved polyvinyl butyral resin, 27 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 28 mol %, a degree of butyralization thereof was 55 mol %, and a hydroxy group content thereof was 17 mol %.

Synthesis Example 26

Synthesis of Polyvinyl Acetal Resin Used in an Intermediate Layer A of Example 32

Synthesis of Polyvinyl Butyral Resin

A polyvinyl butyral resin (average degree of polymerization of 3300) having a degree of acetylation of 12 mol %, a degree of butyralization of 45 mol %, and a hydroxy group content of 43 mol % was dissolved in pyridine. To the dissolved polyvinyl butyral resin, 16 molar equivalents of acetic anhydride was added, and the mixture was stirred for 300 minutes at a temperature of 800° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 28 mol %, a degree of butyralization thereof was 45 mol %, and a hydroxy group content thereof was 27 mol %.

Synthesis Example 27

Synthesis of Polyvinyl Acetal Resin Used in an Intermediate Layer A of Example 33

Synthesis of Polyvinyl Butyral Resin

A polyvinyl butyral resin (average degree of polymerization of 3300) having a degree of acetylation of 12 mol %, a degree of butyralization of 49 mol %, and a hydroxy group content of 39 mol % was dissolved in pyridine. To the dissolved polyvinyl butyral resin, 13 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 25 mol %, a degree of butyralization thereof was 49 mol %, and a hydroxy group content thereof was 26 mol %.

Synthesis Example 28

Synthesis of Polyvinyl Acetal Resin Used in an Intermediate Layer A of Example 34

Synthesis of Polyvinyl Butyral Resin

A polyvinyl butyral resin (average degree of polymerization of 3300) having a degree of acetylation of 1 mol %, a degree of butyralization of 91 mol %, and a hydroxy group content of 8 mol % was dissolved in pyridine. To the dissolved polyvinyl butyral resin, 6 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 7 mol %, a degree of butyralization thereof was 91 mol %, and a hydroxy group content thereof was 2 mol %.

Synthesis Example 29

Synthesis of Polyvinyl Acetal Resin Used in an Intermediate Layer A of Example 35

Synthesis of Polyvinyl Butyral Resin

A polyvinyl butyral resin (average degree of polymerization of 3300) having a degree of acetylation of 1 mol %, a degree of butyralization of 78 mol %, and a hydroxy group content of 21 mol % was dissolved in pyridine. To the dissolved polyvinyl butyral resin, 17 molar equivalents of acetic anhydride was added, and the mixture was stirred for 300 minutes at a temperature of 80° C. After removal of pyridine, the polyvinyl butyral resin was washed with water and dried, so that a polyvinyl butyral resin (average degree of polymerization of 3300) was obtained. A degree of acetylation of the obtained polyvinyl butyral resin was 18 mol %, a degree of butyralization thereof was 78 mol %, and a hydroxy group content thereof was 4 mol %.

Synthesis Example 30

Synthesis of Polyvinyl Acetal Resin Used in an Intermediate Layer A of Comparative Example 3

Synthesis of Polyvinyl Butyral Resin

To pure water (2890 g), a polyvinyl alcohol resin (191 g, degree of polymerization: 2300, degree of saponification: 93 mol %) was added and heated to be dissolved. The resulting solution was adjusted to a temperature of 12° C. A 35% by weight hydrochloric acid (201 g) and n-butyl aldehyde (171 g) were added thereto for deposition of a polyvinyl butyral resin. Then, the mixture was held at a temperature of 55° C. for five hours for completion of the reaction. Unreacted n-butyl aldehyde was washed away with excessive water, and the hydrochloric acid catalyst was neutralized. The resulting product was dried after removal of salts, thereby giving a polyvinyl butyral resin. A degree of acetylation of the obtained polyvinyl butyral resin was 7 mol %, a degree of butyralization thereof was 72 mol %, and a hydroxy group content thereof was 21 mol %.

Synthesis Example 31

Synthesis of Polyvinyl Acetal Resin Used in an Intermediate Layer A of Comparative Example 4

Synthesis of Polyvinyl Butyral Resin

To pure water (2890 g), a polyvinyl alcohol resin (191 g, degree of polymerization: 2300, degree of saponification: 99 mol %) was added and heated to be dissolved. The resulting solution was adjusted to a temperature of 12° C. A 35% by weight hydrochloric acid (201 g) and n-butyl aldehyde (190 g) were added thereto for deposition of a polyvinyl butyral resin. Then, the mixture was held at a temperature of 55° C. for five hours for completion of the reaction. Unreacted n-butyl aldehyde was washed away with excessive water, and the hydrochloric acid catalyst was neutralized. The resulting product was dried after removal of salts, thereby giving a polyvinyl butyral resin. A acetylation of the obtained polyvinyl butyral resin was 1 mol %, a degree of butyralization thereof was 79 mol %, and a hydroxy group content thereof was 20 mol %.

As a polyvinyl acetal resin used in protective layers B of Examples 1 to 22, and 26 to 35 and Comparative Examples 1 to 4, a polyvinyl butyral resin (n-butyl aldehyde was used, degree of butyralization of 68.5 mol %, degree of acetylation of 1 mol %, hydroxy group content of 30.5 mol %) was prepared.

As a polyvinyl acetal resin used in protective layers B of Examples 23 to 25, a polyvinyl butyral resin (n-butyl aldehyde was used, degree of butyralization of 70.5 mol %, degree of acetylation of 1.5 mol %, hydroxy group content of 28 mol %) was prepared.

The degrees of butyralization (degree of acetalization), degrees of acetylation, and hydroxy group contents of the polyvinyl butyral resins used in examples and comparative examples were measured by a method in conformity with ASTM D1396-92. It is to be noted that, in the measurement in conformity with JIS K6728 "Testing methods for polyvinyl butyral", the obtained numerical values were same as those obtained in the measurement in conformity with ASTM D1396-92.

The following plasticizers were used in examples and comparative examples.

Triethylene glycol di-2-ethylhexanoate (3GO) (SP value: 9.06)
Triethylene glycol di-n-butanoate (3 GB) (SP value: 9.45)
Bis(2-(2-butoxyethoxyethyl)ester) hexanoate (EDENOL422) (SP value: 13.85)
Bis(2-butoxyethyl) adipate (D931) (SP value: 13.56)

Example 1

(1) Production of Intermediate Film

An amount of 100 parts by weight of a polyvinyl butyral resin (n-butyl aldehyde was used, degree of butyralization of 54 mol %, degree of acetylation of 21 mol %, hydroxy group content of 25 mol %) and 55 parts by weight of triethylene glycol di-2-ethyl hexanoate (3GO) as a plasticizer were sufficiently kneaded with a mixing roll to give a composition for intermediate layer.

An amount of 100 parts by weight of a polyvinyl butyral resin (n-butyl aldehyde was used, degree of butyralization of 68.5 mol %, degree of acetylation of 1 mol %, hydroxy group content of 30.5 mol %) and 38.5 parts by weight of triethylene glycol di-2-ethylhexanoate (3GO) as a plasticizer was sufficiently kneaded to give a composition for protective layer.

The resulting composition for intermediate layer and the composition for protective layer were molded using a co-extruder to give a multilayer intermediate film (810 μm in thickness) including a protective layer B (350 μm in thickness)/an intermediate layer A (110 μm in thickness)/a protective layer B (350 μm in thickness).

(2) Production of Laminated Glass Used for Measurement of Loss Factor

The resulting multilayer intermediate film was cut into a piece in a size of 30 mm in length×320 mm in width. The multilayer intermediate film piece was sandwiched between two transparent float glass sheets (25 mm in length×305 mm in width×2.0 mm in thickness) and held in a vacuum laminator at 90° C. for 30 minutes to be vacuum-pressed, thereby giving a laminate. In the laminate, a multilayer intermediate film part protruding from the glass sheets was cut. In this manner, a laminated glass to be used for measurement of loss factor was prepared.

(3) Production of Laminated Glass Used for Bubble Formation Test A and Bubble Formation Test B The resulting multilayer intermediate film was cut into a piece in a size of 30 cm in length×15 cm in width and stored at a temperature of 23° C. for 10 hours. It is to be noted that the faces of the resulting multilayer intermediate film was embossed, and ten point height of the embossment was 30 μm. In the cut multilayer intermediate film piece, four through holes with a diameter of 6 mm were formed at intersections of lines drawn in the lengthwise direction at positions of 8 cm inside from edges of the multilayer intermediate film and lines drawn in the crosswise direction at position of 5 cm inside from edges of the multilayer intermediate film.

The multilayer intermediate film with through holes were sandwiched between two transparent float glass sheets (30 cm in length×15 cm in width×2.5 mm in thickness) to give a laminate. A width of 2 cm of the peripheral edge of the laminate was heat-sealed, and thereby the air remained in the embossment and the air remained in the through holes were sealed. This laminate was press-bonded at 135° C. and 1.2 MPa for 20 minutes, and thereby the residual air was dissolved into the multilayer intermediate film. As a result, a laminated glass to be used in the bubble formation test A and the bubble formation test B was obtained.

Examples 2 to 35 and Comparative Examples 1 to 4

Except that the types and amounts of the polyvinyl acetal resin and the plasticizer used in the intermediate layer A and the protective layers B, and the thicknesses of the intermediate layer A and the protective layers B were set as shown in Tables 1 to 5, a multilayer intermediate film and a laminated glass were obtained in the same manner as in Example 1. The polyvinyl butyral resins used in Examples 2 to 35 and Comparative Examples 1 to 4 each were a resin prepared by butyralization of n-butyl aldehyde.

(Evaluations)

(1) a Peak Temperature of Tan δ which Appears at the Lowest Temperature, and a Maximum Value of Tan δ at a Peak which Appears at the Lowest Temperature The resulting intermediate films were stored at a temperature of 20° C. for a month. The intermediate films were each cut into a circle with a diameter of 8 mm and examined for the dispersion of dynamic viscoelasticity with temperatures at a rate of temperature rise of 5° C./min under the conditions of at a distortion of 1.0% and a frequency of 1 Hz by a shearing method using a viscoelasticity measuring device ("ARES" from Rheometric Scientific Inc.). In this manner, a peak temperature of tan δ which appears at the lowest temperature, and a maximum value of tan δ at a peak which appears at the lowest temperature were measured.

(2) Loss Factor

Laminated glasses to be used for the measurement of loss factor were stored at 20° C. for a month. The loss factor of each stored laminated glass was measured at 20° C. by a center exciting method using a measurement device "SA-01" (RION Co., Ltd.). Based on the obtained loss factors, loss factors (20° C. loss factor) in the fourth mode (around 3150 Hz) of resonance frequencies were evaluated.

(3) Bubble Formation Test A (State of Bubble Formation)

With respect to each of the multilayer intermediate films, five laminated glasses to be used in the bubble formation test A were produced, and then left to stand for 100 hours in a 50° C. oven. The left laminated glasses were visually examined for the presence of bubble formation and the size of the bubbles in a plan view, and the state of bubble formation was evaluated based on the following criteria.

[Criteria for the State of Bubble Formation in the Bubble Formation Test A]

The bubbles generated in the five laminated glasses were each approximated to an ellipse, and the area of the ellipse was defined as the bubble formation area. The areas of the ellipses observed in the five laminated glass were averaged, and the proportion (percentage) of the averaged value (bubble formation area) of the areas of the ellipses to the area (30 cm×15 cm) of the laminated glass was determined.

○○: No bubbles were observed in any of five laminated glasses

○: The ratio of the average value (bubble formation area) of the areas of the ellipses was lower than 5%

Δ: The ratio of the average value (bubble formation area) of the areas of the ellipses was 5% or higher and lower than 10%

X: The ratio of the average value (bubble formation area) of the areas of the ellipses was 10% or higher (4) Bubble Formation Test B (State of Bubble formation)

With respect to each of the multilayer intermediate films, 30 laminated glasses to be used in the bubble formation test B were produced, and then left to stand for 24 hours in a 50° C. oven. The number of laminated glass in which bubble formation was visually observed among the left laminated glasses was counted, and the state of bubble formation was evaluated based on the following criteria.

[Criteria for the State of Bubble Formation in the Bubble Formation Test B]

○○: The number of laminated glasses in which bubbles were visually observed was 5 or less ○: The number of laminated glasses in which bubbles were visually observed was not less than 6 but not more than 10

Δ: The number of laminated glasses in which bubbles were visually observed was not less than 11 but not more than 15

X: The number of laminated glasses in which bubbles were visually observed was 16 or more (5) Measurement of Elastic Modulus G' by Test Method A An amount of 100 parts by weight of each of the polyvinyl acetal resins (polyvinyl acetal resins used in the first layers) which is contained in the first layers of the intermediate films for laminated glass of examples and comparative examples and 60 parts by weight of triethylene glycol di-2-ethylhexanoate (3GO) as a plasticizer were sufficiently kneaded to give a kneaded product. The resulting kneaded products were each press-molded to be formed into resin films A having an average thickness of 0.35 mm. The obtained resin films A were left to stand under the conditions of a temperature of 25° C. and a relative humidity of 30% for two hours. After standing for two hours, the viscoelasticity was measured using ARES-G2 (TA INSTRUMENTS). The geometry used here was a 8-mm-diameter parallel plate. The measurement was performed under the condition wherein the temperature was lowered from 100° C. to −10° C. at a lowering rate of 3° C./min at a frequency of 1 Hz and a distortion of 1%. In the obtained measurement results, the peak temperature of the loss factor was defined as a glass transition temperature Tg (° C.). Further, based on the measurement results and the glass transition temperature Tg, the value of the elastic modulus G' (Tg+30) at (Tg+30) ° C. and the value of the elastic modulus G' (Tg+80) at (Tg+80)° C. were obtained. In addition, the ratio (G' (Tg+80)/G' (Tg+30)) was determined.

(6) Measurement of Elastic Modulus G' by Test Method B

The intermediate film for laminated glass of each of the examples and comparative examples was stored in a constant temperature and humidity room (humidity: 30% (±3%), temperature: 23° C.) for a month. Immediately after the storage for a month, the surface layer, the intermediate layer, and the surface layer were separated, and thereby the intermediate layer was taken out. One gram of the separated intermediate layer was placed in a mold (2 cm in length×2 cm in width×0.76 mm in thickness) disposed between two polyethylene terephthalate (PET) films. The intermediate layer was preheated at a temperature of 150° C. and a pressure of 0 kg/cm² for 10 minutes, and then press-molded at 80 kg/cm² for 15 minutes. The press-molded intermediate layer was placed in a hand press machine set to 20° C. in advance, and then pressed at 10 MPa for 10 minutes. Thereby, the intermediate layer was cooled down. Next, one of the two PET films was peeled off from the mold disposed therebetween, and the intermediate layer in the mold was stored in a constant temperature and humidity room (humidity: 30% (±3%), temperature: 23° C.) for 24 hours. Then, the viscoelasticity of the intermediate layer was measured using ARES-G2 (TA INSTRUMENTS). The geometry used here was a 8-mm-diameter parallel plate. The measurement was performed under the condition wherein the temperature was lowered from 100° C. to −10° C. at a lowering rate of 3° C./min and at a frequency of 1 Hz and a distortion of 1%. In the obtained measurement results, the peak temperature of the loss factor was defined as a glass transition temperature Tg (° C.). Further, based on the measurement results and the glass transition temperature Tg, the value of the elastic modulus G' (Tg+30) at (Tg+30) ° C. and the value of the elastic modulus G' (Tg+80) at (Tg+80)° C. were obtained. In addition, the ratio (G' (Tg+80)/G' (Tg+30)) was determined.

(7) Measurement of Absolute Molecular Weight and Molecular Weight y (Measurement of Absolute Molecular Weight)

The absolute molecular weight and molecular weight in terms of polystyrene for obtaining the proportions of the high molecular weight component X and the high molecular weight component Y in Synthesis Example 9 are values obtained by separating the surface layers and the intermediate layer of each resulting multilayer intermediate film and following the below procedures.

For measurement of the absolute molecular weight, each multilayer intermediate film was left to stand in a constant temperature and humidity room (humidity of 30% (±3%), temperature of 23° C.) for a month. After standing for a month, the multilayer intermediate film was separated into the surface layers and the intermediate layer. The peeled intermediate layer was dissolved in tetrahydrofuran (THF), thereby preparing a 0.1% by weight solution. The resulting solution was analyzed using a Gel Permeation Chromatography (GPC) device (Hitachi High-Technologies Corp., "RI: L2490, auto sampler: L-2200, pump: L-2130, column oven: L-2350, Column: GL-A120-S and GL-A100MX-S in series"). The GPC device is connected with a light scattering detector for GPC (VISCOTEK, "Model 270 (RALS+VISCO)"), enabling analysis of a chromatogram by each detector. Peaks of polyvinyl acetal resin components in chromatograms by an RI detector and an RALS detector were analyzed using analysis software (OmniSEC). In this manner, the absolute molecular weight at each elution time of the polyvinyl acetal resin was obtained. The proportion of an area where the absolute molecular weight of the polyvinyl acetal resin is one million or more in the peak area of the polyvinyl acetal resin detected by the RI detector was expressed in percentage (%).

Each peak in a chromatogram satisfies the following equations.

$$A_{RI}=c \times (dn/dc) \times K_{RI} \quad \text{formula (1)}$$

$$A_{RALS}=c \times M \times (dn/dc)^2 \times K_{RALS} \quad \text{formula (2)}$$

Here, c represents polymer concentration in the solution, (dn/dc) represents a refractive index increment, M represents an absolute molecular weight, and K represents a system's coefficient.

In a specific procedure of measurement, a polystyrene standard sample (VISCOTEK, PolyCAL (registered trade mark), TDS-PS-NB, Mw=98390, dn/dc=0.185) having known c, M, and (dn/dc) was used to prepare 0.1% by weight solution in THF. Based on the GPC measurement result of the prepared polystyrene solution, the system's coefficient of each detector was obtained using the formula (1) and the formula (2).

Next, the peeled intermediate layer was dissolved in THF to prepare a solution in THF. Based on the GPC measurement result of the obtained polyvinyl acetal resin solution, the absolute molecular weight M of the polyvinyl acetal resin was obtained using the formula (1) and the formula (2).

For analysis of the intermediate layer (including the polyvinyl acetal resin and the plasticizer), the concentration of the polyvinyl acetal resin in the polyvinyl acetal resin solution needs to be determined. The concentration of the polyvinyl acetal resin is calculated based on the measurement result of the plasticizer content.

Measurement of Plasticizer Content:

The plasticizer was dissolved in THF to prepare plasticizer-THF solutions having plasticizer contents of 10% by weight, 15% by weight, 20% by weight, 25% by weight, 30% by weight, 35% by weight, 40% by weight, 45% by weight, and 50% by weight. Each obtained plasticizer-THF solution was subjected to GPC measurement and the peak area of the plasticizer was obtained. The peak areas relative to concentrations of the plasticizer were plotted, so that an approximate straight line was obtained. Then, the solution in THF which contains the intermediate layer dissolved in THF was subjected to GPC measurement. The plasticizer content was obtained from the peak area of the plasticizer using the approximate straight line.

(Measurement of Molecular Weight y)

In the same manner as in the measurement method of the absolute molecular weight, the proportion (%) of the high molecular weight component Y having a molecular weight y of one million or more in the polyvinyl acetal resin was calculated based on the proportion of the area corresponding to the region where the molecular weight is one million or more in the peak area (measurement result of GPC) detected by the RI detector in measurement of the molecular weight in terms of polystyrene by gel permeation chromatography (GPC).

In order to measure the molecular weight in terms of polystyrene, polystyrene standard samples with known molecular weights were subjected to GPC measurement. The polystyrene standard samples used (SHOWA DENKO K.K., "Shodex Standard SM-105", "Shodex Standard SH-75") were 14 samples with the respective weight average molecular weights of 580, 1,260, 2,960, 5,000, 10,100, 21,000, 28,500, 76,600, 196,000, 630,000, 1,130,000, 2,190,000, 3,150,000, and 3,900,000. The weight average molecular weights relative to the elution times indicated by the peak tops of the standard sample peaks are plotted so that an approximate straight line was drawn. The obtained approximate straight line was used as a calibration curve. A multi-layer intermediate film was left in a constant temperature and humidity room (humidity: 30% (±3%), temperature: 23° C.) for one month, and then the surface layers and the intermediate layer were separated. The separated intermediate layer was dissolved in tetrahydrofuran (THF) to prepare a 0.1% by weight solution. The obtained solution was analyzed using a GPC device, and thereby the peak area of the polyvinyl acetal resin in the intermediate layer was measured. Based on the elution time of the polyvinyl acetal resin in the intermediate layer and the calibration curve, the area corresponding to a region where the molecular weight in terms of polystyrene of the polyvinyl acetal resin in the intermediate layer was one million or more was calculated. The area corresponding to the region where the molecular weight in terms of polystyrene of the polyvinyl acetal resin in the intermediate layer was one million or more was divided by the peak area of the polyvinyl acetal resin in the intermediate layer, and the obtained value was expressed in a percentage (%). Thereby, the proportion (%) of the high molecular weight component Y having a molecular weight y of one million or more in the polyvinyl acetal resin was calculated.

Tables 1 to 5 show the results. In Tables 1 to 5, 3GO indicates triethylene glycol di-2-ethylhexanoate.

TABLE 1

| | | | Ex. 1 | Ex. 2 | Ex. 3 | Ex. 4 |
|---|---|---|---|---|---|---|
| Intermediate layer A | Resin | Degree of butyralization (mol %) | 54 | 64 | 64 | 59 |
| | | Degree of acetylation (mol %) | 21 | 18 | 23 | 23 |
| | | Hydroxy group content (mol %) | 25 | 18 | 13 | 18 |
| | | Amount (parts by weight) | 100 | 100 | 100 | 100 |
| | Plasticizer | Kind | 3GO | 3GO | 3GO | 3GO |
| | | Amount (part by weight) | 55 | 55 | 45 | 50 |
| Protective layer B | Resin | Degree of butyralization (mol %) | 68.5 | 68.5 | 68.5 | 68.5 |
| | | Degree of acetylation (mol %) | 1 | 1 | 1 | 1 |
| | | Hydroxy group content (mol %) | 30.5 | 30.5 | 30.5 | 30.5 |
| | | Amount (parts by weight) | 100 | 100 | 100 | 100 |
| | Plasticizer | Kind | 3GO | 3GO | 3GO | 3GO |
| | | Amount (parts by weight) | 38.5 | 38.5 | 38.5 | 38.5 |
| Film composition | | | B/A/B | B/A/B | B/A/B | B/A/B |
| Thickness of protective layer B (μm)/thickness of intermediate layer A (μm)/thickness of protective layer B (μm) | | | 350/110/350 | 350/110/350 | 350/110/350 | 350/80/350 |
| Thickness of intermediate layer A (μm)/total thickness of protective layers B (μm) | | | 0.16 | 0.16 | 0.16 | 0.11 |
| Peak temperature (° C.) of tan δ which appears at the lowest temperature | | | −2.4 | −4 | −3.1 | −3.4 |
| Maximum value of tan δ at a neak which appears at the lowest temperature | | | 1.3 | 1.32 | 1.54 | 1.41 |
| 20° C. loss factor at around 3150 Hz | | | 0.33 | 0.33 | 0.45 | 0.35 |

| | | | Ex. 5 | Ex. 6 | Ex. 7 | Comp. Ex. 1 |
|---|---|---|---|---|---|---|
| Intermediate layer A | Resin | Degree of butyralization (mol %) | 70 | 80 | 93 | 63.5 |
| | | Degree of acetylation (mol %) | 12.8 | 7 | 1 | 12.8 |
| | | Hydroxy group content (mol %) | 17.2 | 13 | 6 | 23.7 |
| | | Amount (parts by weight) | 100 | 100 | 100 | 100 |
| | Plasticizer | Kind | 3GO | 3GO | 3GO | 3GO |
| | | Amount (part by weight) | 55 | 55 | 55 | 60 |
| Protective layer B | Resin | Degree of butyralization (mol %) | 68.5 | 68.5 | 68.5 | 68.5 |
| | | Degree of acetylation (mol %) | 1 | 1 | 1 | 1 |
| | | Hydroxy group content (mol %) | 30.5 | 30.5 | 30.5 | 30.5 |
| | | Amount (parts by weight) | 100 | 100 | 100 | 100 |
| | Plasticizer | Kind | 3GO | 3GO | 3GO | 3GO |
| | | Amount (parts by weight) | 38.5 | 38.5 | 38.5 | 38.5 |
| Film composition | | | B/A/B | B/A/B | B/A/B | B/A/B |
| Thickness of protective layer B (μm)/thickness of intermediate layer A (μm)/thickness of protective layer B (μm) | | | 350/110/350 | 350/110/350 | 350/300/350 | 350/110/350 |
| Thickness of intermediate layer A (μm)/total thickness of protective layers B (μm) | | | 0.16 | 0.16 | 0.43 | 0.16 |
| Peak temperature (° C.) of tan δ which appears at the lowest temperature | | | −2.3 | −1.8 | −4.5 | −4.2 |
| Maximum value of tan δ at a neak which appears at the lowest temperature | | | 1.32 | 1.31 | 1.41 | 1.05 |
| 20° C. loss factor at around 3150 Hz | | | 0.33 | 0.32 | 0.35 | 0.28 |

TABLE 2

| | | | Ex. 8 | Ex. 9 | Ex. 10 | Ex. 11 |
|---|---|---|---|---|---|---|
| Intermediate layer A | Resin | Degree of butyralization (mol %) | 54 | 64 | 64 | 59 |
| | | Degree of acetylation (mol %) | 21 | 18 | 23 | 23 |
| | | Hydroxy group content (mol %) | 25 | 18 | 13 | 18 |
| | | Amount (parts by weight) | 100 | 100 | 100 | 100 |
| | Plasticizer | Kind | 3GO | 3GO | 3GO | 3GO |
| | | Amount (parts by weight) | 60 | 60 | 60 | 60 |
| Protective layer B | Resin | Degree of butyralization (mol %) | 68.5 | 68.5 | 68.5 | 68.5 |
| | | Degree of acetylation (mol %) | 1 | 1 | 1 | 1 |
| | | Hydroxy group content (mol %) | 30.5 | 30.5 | 30.5 | 30.5 |
| | | Amount (parts by weight) | 100 | 100 | 100 | 100 |
| | Plasticizer | Kind | 3GO | 3GO | 3GO | 3GO |
| | | Amount (parts by weight) | 34 | 33.5 | 31 | 32 |
| Film composition | | | B/A/B | B/A/B | B/A/B | B/A/B |
| Thickness of protective layer B (μm)/thickness of intermediate layer A (μm)/thickness of protective layer B (μm) | | | 350/110/350 | 350/110/350 | 350/110/350 | 350/80/350 |
| Thickness of intermediate layer A (μm)/total thickness of protective layers B (μm) | | | 0.16 | 0.16 | 0.16 | 0.11 |
| Peak temperature (° C.) of tan δ which appears at the lowest temperature | | | −0.85 | −4 | −3.1 | −3.4 |
| Maximum value of tan δ at a peak which appears at the lowest temperature | | | 1.3 | 1.32 | 1.54 | 1.41 |
| 20° C. loss factor at around 3150 Hz | | | 0.33 | 0.33 | 0.45 | 0.35 |
| Bubble formation test A (state of bubble formation) | | | ○○ | ○○ | ○○ | ○○ |
| Bubble formation test B (state of bubble formation) | | | ○ | ○ | ○ | ○ |
| Test method A: Glass transition temperature (Tg) (° C.) | | | −2.4 | −4.3 | −3.7 | −4 |
| Test method A: G' (Tg + 30) (Pa) | | | 230800 | 222100 | 223300 | 224600 |
| Test method A: G' (Tg + 80) (Pa) | | | 155000 | 147000 | 149300 | 162600 |
| Test method A: G' (Tg + 80)/G' (Tg + 30) | | | 0.67 | 0.66 | 0.67 | 0.68 |
| Test method B: Glass transition temperature (Tg) (° C.) | | | −4.21 | −6.04 | −6.01 | −6.21 |
| Test method B: G' (Tg + 30) (Pa) | | | 210300 | 208500 | 205500 | 197800 |
| Test method B: G' (Tg + 80) (Pa) | | | 139500 | 137500 | 137400 | 134000 |
| Test method B: G' (Tg + 80)/G' (Tg + 30) | | | 0.66 | 0.66 | 0.67 | 0.68 |

| | | | Ex. 12 | Ex. 13 | Ex. 14 | Comp. Ex. 2 |
|---|---|---|---|---|---|---|
| Intermediate layer A | Resin | Degree of butyralization (mol %) | 70 | 80 | 93 | 63.5 |
| | | Degree of acetylation (mol %) | 12.8 | 7 | 1 | 12.8 |
| | | Hydroxy group content (mol %) | 17.2 | 13 | 6 | 23.7 |
| | | Amount (parts by weight) | 100 | 100 | 100 | 100 |
| | Plasticizer | Kind | 3GO | 3GO | 3GO | 3GO |
| | | Amount (parts by weight) | 60 | 60 | 60 | 60 |
| Protective layer B | Resin | Degree of butyralization (mol %) | 68.5 | 68.5 | 68.5 | 68.5 |
| | | Degree of acetylation (mol %) | 1 | 1 | 1 | 1 |
| | | Hydroxy group content (mol %) | 30.5 | 30.5 | 30.5 | 30.5 |
| | | Amount (parts by weight) | 100 | 100 | 100 | 100 |
| | Plasticizer | Kind | 3GO | 3GO | 3GO | 3GO |
| | | Amount (parts by weight) | 35.5 | 32.5 | 31.5 | 38.5 |
| Film composition | | | B/A/B | B/A/B | B/A/B | B/A/B |
| Thickness of protective layer B (μm)/thickness of intermediate layer A (μm)/thickness of protective layer B (μm) | | | 350/110/350 | 350/110/350 | 350/300/350 | 350/110/350 |
| Thickness of intermediate layer A (μm)/total thickness of protective layers B (μm) | | | 0.16 | 0.16 | 0.43 | 0.16 |
| Peak temperature (° C.) of tan δ which appears at the lowest temperature | | | −2.3 | −1.8 | −4.5 | −4.2 |
| Maximum value of tan δ at a peak which appears at the lowest temperature | | | 1.32 | 1.31 | 1.41 | 1.05 |
| 20° C. loss factor at around 3150 Hz | | | 0.33 | 0.32 | 0.35 | 0.28 |
| Bubble formation test A (state of bubble formation) | | | ○○ | ○○ | ○○ | X |
| Bubble formation test B (state of bubble formation) | | | ○ | ○ | ○ | X |
| Test method A: Glass transition temperature (Tg) (° C.) | | | −2.9 | −2.6 | −5.1 | −2.3 |
| Test method A: G' (Tg + 30) (Pa) | | | 231200 | 231500 | 213200 | 234500 |
| Test method A: G' (Tg + 80) (Pa) | | | 153400 | 157400 | 147500 | 142000 |
| Test method A: G' (Tg + 80)/G' (Tg + 30) | | | 0.86 | 0.68 | 0.69 | 0.61 |
| Test method B: Glass transition temperature (Tg) (° C.) | | | −5.22 | −5.23 | −6.77 | −4.11 |
| Test method B: G' (Tg + 30) (Pa) | | | 205200 | 205600 | 191000 | 224500 |
| Test method B: G' (Tg + 80) (Pa) | | | 135800 | 136400 | 128600 | 131000 |
| Test method B: G' (Tg + 80)/G' (Tg + 30) | | | 0.66 | 0.66 | 0.68 | 0.58 |

TABLE 3

|  |  |  | Ex. 15 | Ex. 16 | Ex. 17 | Ex. 18 | Ex. 19 | Ex. 20 |
|---|---|---|---|---|---|---|---|---|
| Intermediate layer A | Resin | Degree of butyralization (mol %) | 83 | 80 | 75 | 60 | 65 | 70 |
|  |  | Degree of acetylation (mol %) | 7 | 12.8 | 12.8 | 20.5 | 20.5 | 20.5 |
|  |  | Hydroxy group content (mol %) | 10 | 7.2 | 12.2 | 19.5 | 14.5 | 9.5 |
|  |  | Amount (parts by weight) | 100 | 100 | 100 | 100 | 100 | 100 |
|  | Plasticizer | Kind | 3GO | 3GO | 3GO | 3GO | 3GO | 3GO |
|  |  | Amount (parts by weight) | 60 | 60 | 60 | 60 | 60 | 60 |
| Protective layer B | Resin | Degree of butyralization (mol %) | 68.5 | 68.5 | 68.5 | 68.5 | 68.5 | 68.5 |
|  |  | Degree of acetylation (mol %) | 1 | 1 | 1 | 1 | 1 | 1 |
|  |  | Hydroxy group content (mol %) | 30.5 | 30.5 | 30.5 | 30.5 | 30.5 | 30.5 |
|  |  | Amount (parts by weight) | 100 | 100 | 100 | 100 | 100 | 100 |
|  | Plasticizer | Kind | 3GO | 3GO | 3GO | 3GO | 3GO | 3GO |
|  |  | Amount (parts by weight) | 31.5 | 30 | 32 | 32 | 31 | 30 |
| Film composition |  |  | B/A/B | B/A/B | B/A/B | B/A/B | B/A/B | B/A/B |
| Thickness of protective layer B (μm)/thickness of intermediate layer A (μm)/thickness of protective layer B (μm) |  |  | 350/110/350 | 350/110/350 | 350/110/350 | 350/110/350 | 350/110/350 | 350/110/350 |
| Thickness of intermediate layer A (μm/total thickness of protective layers B (μm) |  |  | 0.16 | 0.16 | 0.16 | 0.16 | 0.16 | 0.16 |
| Peak temperature (° C.) of tan δ which appears at the lowest temperature |  |  | −2.8 | −4 | −3.5 | −3.4 | −4.6 | −3.9 |
| Maximum value of tan δ at a peak which appears at the lowest temperature |  |  | 1.36 | 1.41 | 1.37 | 1.33 | 1.36 | 1.43 |
| 20° C. loss factor at around 3510 Hz |  |  | 0.34 | 0.35 | 0.34 | 0.33 | 0.34 | 0.37 |
| Bubble formation test A (state of bubble formation) |  |  | ◯◯ | ◯◯ | ◯◯ | ◯◯ | ◯◯ | ◯◯ |
| Bubble formation test B (state of bubble formation) |  |  | ◯ | ◯ | ◯ | ◯ | ◯ | ◯ |
| Test method A: Glass transition temperature (Tg) (° C.) |  |  | −3.1 | −5.1 | −3.2 | −3.2 | −4.7 | −5.8 |
| Test method A: G' (Tg + 30) (Pa) |  |  | 221200 | 204500 | 229200 | 231200 | 213200 | 206500 |
| Test method A: G' (Tg + 80) (Pa) |  |  | 149400 | 140200 | 180000 | 181300 | 149400 | 139200 |
| Test method A: G' (Tg + 80)/G'(Tg + 30) |  |  | 0.68 | 0.69 | 0.70 | 0.70 | 0.70 | 0.67 |
| Test method B: Glass transition temperature (Tg) (° C.) |  |  | −3.4 | −4.8 | −4.2 | −4 | −5.5 | −4.5 |
| Test method B: G' (Tg + 30) (Pa) |  |  | 221500 | 206500 | 201600 | 228800 | 208500 | 180400 |
| Test method B: G' (Tg + 80) (Pa) |  |  | 149000 | 140800 | 137400 | 156800 | 141600 | 120800 |
| Test method B: G' (Tg + 80)/G' (Tg + 30) |  |  | 0.67 | 0.68 | 0.68 | 0.69 | 0.68 | 0.67 |

TABLE 4

|  |  |  | Ex. 21 | Ex. 22 | Ex. 23 | Ex. 24 | Ex. 25 |
|---|---|---|---|---|---|---|---|
| Intermediate layer A | Resin | Degree of butyralization (mol %) | 80 | 65 | 80 | 75 | 70 |
|  |  | Degree of acetylation (mol %) | 25 | 25 | 7 | 12.8 | 20.5 |
|  |  | Hydroxy group content (mol %) | 15 | 10 | 13 | 12.2 | 9.5 |
|  |  | Amount (parts by weight) | 100 | 100 | 100 | 100 | 100 |
|  | Plasticizer | Kind | 3GO | 3GO | 3GO | 3GO | 3GO |
|  |  | Amount (parts by weight) | 60 | 60 | 80 | 80 | 80 |
| Protective layer B | Resin | Degree of butyralization (mol %) | 68.5 | 68.5 | 70.5 | 70.5 | 70.5 |
|  |  | Degree of acetylation (mol %) | 1 | 1 | 1.5 | 1.5 | 1.5 |
|  |  | Hydroxy group content (mol %) | 30.5 | 30.5 | 28 | 28 | 28 |
|  |  | Amount (parts by weight) | 100 | 100 | 100 | 100 | 100 |
|  | Plasticizer | Kind | 3GO | 3GO | 3GO | 3GO | 3GO |
|  |  | Amount (parts by weight) | 29.5 | 27.5 | 34.5 | 34 | 32 |
| Film composition |  |  | B/A/B | B/A/B | B/A/B | B/A/B | B/A/B |
| Thickness of protective layer B (μm)/thickness of intermediate layer A (μm)/thickness of protective layer B (μm) |  |  | 350/110/350 | 350/110/350 | 350/110/350 | 350/110/350 | 350/110/350 |
| Thickness of intermediate layer A (μm/total thickness of protective layers B (μm) |  |  | 0.16 | 0.16 | 0.16 | 0.16 | 0.16 |
| Peak temperature (° C.) of tan δ which appears at the lowest temperature |  |  | −4.6 | −4.4 | −4.8 | −5.2 | −4.3 |
| Maximum value of tan δ at a peak which appears at the lowest temperature |  |  | 1.46 | 1.5 | 1.31 | 1.43 | 1.45 |
| 20° C. loss factor at around 3150 Hz |  |  | 0.38 | 0.41 | 0.32 | 0.36 | 0.38 |
| Bubble formation test A (state of bubble formation) |  |  | ◯◯ | ◯◯ | ◯◯ | ◯◯ | ◯◯ |
| Bubble formation test B (state of bubble formation) |  |  | ◯ | ◯ | ◯ | ◯ | ◯ |
| Test method A: Glass transition temperature (Tg) (° C.) |  |  | −4.1 | −5.6 | −2.6 | −3.2 | −5.8 |
| Test method A: G' (Tg + 30) (Pa) |  |  | 212400 | 203900 | 231500 | 229200 | 206500 |
| Test method A: G' (Tg + 80) (Pa) |  |  | 144600 | 139600 | 157400 | 160000 | 139200 |
| Test method A: G' (Tg + 80)/G' (Tg + 30) |  |  | 0.68 | 0.68 | 0.68 | 0.70 | 0.67 |
| Test method B: Glass transition temperature (Tg) (° C.) |  |  | −5.1 | −5.3 | −5.7 | −5.9 | −4.8 |
| Test method B: G' (Tg + 30) (Pa) |  |  | 209100 | 203000 | 202600 | 201600 | 180400 |
| Test method B: G' (Tg + 80) (Pa) |  |  | 140800 | 138700 | 135400 | 137400 | 121000 |
| Test method B: G' (Tg + 80)/G' (Tg + 30) |  |  | 0.67 | 0.68 | 0.67 | 0.68 | 0.67 |

TABLE 4-continued

|  |  |  | Ex. 26 | Ex. 27 | Ex. 28 | Ex. 29 |
|---|---|---|---|---|---|---|
| Intermediate layer A | Resin | Degree of butyralization (mol %) | 80 | 80 | 80 | 80 |
|  |  | Degree of acetylation (mol %) | 7 | 7 | 7 | 7 |
|  |  | Hydroxy group content (mol %) | 13 | 13 | 13 | 13 |
|  |  | Amount (parts by weight) | 100 | 100 | 100 | 100 |
|  | Plasticizer | Kind | 3GB | EDENOL 422 | D931 | DBA |
|  |  | Amount (parts by weight) | 50 | 50 | 50 | 50 |
| Protective layer B | Resin | Degree of butyralization (mol %) | 68.5 | 68.5 | 68.5 | 68.5 |
|  |  | Degree of acetylation (mol %) | 1 | 1 | 1 | 1 |
|  |  | Hydroxy group content (mol %) | 30.5 | 30.5 | 30.5 | 30.5 |
|  |  | Amount (parts by weight) | 100 | 100 | 100 | 100 |
|  | Plasticizer | Kind | 3GO | 3GO | 3GO | 3GO |
|  |  | Amount (parts by weight) | 28 | 31 | 31 | 28 |
| Film composition |  |  | B/A/B | B/A/B | B/A/B | B/A/B |
| Thickness of protective layer B (μm)/thickness of intermediate layer A (μm)/thickness of protective layer B (μm) |  |  | 3GB | EDENCL422 | D931 | DBA |
| Thickness of intermediate layer A (μm/total thickness of protective layers B (μm) |  |  | 0.16 | 0.16 | 0.16 | 0.16 |
| Peak temperature (° C.) of tan δ which appears at the lowest temperature |  |  | −5.8 | −3.6 | −4.2 | −5.6 |
| Maximum value of tan δ at a peak which appears at the lowest temperature |  |  | 1.51 | 1.46 | 1.47 | 1.5 |
| 20° C. loss factor at around 3150 Hz |  |  | 0.42 | 0.38 | 0.39 | 0.42 |
| Bubble formation test A (state of bubble formation) |  |  | ⊙⊙ | ⊙⊙ | ⊙⊙ | ⊙⊙ |
| Bubble formation test B (state of bubble formation) |  |  | ◯ | ◯ | ◯ | ◯ |
| Test method A: Glass transition temperature (Tg) (° C.) |  |  | −8.54 | −5.6 | −6.1 | −7.9 |
| Test method A: G' (Tg + 30) (Pa) |  |  | 198500 | 214600 | 212500 | 204500 |
| Test method A: G' (Tg + 80) (Pa) |  |  | 136000 | 145300 | 144800 | 139200 |
| Test method A: G' (Tg + 80)/G' (Tg + 30) |  |  | 0.69 | 0.68 | 0.68 | 0.68 |
| Test method B: Glass transition temperature (Tg) (° C.) |  |  | −5.3 | −4.4 | −5 | −6.3 |
| Test method B: G' (Tg + 30) (Pa) |  |  | 202000 | 213900 | 211000 | 205600 |
| Test method B: G' (Tg + 80) (Pa) |  |  | 137200 | 145500 | 140500 | 140200 |
| Test method B: G' (Tg + 80)/G' (Tg + 30) |  |  | 0.68 | 0.68 | 0.67 | 0.68 |

TABLE 5

|  |  |  | Ex. 30 | Ex. 31 | Ex. 32 | Ex. 33 |
|---|---|---|---|---|---|---|
| Intermediate layer A | Resin | Degree of butyralization (mol %) | 85 | 55 | 45 | 49 |
|  |  | Degree of acetylation (mol %) | 28 | 28 | 28 | 25 |
|  |  | Hydroxy group content (mol %) | 7 | 17 | 27 | 25 |
|  |  | Amount (parts by weight) | 100 | 100 | 100 | 100 |
|  | Plasticizer | Kind | 3GO | 3GO | 3GO | 3GO |
|  |  | Amount (parts by weight) | 60 | 60 | 60 | 60 |
| Protective layer B | Resin | Degree of butyralization (mol %) | 68.5 | 68.5 | 68.5 | 68.5 |
|  |  | Degree of acetylation (mol %) | 1 | 1 | 1 | 1 |
|  |  | Hydroxy group content (mol %) | 30.5 | 30.5 | 30.5 | 30.5 |
|  |  | Amount (parts by weight) | 100 | 100 | 100 | 100 |
|  | Plasticizer | Kind | 3GO | 3GO | 3GO | 3GO |
|  |  | Amount (parts by weight) | 27 | 29 | 38.5 | 38.5 |
| Film composition |  |  | B/A/B | B/A/B | B/A/B | B/A/B |
| Thickness of protective layer B (μm)/thickness of intermediate layer A (μm)/thickness of protective layer B (μm) |  |  | 350/110/350 | 350/110/350 | 350/110/350 | 350/110/350 |
| Thickness of intermediate layer A (μm/total thickness of protective layers B (μm) |  |  | 0.16 | 0.16 | 0.16 | 0.16 |
| Peak temperature (° C.) of tan δ which appears at the lowest temperature |  |  | −4.8 | −5.1 | −3.6 | −3.2 |
| Maximum value of tan δ at a peak which appears at the lowest temperature |  |  | 1.44 | 1.39 | 1.31 | 1.3 |
| 20° C. loss factor at around 3150 Hz |  |  | 0.37 | 0.36 | 0.33 | 0.33 |
| Bubble formation test A (state of bubble formation) |  |  | ⊙⊙ | ⊙⊙ | ⊙⊙ | ⊙⊙ |
| Bubble formation test B (state of bubble formation) |  |  | ◯ | ◯ | ◯ | ◯ |
| Test method A: Glass transition temperature (Tg) (° C.) |  |  | −6.9 | −7.8 | −1.6 | −2.2 |
| Test method A: G' (Tg + 30) (Pa) |  |  | 207600 | 212400 | 236800 | 232900 |
| Test method A: G' (Tg + 80) (Pa) |  |  | 141600 | 143200 | 164000 | 161700 |
| Test method A: G' (Tg + 80)/G' (Tg + 30) |  |  | 0.68 | 0.67 | 0.69 | 0.69 |
| Test method B: Glass transition temperature (Tg) (° C.) |  |  | −5.3 | −5.5 | −4.2 | −3.7 |
| Test method B: G' (Tg + 30) (Pa) |  |  | 210400 | 215700 | 228500 | 224900 |
| Test method B: G' (Tg + 80) (Pa) |  |  | 142300 | 144500 | 155300 | 152600 |
| Test method B: G' (Tg + 80)/G' (Tg + 30) |  |  | 0.68 | 0.67 | 0.68 | 0.68 |

TABLE 5-continued

|  |  |  | Ex. 34 | Ex. 35 | Comp. Ex. 3 | Comp. Ex. 4 |
|---|---|---|---|---|---|---|
| Intermediate layer A | Resin | Degree of butyralization (mol %) | 91 | 78 | 72 | 79 |
|  |  | Degree of acetylation (mol %) | 7 | 18 | 7 | 1 |
|  |  | Hydroxy group content (mol %) | 2 | 4 | 21 | 20 |
|  |  | Amount (parts by weight) | 100 | 100 | 100 | 100 |
|  | Plasticizer | Kind | 3GO | 3GO | 3GO | 3GO |
|  |  | Amount (parts by weight) | 60 | 60 | 60 | 60 |
| Protective layer B | Resin | Degree of butyralization (mol %) | 68.5 | 68.5 | 68.5 | 68.5 |
|  |  | Degree of acetylation (mol %) | 1 | 1 | 1 | 1 |
|  |  | Hydroxy group content (mol %) | 30.5 | 30.5 | 30.5 | 30.5 |
|  |  | Amount (parts by weight) | 100 | 100 | 100 | 100 |
|  | Plasticizer | Kind | 3GO | 3GO | 3GO | 3GO |
|  |  | Amount (parts by weight) | 30 | 27 | 38.5 | 38.5 |
| Film composition |  |  | B/A/B | B/A/B | B/A/B | B/A/B |
| Thickness of protective layer B (μm)/thickness of intermediate layer A (μm)/thickness of protective layer B (μm) |  |  | 350/110/350 | 350/110/350 | 350/110/350 | 350/110/350 |
| Thickness of intermediate layer A (μm/total thickness of protective layers B (μm) |  |  | 0.16 | 0.16 | 0.16 | 0.16 |
| Peak temperature (° C.) of tan δ which appears at the lowest temperature |  |  | −5.1 | −5.4 | −3.6 | −3.1 |
| Maximum value of tan δ at a peak which appears at the lowest temperature |  |  | 1.46 | 1.47 | 0.98 | 1.03 |
| 20° C. loss factor at around 3150 Hz |  |  | 0.38 | 0.39 | 0.26 | 0.27 |
| Bubble formation test A (state of bubble formation) |  |  | ⊚ | ⊚ | — | — |
| Bubble formation test B (state of bubble formation) |  |  | ○ | ○ | — | — |
| Test method A: Glass transition temperature (Tg) (° C.) |  |  | −6.3 | −7.2 | — | — |
| Test method A: G' (Tg + 30) (Pa) |  |  | 209500 | 211200 | — | — |
| Test method A: G' (Tg + 80) (Pa) |  |  | 139600 | 140900 | — | — |
| Test method A: G' (Tg + 80)/G' (Tg + 30) |  |  | 0.67 | 0.67 | — | — |
| Test method B: Glass transition temperature (Tg) (° C.) |  |  | −5.6 | −6 | — | — |
| Test method B: G' (Tg + 30) (Pa) |  |  | 210200 | 214500 | — | — |
| Test method B: G' (Tg + 80) (Pa) |  |  | 140100 | 143000 | — | — |
| Test method B: G' (Tg + 80)/G' (Tg + 30) |  |  | 0.67 | 0.67 | — | — |

FIG. 7 is a phase diagram of three values including a degree of acetalization, a degree of acetylation, and a hydroxy group content of a polyvinyl acetal resin contained in the first layer of each of the intermediate films for laminated glass of Examples 1 to 7 and Comparative Example 1, and indicates values of the degree of acetalization, the degree of acetylation, and the hydroxy group content.

FIG. 8 is a phase diagram of three values including a degree of acetalization, a degree of acetylation, and a hydroxy group content of a polyvinyl acetal resin contained in the first layer of each of the intermediate films for laminated glass of Examples 8 to 14 and Comparative Example 2, and indicates values of the degree of acetalization, the degree of acetylation, and the hydroxy group content.

FIG. 9 is a phase diagram of three values including a degree of acetalization, a degree of acetylation, and a hydroxy group content of a polyvinyl acetal resin contained in the first layer of each of the intermediate films for laminated glass of Examples 15 to 35 and Comparative Examples 3 and 4, and indicates values of the degree of acetalization, the degree of acetylation, and the hydroxy group content.

In the intermediate films for laminated glass of the examples and comparative examples (except for Comparative Examples 3 and 4), the elastic modulus G' of resin films B (first layers) that contain plasticizers of the first layer and plasticizers of the first layer in amounts as shown in Tables 2 to 5 was measured after migration of the plasticizer among layers of the multilayer intermediate film. As a result as shown in Table 2 to 5, the ratio (G' (Tg+80)/G' (Tg+30)) of the resin film B was similar to the ratio (G' (Tg+80)/G' (Tg+30)) of a resin film A containing 100 parts by weight of the polyvinyl acetal resin in the first layer and 60 parts by weight of 3GO.

EXPLANATION OF SYMBOLS

1 Intermediate film
1a First surface
1b Second surface
2 First layer
2a First surface
2b Second surface
3 Second layer
3a Outer surface
4 Third layer
4a Outer surface
11 Laminated glass
21 First component for laminated glass
22 Second component for laminated glass

The invention claimed is:
1. An intermediate film for laminated glass having a layered structure including only three layers, comprising:
a first layer containing a polyvinyl acetal resin and a plasticizer;
a second layer containing a polyvinyl acetal resin and a plasticizer and being positioned on a first surface of the first layer; and
a third layer containing a polyvinyl acetal resin and a plasticizer and being positioned on a second surface that is an opposite side of the first surface of the first layer,
wherein a degree of acetalization, a degree of acetylation, and a hydroxy group content of the polyvinyl acetal resin contained in the first layer are values which satisfy both of configuration A) and configuration B) below:

A) in a phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting a first coordinate of degree of acetalization:degree of acetylation:hydroxy group content=70 mol %:30 mol %:0 mol %, a second coordinate of degree of acetalization:degree of acetylation:hydroxy group content=34 mol %:30 mol %:36 mol %, a third coordinate of degree of acetalization:degree of acetylation:hydroxy group content=94 mol %:0 mol %:6 mol %, and a fourth coordinate of degree of acetalization:degree of acetylation:hydroxy group content=100 mol %:0 mol %:0 mol % in the stated order, and B) a degree of acetylation of the polyvinyl acetal resin contained in the first layer is less than 8 mol %; and a hydroxy group content of the polyvinyl acetal resin in the first layer is smaller than a hydroxy group content of the polyvinyl acetal resin in the second layer;

a hydroxy group content of the polyvinyl acetal resin in the first layer is smaller than a hydroxy group content of the polyvinyl acetal resin in the third layer;

wherein the plasticizer in the first layer, the plasticizer in the second layer and the plasticizer in the third layer are each represented by Formula (1):

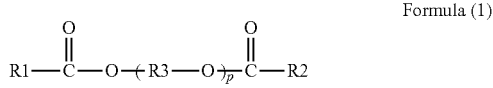

Formula (1)

wherein R1 and R2 each represent a C5-10 organic group, R3 represents an ethylene group, isopropylene group or n-propylene group, and p represents an integer of 3 to 10, the amount of the plasticizer in the second layer for 100 parts by weight of the polyvinyl acetal resin in the second layer is smaller than the amount of the plasticizer in the first layer for 100 parts by weight of the polyvinyl acetal resin in the first layer, and the amount of the plasticizer in the third layer for 100 parts by weight of the polyvinyl acetal resin in the third layer is smaller than the amount of the plasticizer in the first layer for 100 parts by weight of the polyvinyl acetal resin in the first layer, and wherein a ratio of a thickness of the first layer to a total thickness of the second layer and the third layer is not more than 0.5.

2. The intermediate film for laminated glass according to claim 1, wherein the values of the degree of acetalization, the degree of acetylation, and the hydroxy group content of the polyvinyl acetal resin contained in the first layer further satisfy configuration A1) below:

A1) in the phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting the first coordinate of degree of acetalization:degree of acetylation:hydroxy group content=70 mol %:30 mol %:0 mol %, the second coordinate of degree of acetalization:degree of acetylation:hydroxy group content=34 mol %:30 mol %:36 mol %, a fifth coordinate of degree of acetalization:degree of acetylation:hydroxy group content=95 mol %:0 mol %:5 mol %, and the fourth coordinate of degree of acetalization:degree of acetylation:hydroxy group content=100 mol %:0 mol %:0 mol % in the stated order.

3. The intermediate film for laminated glass according to claim 1, wherein the values of the degree of acetalization, the degree of acetylation, and the hydroxy group content of the polyvinyl acetal resin contained in the first layer further satisfy configuration A2) below:

A2) in the phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting the first coordinate of degree of acetalization:degree of acetylation:hydroxy group content=70 mol %:30 mol %:0 mol %, the second coordinate of degree of acetalization:degree of acetylation:hydroxy group content=34 mol %:30 mol %:36 mol %, the third coordinate of degree of acetalization:degree of acetylation:hydroxy group content=94 mol %:0 mol %:6 mol %, and a sixth coordinate of degree of acetalization:degree of acetylation:hydroxy group content=95 mol %:5 mol %:0 mol % in the stated order.

4. The intermediate film for laminated glass according to claim 1, wherein the values of the degree of acetalization, the degree of acetylation, and the hydroxy group content of the polyvinyl acetal resin contained in the first layer further satisfy configuration A3) below:

A3) in the phase diagram of three values including a degree of acetalization, a degree of acetylation, and a hydroxy group content of the polyvinyl acetal resin contained in the first layer, the values of the degree of acetalization, the degree of acetylation, and the hydroxy group content each fall within a region surrounded by a line including four straight lines connecting the first coordinate of degree of acetalization:degree of acetylation:hydroxy group content=70 mol %:30 mol %:0 mol %, the second coordinate of degree of acetalization:degree of acetylation:hydroxy group content=34 mol %:30 mol %:36 mol %, a fifth coordinate of degree of acetalization:degree of acetylation:hydroxy group content=95 mol %:0 mol %:5 mol %, and a sixth coordinate of degree of acetalization:degree of acetylation:hydroxy group content=95 mol %:5 mol %:0 mol % in the stated order.

5. The intermediate film for laminated glass according to claim 1, wherein a carbon number of the acetal group of the polyvinyl acetal resin contained in the second layer is 3 or 4, a degree of acetalization thereof is not less than 60 mol % but not more than 75 mol %, and a degree of acetylation thereof is 10 mol % or less.

6. The intermediate film for laminated glass according to claim 1,
wherein the amount of the plasticizer in the second layer for 100 parts by weight of the polyvinyl acetal resin in the second layer is not less than 10 parts but not more than 45 parts by weight.

7. The intermediate film for laminated glass according to claim 1,
wherein the second layer is laminated on the first surface of the first layer.

8. The intermediate film for laminated glass according to claim 1,
wherein the amount of the plasticizer in the first layer for 100 parts by weight of the polyvinyl acetal resin in the first layer is 50 parts by weight or more and 70 parts by weight or less, and
a degree of acetylation of the polyvinyl acetal resin in the first layer is 8 mol % or less if a difference between the hydroxy group content of the polyvinyl acetal resin in the first layer and the hydroxy group content of the polyvinyl acetal resin in the second layer is larger than 8.5 mol % but not larger than 9.2 mol %.

9. The intermediate film for laminated glass according to claim 1,
wherein the polyvinyl acetal resin in the first layer contains a high molecular weight component having an absolute molecular weight of one million or more, and a proportion of the high molecular weight component in the polyvinyl acetal resin in the first layer is 7.4% or more.

10. The intermediate film for laminated glass according to claim 1,
wherein, in the case that the first layer is used as a resin film and a viscoelasticity of the resin film is measured, a ratio of an elastic modulus at Tg+80° C. to an elastic modulus at Tg+30° C. is 0.65 or more, provided that Tg represents a glass transition temperature of the resin film in ° C.

11. The intermediate film for laminated glass according to claim 1,
wherein, in the case that a resin film contains 100 parts by weight of the polyvinyl acetal resin contained in the first layer and 60 parts by weight of triethylene glycol di-2-ethylhexanoate as a plasticizer and a viscoelasticity of the resin film is measured, a ratio of an elastic modulus at Tg+80° C. to an elastic modulus at Tg+30° C. is 0.65 or more, provided that Tg represents a glass transition temperature of the resin film in ° C.

12. The intermediate film for laminated glass according to claim 1,
wherein the polyvinyl acetal resin in the first layer is obtained by acetalizing a polyvinyl alcohol resin having an average degree of polymerization of more than 3000.

13. The intermediate film for laminated glass according to claim 1,
wherein a carbon number of the acetal group of the polyvinyl acetal resin contained in the third layer is 3 or 4, a degree of acetalization thereof is not less than 60 mol % but not more than 75 mol %, and a degree of acetylation thereof is 10 mol % or less.

14. The intermediate film for laminated glass according to claim 1,
wherein the amount of the plasticizer in the third layer for 100 parts by weight of the polyvinyl acetal resin in the third layer is not less than 10 parts but not more than 45 parts by weight.

15. The intermediate film for laminated glass according to claim 1,
wherein the ratio of the thickness of the first layer to the total thickness of the second layer and the third layer is not less than 0.1.

16. The intermediate film for laminated glass according to claim 1,
wherein the third layer is laminated on the second surface of the first layer.

17. A laminated glass comprising:
a first component for laminated glass;
a second component for laminated glass; and
an intermediate film interposed between the first component for laminated Mass and the second component for laminated glass,
wherein the intermediate film is the intermediate film for laminated glass according to claim 1.

18. The intermediate film for laminated glass according to claim 1, further comprising at least one additive selected from the group consisting of ultraviolet absorbers, antioxidants, light stabilizers, flame retardants, antistatic agents, pigments, dyes, adhesion modifiers, damp proofing agents, fluorescent brighteners, and infrared absorbers.

19. The intermediate film for laminated glass according to claim 1, further comprising at least two additives selected from the group consisting of antistatic agents, adhesion modifiers, damp proofing agents, and fluorescent brighteners.

20. The intermediate film for laminated glass according to claim 1, wherein, in Formula (1), p represents an integer of 5 to 10.

* * * * *